(12) United States Patent  (10) Patent No.: US 11,302,016 B2
Takahashi et al.  (45) Date of Patent: Apr. 12, 2022

(54) DETERMINATION METHOD, DETERMINATION SYSTEM, DETERMINATION DEVICE, AND PROGRAM

(71) Applicant: NEC Corporation, Tokyo (JP)

(72) Inventors: Toru Takahashi, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 16/351,151

(22) Filed: Mar. 12, 2019

(65) Prior Publication Data
US 2019/0279377 A1  Sep. 12, 2019

Related U.S. Application Data

(63) Continuation of application No. 15/507,322, filed as application No. PCT/JP2015/074773 on Aug. 31, 2015, now Pat. No. 10,262,427.

(30) Foreign Application Priority Data

Sep. 1, 2014 (JP) .................... 2014-177408

(51) Int. Cl.
*G06T 7/00* (2017.01)
*G06T 7/35* (2017.01)
(Continued)

(52) U.S. Cl.
CPC ............ *G06T 7/35* (2017.01); *G06K 9/00577* (2013.01); *G06K 9/2036* (2013.01); *G06Q 20/40* (2013.01);
(Continued)

(58) Field of Classification Search
CPC ........ G06T 7/35; G06T 7/0004; G06T 7/0044; G06Q 20/40; G06Q 30/0185; G06Q 10/08;
(Continued)

(56) References Cited

U.S. PATENT DOCUMENTS 6,456,729 B1 * 9/2002 Moore ............ G07B 17/00435
382/103
8,437,528 B1  5/2013 Csulits et al.
(Continued)

FOREIGN PATENT DOCUMENTS

JP  2002-125721  5/2002
JP  2009-187580  8/2009
(Continued)

OTHER PUBLICATIONS

B.D. Lucas et al., "An Iterative Image Registration Technique with an Application to Stereo Vision", Proc. 7th Int'l Joint Conference on Artificial Intelligence (IJCAI), pp. 674-679, Aug. 1981.
(Continued)

*Primary Examiner* — Sheela C Chawan

(57) ABSTRACT

The present invention addresses the problem of providing a technique for determining the authenticity of a product without requiring a special device such as an integrated circuit (IC) tag. A means for solving this problem according to the invention is characterized by determining the authenticity of a target product on the basis of the validity of the association between the body of the product and a surface-treated component that is mounted to the body and that has been validated.

19 Claims, 61 Drawing Sheets

(51) Int. Cl.
*G07G 1/00* (2006.01)
*G06K 9/00* (2022.01)
*G06K 9/20* (2006.01)
*G06Q 20/40* (2012.01)

(52) U.S. Cl.
CPC ............ *G06T 7/001* (2013.01); *G06T 7/0004* (2013.01); *G07G 1/009* (2013.01); *G06T 2207/30204* (2013.01)

(58) Field of Classification Search
CPC .... G06Q 50/02; G06Q 50/28; G06K 9/00577; G06K 9/6255; G06K 9/00281; G06K 2009/0059; G03G 2215/00109; H04N 1/00037; H04N 1/00058; H04N 1/00082; H04N 1/00891; H04N 1/00896; H04N 2201/0094
USPC .................. 382/115, 124, 125, 141, 190, 278
See application file for complete search history.

(56) References Cited

U.S. PATENT DOCUMENTS

| | | | |
|---|---|---|---|
| 9,036,916 B2 | 5/2015 | Le | |
| 9,396,414 B2 | 7/2016 | Ito et al. | |
| 9,760,771 B2 | 9/2017 | Ishiyama | |
| 2003/0059098 A1 | 3/2003 | Jones et al. | |
| 2004/0148260 A1* | 7/2004 | Matsuda | G07D 7/004 705/57 |
| 2007/0179978 A1* | 8/2007 | Lee | G06Q 30/06 |
| 2009/0089175 A1 | 4/2009 | Platek et al. | |
| 2010/0046825 A1* | 2/2010 | Haushalter | B29C 33/424 382/141 |
| 2010/0241528 A1* | 9/2010 | Hedges | G06Q 30/0601 705/26.1 |
| 2012/0191566 A1* | 7/2012 | Sayan | G06Q 30/0633 705/26.8 |
| 2014/0153831 A1 | 6/2014 | Ishiyama | |
| 2014/0279613 A1* | 9/2014 | Lee | G06Q 30/0185 705/318 |
| 2015/0189238 A1* | 7/2015 | Ishiyama | G06Q 50/04 348/86 |
| 2015/0262347 A1* | 9/2015 | Duerksen | G07D 7/20 382/182 |

FOREIGN PATENT DOCUMENTS

| | | | | |
|---|---|---|---|---|
| JP | 2009187580 A | * | 8/2009 | |
| JP | 2012043953 A | * | 3/2012 | ............ H01L 21/56 |
| WO | WO 2013/018614 A1 | | 2/2013 | |
| WO | WO 2013/191281 A1 | | 12/2013 | |

OTHER PUBLICATIONS

S. van Dongon et al., "Graph Clustering by Flow simulation", PhD thesis, University of Utrecht, May 2000.
M. Okutomi et al., "Digital Image Processing", CG-ARTS Society, pp. 231-232, Mar. 2006.
International Search Report and Written Opinion dated Dec. 1, 2015, in corresponding PCT International Application.

* cited by examiner

FIG. 7
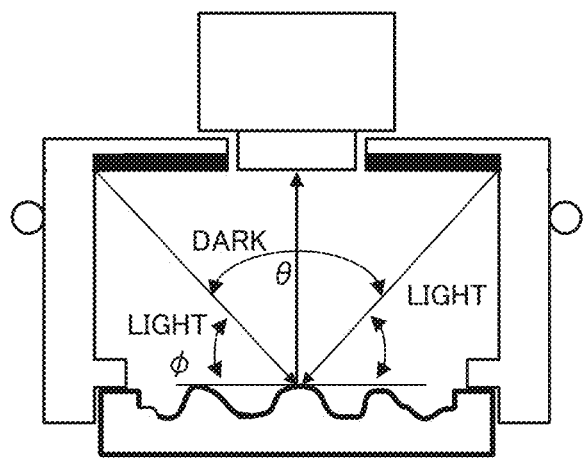
AS θ GETS LARGER, THE BLACK SURFACE AREA ALSO GETS LARGE, AND THE PORTION OF THE TEXTURED SURFACE TO BE IMAGED BLACK GETS LARGE
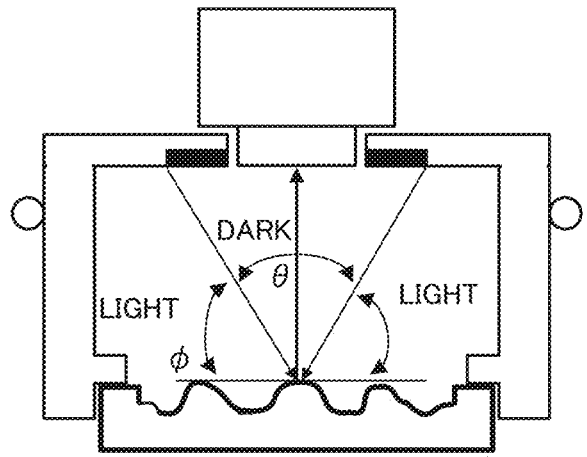
AS θ GETS SMALLER, THE BLACK SURFACE AREA ALSO GETS SMALL, AND THE PORTION OF THE TEXTURED SURFACE TO BE IMAGED BLACK GETS SMALL

FIG. 8

EXAMPLE 1
BINARIZED IMAGE

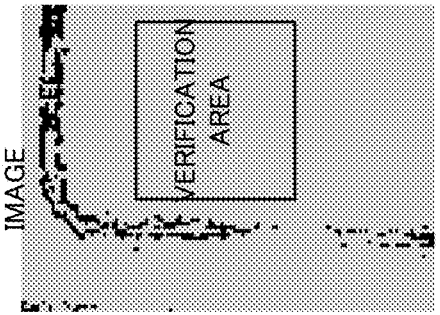
VERIFICATION AREA

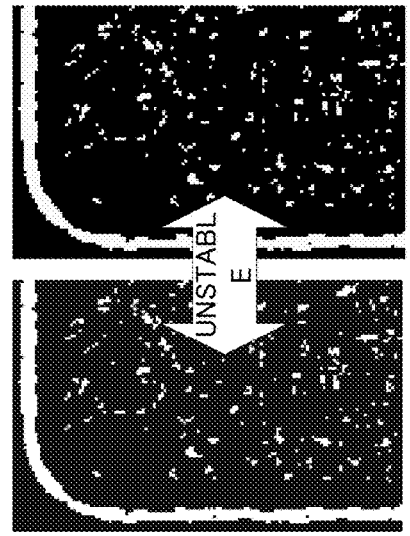
EXAMPLE 2
UNSTABLE

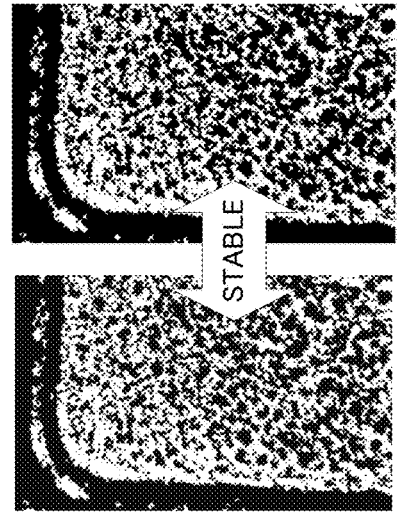
EXAMPLE 3
STABLE

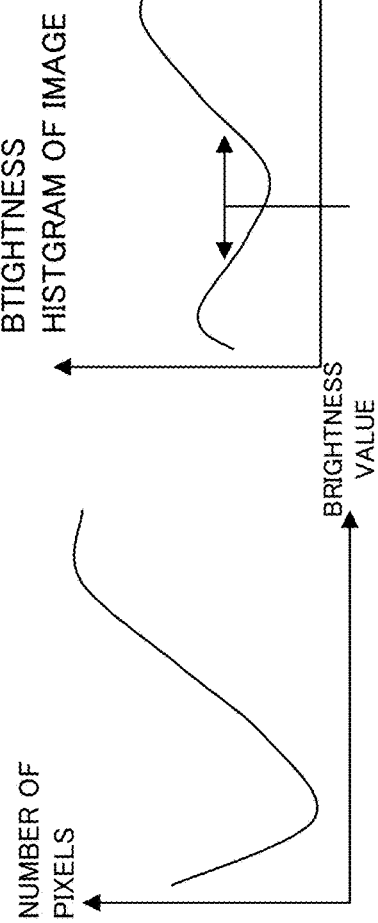

NUMBER OF PIXELS → BRIGHTNESS VALUE
CONCAVE PORTION OF TEXTURED SURFACE ALSO GETS LIGHT, AND SO FEATURE POINT CANNOT BE FOUND

BTIGHTNESS HISTGRAM OF IMAGE
DIFICULT TO SET BINARIZEATION THRESHOLD VALUE (FEATURE POINT CHANGES AS THRESHOLD VALUE CHANGES)

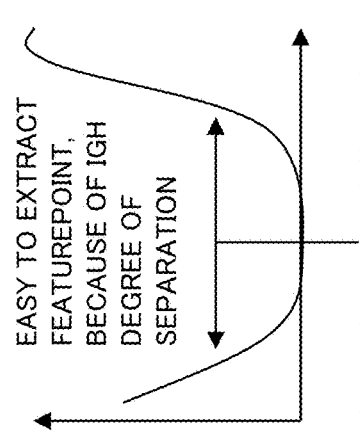
EASY TO EXTRACT FEATUREPOINT, BECAUSE OF IGH DEGREE OF SEPARATION
EASY TO SET BINARIZATION THRESHOLD VALUE (FEATURE POINT NOT EASILY CHANGE EVEN WHEN THRESHOLD VALUE CHANGES)

FIG. 15
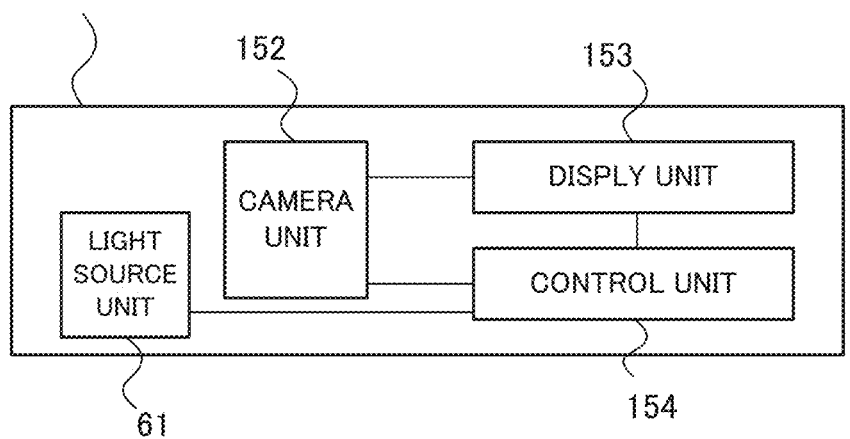
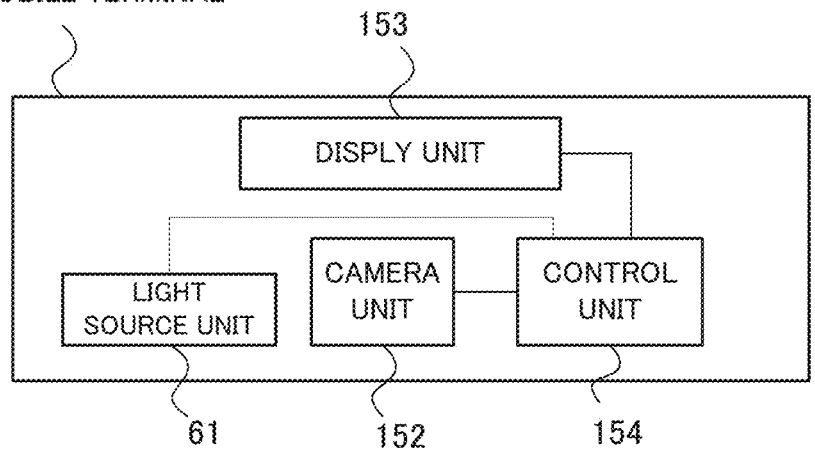

FIG. 18
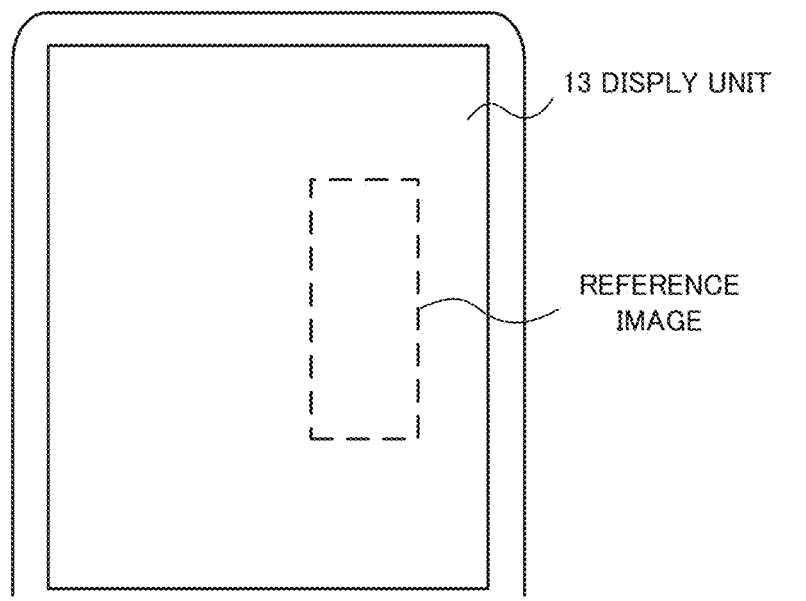
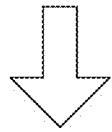
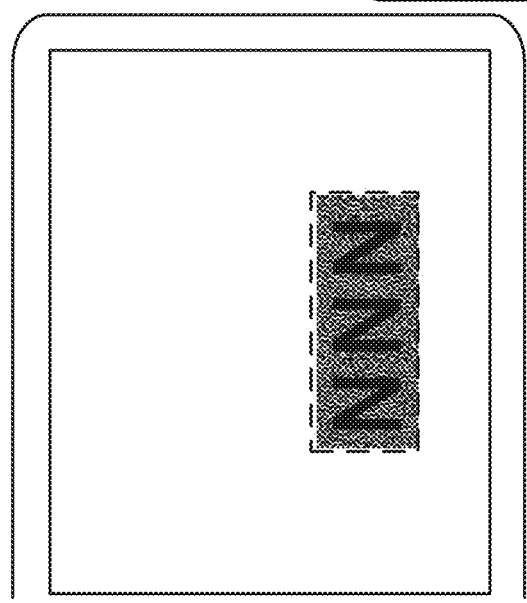

FIG. 21
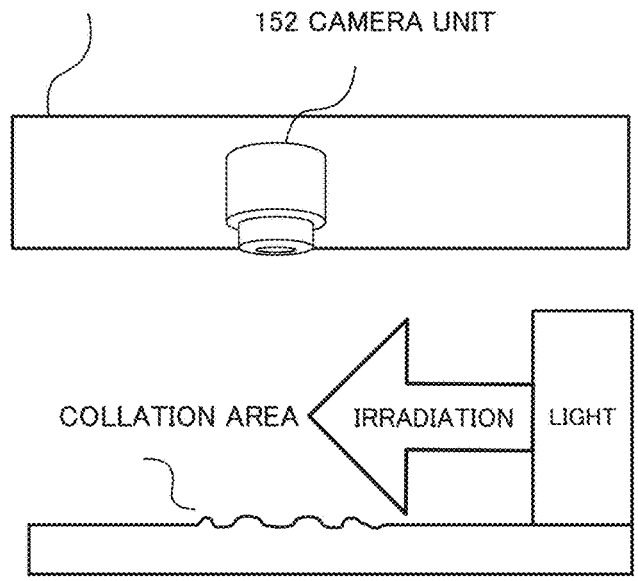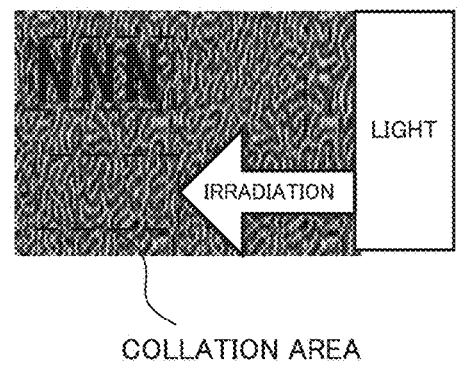
(a) SECTIONAL VIEW  (b) FRONT VIEW
FIG. 22
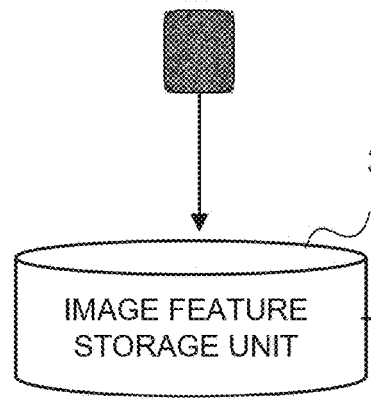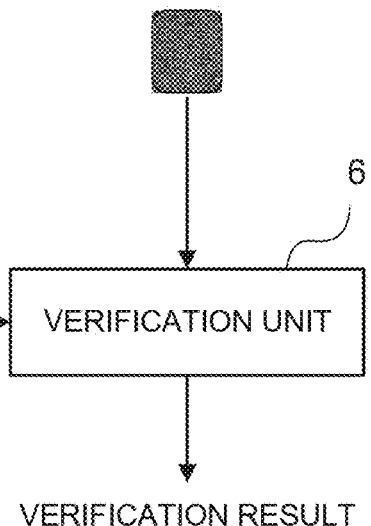

FIG. 27

| MOLD | IMAGE FEATURE |
|---|---|
| MOLD 1 | XXX |
| MOLD 2 | YYY |
| ... | ... |
| MOLD N | ZZZ |

FIG. 28

| FASTENER ID | IMAGE FEATURE |
|---|---|
| FASTENER 1 | XXX |
| FASTENER 2 | YYY |
| ... | ... |
| FASTENER N | ZZZ |

FIG. 29

| FASTENER ID | IMAGE FEATURE | |
|---|---|---|
| | MOLD DIFFERENCE IMAGE FEATURE | INDIVIDUAL DIFFERENCE IMAGE FEATURE |
| FASTENER 1 | MOLD A<br>AAA | XXX |
| FASTENER 2 | | YYY |
| ... | | ... |
| FASTENER N | | ZZZ |
| FASTENER 111 | MOLD B<br>BBB | XXX |
| FASTENER 112 | | YYY |
| ... | | ... |
| FASTENER 11N | | ZZZ |
| ... | ... | ... |

EXTRACT IMAGE FEATURE OF TEXTURE FORMED IN COLLATION AREA

| MOLD | IMAGE FEATURE | MANAGEMENT INFORMATION |
|---|---|---|
| MOLD 1 | XXX | 100 |
| MOLD 2 | YYY | 200 |
| ... | ... | ... |
| MOLD N | ZZZ | 1000 |

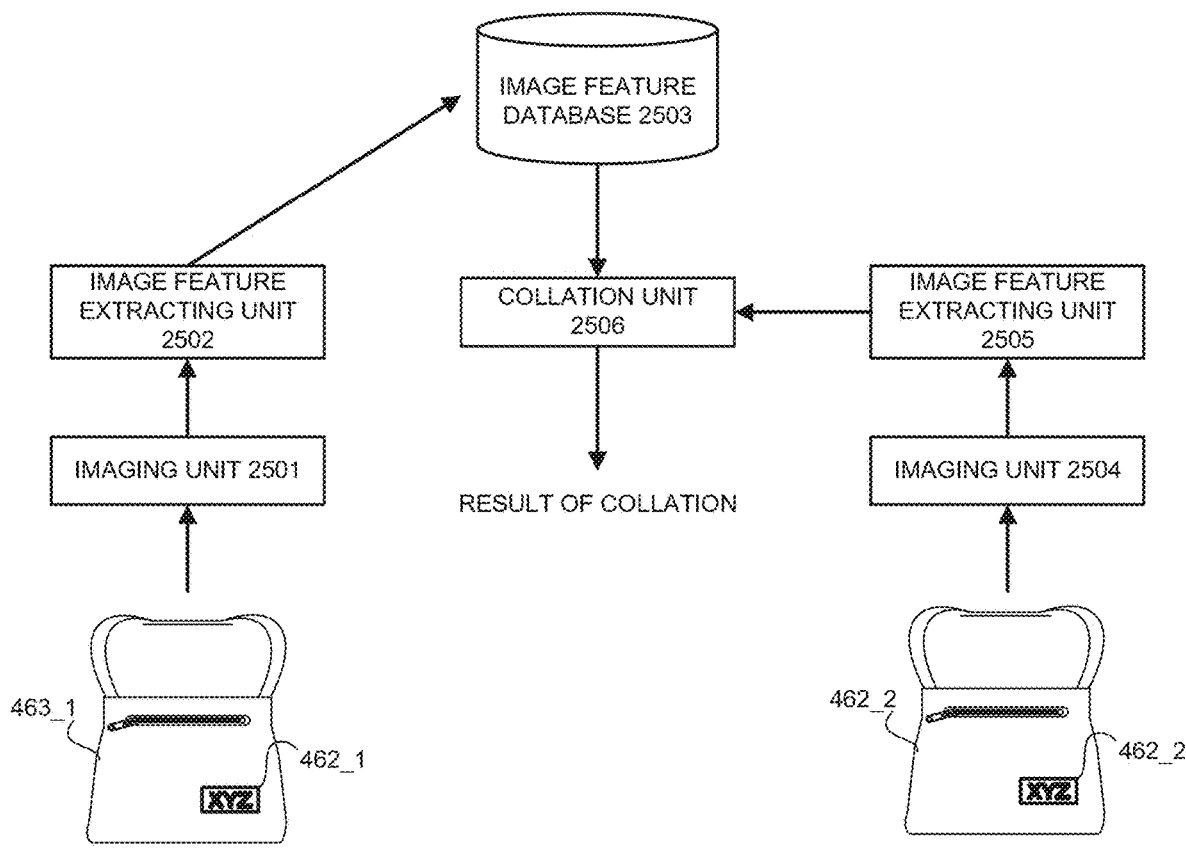

FIG. 52

| LOGO PLATE ID | IMAGE FEATURES OF LOGO PLATE | | MANAGEMENT INFORMATION |
| --- | --- | --- | --- |
| | MOLD DIFFERENCE IMAGE FEATURE | INDIVIDUAL OBJECT DIFFERENCE IMAGE FEATURE | |
| LOGO PLATE 1 | MOLD A AAA | XXX | 100 |
| LOGO PLATE 2 | | YYY | 101 |
| ... | | ... | ... |
| LOGO PLATE N | | ZZZ | 150 |
| LOGO PLATE 111 | MOLD B BBB | XYY | 200 |
| LOGO PLATE 112 | | XYZ | 201 |
| ... | | ... | ... |
| LOGO PLATE 11N | | ZZZ | 1000 |
| ... | ... | ... | |

FIG. 58
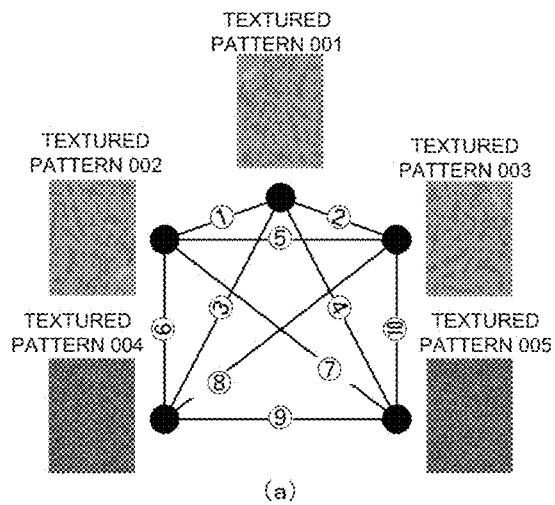
(a)
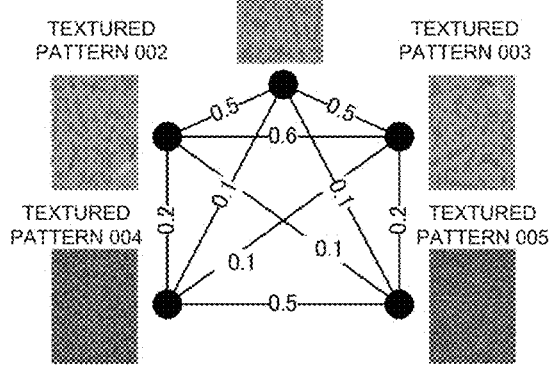
(b)
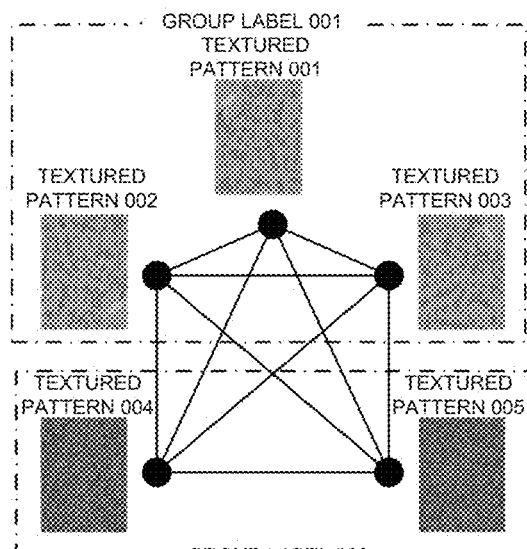
(c)

| SERIAL NUMBER | IMAGE FEATURE | MANAGEMENT INFORMATION |
|---|---|---|
| 1234 | AAA | XXXXXXXX |
| 1235 | BBB | XXXXXXXX |
| ⋮ | ⋮ | ⋮ |

FIG. 68
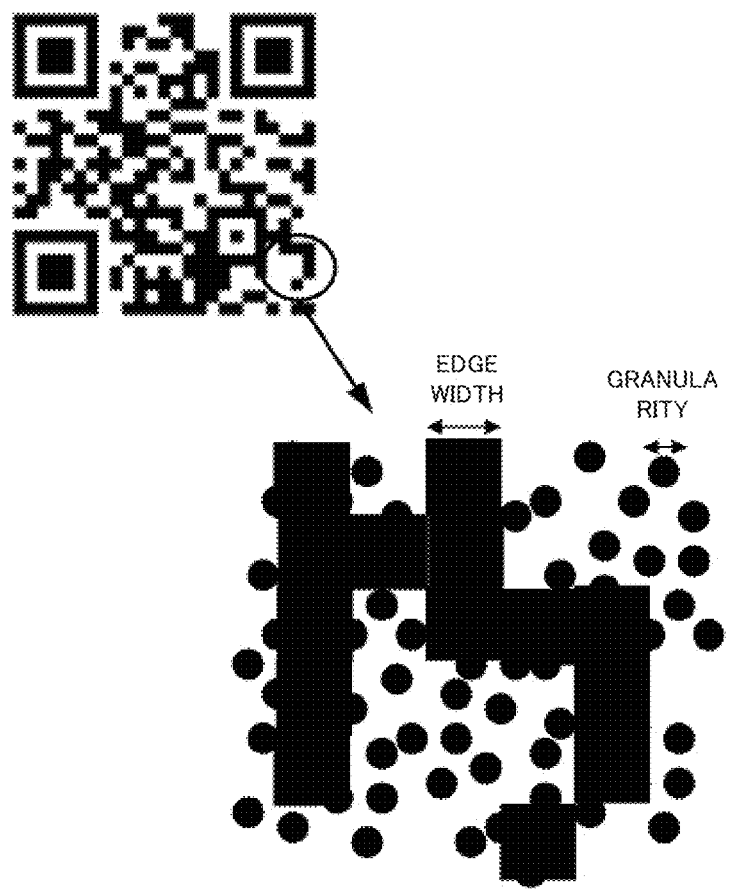
OK: EDGE WIDTH > 2 GRANULARITY
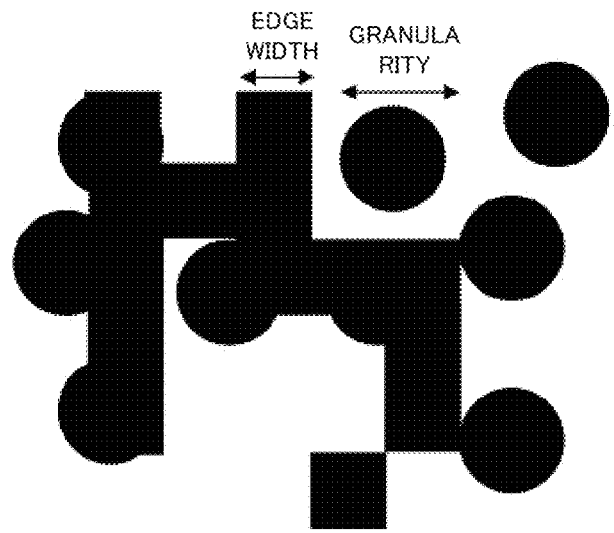
NG: EDGE WIDTH < 2 GRANULARITY

INFORMATION ACQUISITION AND REGISTRATION UNIT

DETERMINATION METHOD, DETERMINATION SYSTEM, DETERMINATION DEVICE, AND PROGRAM

CROSS-REFERENCE TO RELATED PATENT APPLICATIONS

This application is a continuation of U.S. patent application Ser. No. 15/507,322, filed Feb. 28, 2017, which is a National Stage Entry of International Application No. PCT/JP2015/074773, filed Aug. 31, 2015, which claims priority from Japanese Patent Application No. 2014-177408, filed Sep. 1, 2014. The entire contents of the above-referenced applications are expressly incorporated herein by reference.

TECHNICAL FIELD

The present invention relates to a determination method, a determination system, a determination device, and a program.

BACKGROUND ART

For a quality control and a distribution control, recently, needs for verification and identification to products increases in molds, in units of lots, or in units of individual. To cope with the above, an RFID for performing data communication through a radio communication system is built into a product. Further, a comprehensive merchandise management from production to a physical distribution, sales, and the like of the product, loss prevention, theft prevention, forgery prevention, or the like of merchandise is performed.

In a technology of Patent Literature 1 and Patent Literature 2, for example, an RFID chip is arranged at a fastener that is fixed on an article. Through the above configuration, the verification for a physical distribution management, an authenticity assessment of merchandise, or the like can be performed by using data stored in a memory of the RFID chip.

CITATION LIST

Patent Literature

Patent Literature 1: Japanese Laid-open Patent Publication No. 2009-187580
Patent Literature 2: Japanese Laid-open Patent Publication No. 2002-125721

SUMMARY OF INVENTION

Technical Problem

However, there is a problem that in a technology of patent literatures, for example, high costs are required to build an RFID chip into an article like a fastener one by one. Further, depending on products such as semiconductors, even an ordinary tag cannot be also fixed, to say nothing of special device such as an RFID chip, in many cases.

The present invention is made to solve the above problem. Therefore, the purpose of the present invention is to provide a verification method, a verification system, a verification apparatus, and a program therefor that do not require a special device such as an IC tag, and are capable of verify products.

Solution to Problem

The invention of the present application for solving the above described problem is directed to an authenticity determining method of, based on whether a correspondence relationship between a part, validity of which is confirmed and to which surface treatment is applied, and which is mounted on a body of a product that is an authenticity target, and said body is right or wrong, reaching a determination about authenticity of said product.

The invention of the present application for solving the above described problem is directed to an authenticity determining apparatus configured to, based on whether a correspondence relationship between a part, validity of which is confirmed and to which surface treatment is applied, and which is mounted on a body of a product that is an authenticity target, and said body is right or wrong, reach a determination about authenticity of said product.

The invention of the present application for solving the above described problem is directed to an authenticity determining system configured to, based on whether a correspondence relationship between a part, validity of which is confirmed and to which surface treatment is applied, and which is mounted on a body of a product that is an authenticity target, and said body is right or wrong, reach a determination about authenticity of said product.

The invention of the present application for solving the above described problem is directed to a program for an authenticity determining apparatus, said program causing said authenticity determining apparatus to execute: based on whether a correspondence relationship between a part, validity of which is confirmed and to which surface treatment is applied, and which is mounted on a body of a product that is an authenticity target, and said body is right or wrong, processing for reaching a determination about authenticity of said product.

Advantageous Effects of Invention

According to the present invention, even if a special device such as an IC tag is not introduced, merchandise can be verified.

BRIEF DESCRIPTION OF DRAWINGS

FIG. 7 is a diagram explaining a black surface region of a covering lid.
FIG. 8 is a diagram explaining an image obtained by imaging a textured surface using the present invention and an image obtained by imaging without using the present invention.

FIG. 15 is a block diagram showing a configuration of a mobile terminal according to an embodiment of the present invention.

FIG. 18 is a diagram showing an exemplifying of a display screen on which a reference image is displayed.

FIG. 21 is a diagram for explaining an alternative of an imaging apparatus.

FIG. 22 is a block diagram according to a first embodiment.

FIG. 27 is a configuration diagram illustrating a verification system of the fastener according to a second embodiment.

FIG. 28 is a configuration diagram illustrating the verification system of the fastener according to a third embodiment.

FIG. 29 is a configuration diagram illustrating the verification system of the fastener according to a fourth embodiment.

FIG. 49 is a block diagram of an embodiment 6-3.

FIG. 50 is a diagram showing an exemplary image feature database.

FIG. 52 is a diagram showing an exemplary image feature database.

FIG. 58 is diagrams illustrating clustering.

FIG. 68 illustrates granularities of textured patterns.

DESCRIPTION OF EMBODIMENTS

Embodiment 1

Figure 1:
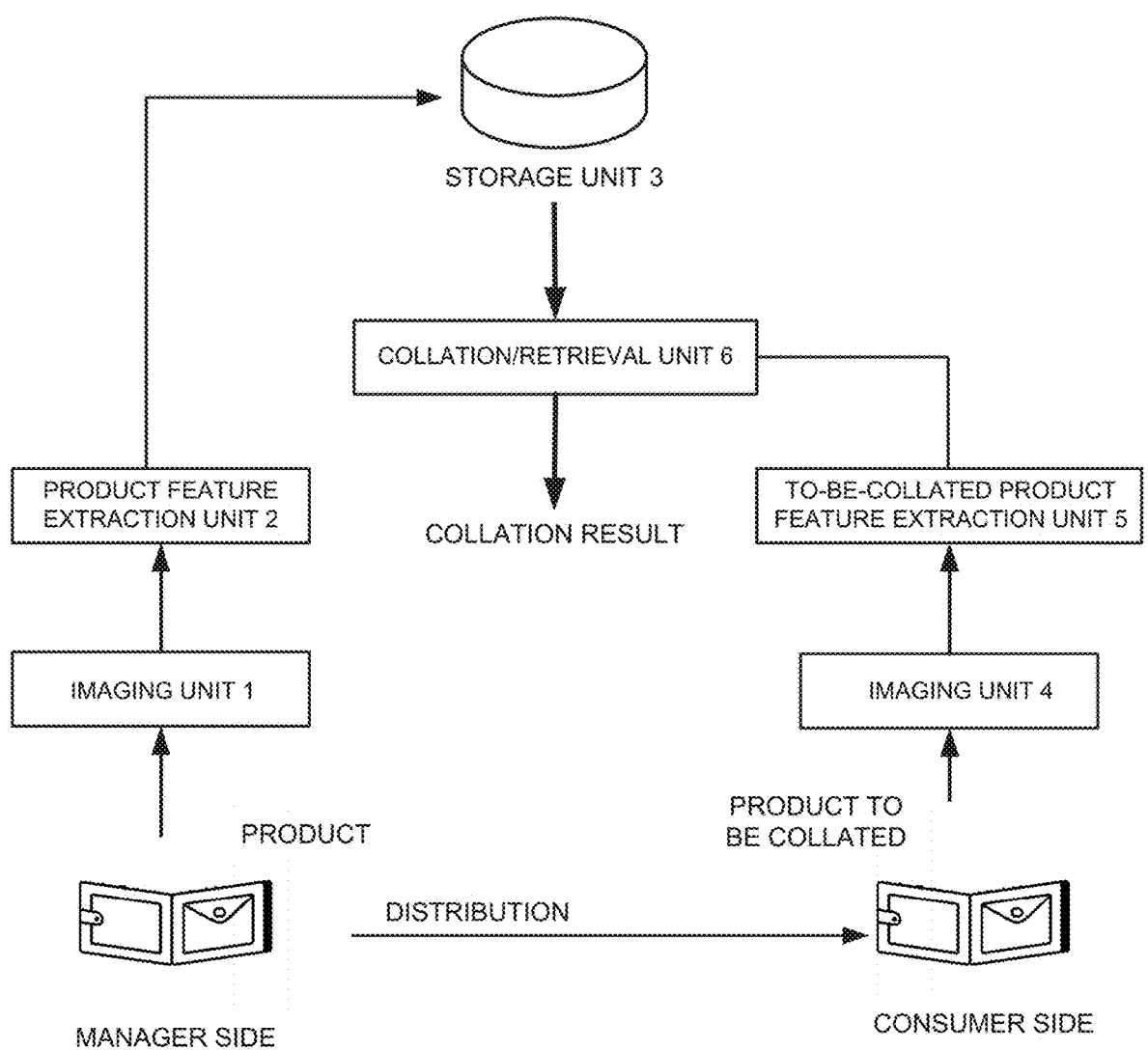
FIG. 1 is a block diagram according to an embodiment of the present invention.

Embodiment 1 of the present invention will be described. FIG. 1 is a block diagram of the embodiment of the present invention.

According to an aspect of the present invention, a product collation/retrieval system includes an imaging unit 1 capturing, while a predetermined section defined in a product is set to a reference section, an image of the product including at least the reference section; a product feature extraction unit 2 detecting from the image captured by the imaging unit 1 the reference section of the product and extracting, while a recessed portion existing at a standard position relative to the detected reference section of the product is set to a collation area, an image feature in the collation area of the product; a storage unit 3 storing the extracted image feature of the collation area of the product; an imaging unit 4 capturing an image including at least the reference section of a product to be collated; a to-be-collated product feature extraction unit 5 detecting from the image captured by the imaging unit 4 the reference section of the product to be collated and extracting an image feature of the collation area of the detected reference section; and a collation/retrieval unit 6 collating the stored image feature with the image feature of the collation area of the product to be collated.

In the present invention, while the predetermined section defined in the product is set to the reference section, a portion or a whole of the recessed portion (i.e., the portion lower than the adjacent area) existing at the standard position relative to the reference section is set to the collation area. The present invention is characterized by performing the collation and the retrieval of the product by using a difference of a surface design (i.e., an image pattern) in the collation area of the product.

Here, examples of the predetermined section defined in the product include a trademark, a logotype, a name of manufacturer, a manufacturing company, a brand name, a product name, a product number, and a section marked, branded, pressed, or attached on/to the product. The trademark, the logotype, the name of manufacturer, the manufacturing company, the brand name, the product name, the product number, and the section marked, branded, pressed, or attached on/to the product are set to the reference section. The sections of the products of the same kind commonly have the same pattern and have a characteristic appearance. Therefore, setting of the sections to the reference section advantageously facilitates detection of a position and a posture of the reference section in the image upon collation.

Meanwhile, the reference section is not needed to be changed for each individual. Therefore, a cost can be effectively saved comparing to the conventional means in which a different identifier, e.g., a different management tag, is provided to the each individual.

Further, in the present invention, while a portion or a whole of the recessed portion (i.e., the portion lower than the adjacent area) existing at the standard position relative to the reference section of the product is set to the collation area, collation and retrieval of the product is performed by using the difference of the surface design in the collation area of the product. The recessed portion (i.e., the portion lower than the adjacent area), as the collation area, is more scratch-resistant and stain-resistant than the other portions, i.e., is advantageous in keeping the surface design pattern as it is in the area for the use of collation/retrieval.

The stain that was produced naturally by a process of production/processing of a product, minute unevenness, patterns, and the like be able to be given as the patterns in the area in collation/retrieval. Specifically, the minute unevenness is naturally formed on a surface of a molten metal, resin, or a ceramic part in the course of manufacturing them. Thus formed unevenness pattern differs for each individual. Normally, such unevenness is removed during finishing process such as polishing for functional and aesthetic purposes. However, such finishing process is not provided to the recessed portion in many cases, and thus the pattern remains as it is in the recessed portion. According to the present invention, such a section is specified for the use of identification/retrieval of a target individual. Similarly, a minute unevenness pattern is generated at a change portion of the product during also cutting process and pressing process, which, however, is usually removed during the finishing process. The pattern, however, still remains as it is in the recessed portion in many cases. On the other hand, it is also possible to intentionally form minute unevenness of the surface pattern of the product on the collation area by a mold. In the present application, such intentionally formed ones are also included.

The collation area may be defined at a position away from the reference section. Further, if the reference section itself includes the recessed portion as a result of marking process, branding process, or pressing process, a portion or a whole of the reference section can be set to the collation area.

A product to which the present invention is applied should not be construed in a limiting sense insofar as the product includes a surface different for each individual product. Specific examples of the product include a leather product, a metal workpiece, a wood product, molten resin, and an industrial product including a ceramic portion (e.g., a semiconductor chip). Also, examples of the surface pattern of the product include a surface design of the leather product or the wood product and minute unevenness of the molten resin or the ceramic portion. The surface pattern is, for example, a graining, a textured pattern, blasting, etching, powder coating, or the like. Many of fastening products or the leather product is formed the textured pattern and grain processing. In addition, the textured pattern is often used on a package surface of electronic parts.

Next, a structure of each unit will be described below.

The imaging unit 1 belongs to a producer or a distributor (i.e., a production company of an industrial product) or a parson managing distribution and a quality control of products during the course of distribution of the products. By using the imaging unit 1, for example, the producer captures the images of the reference section and the collation area of the product. The imaging unit 1 may be equipped with an additional device for capturing the image of the reference section of the product. Alternatively, it is possible to use a digital camera with a CCD or a CMOS and a collation device. A file format of the captured image may be anything. For example, the file format may be a JPEG.

Meanwhile, the producer includes a person engaged in production (e.g., a production company of an industrial product), and the distributor includes a person engaged in distribution or quality control of products during the distribution of the products (e.g., a wholesaler, a retail shop, and an agent).

The product feature extraction unit 2 detects the reference section from the image captured by the imaging unit 1 and extracts the image feature of the recessed portion (i.e., the portion lower than the adjacent area), as the collation area, existing at the standard position relative to the reference section of the product. Therefore, the product feature extraction unit 2 stores in advance the feature of the reference section of the product and, based on the feature, detects the reference section from the image captured by the imaging unit 1. At the time, the product feature extraction unit 2 normalizes the collation area determined in advance by reference to the reference section based on the position and the posture of the reference section on the image to thereby extract an image feature of the normalized collation area. Extraction of the image feature can be performed by an extraction technique in which, for example, an image feature of a fingerprint is extracted by using a brightness value, a feature point, an inflection point of a line of a binarized image, an intersection point, an end point, and a center point of an image. Thus extracted image feature is stored in the storage unit 3. Meanwhile, the product recorded (i.e., registered) in the recording unit 3 is hereinafter referred to as registered product.

A method of normalization of a collation domain is described now. The normalization method of a collation area is feasible, for example, by registering a common feature (a pattern) as a template image in the same product previously and performing template matching. Additionally, the normalization method of a collation area is feasible by matching edges, corners or the like of feature points or local feature in the template image. In addition, the normalization method of the image is not limited by these. The normalization method of the image should be existing aligning technique of an image or normalization technique.

Practically, highly precise collation is enabled so that an error of a position gap in normalization disposal of images is small. Technique with subpixels level as, for example, Lucas Kanade method (non-patent document: B. D. Lucas and T. Kanade, "An Iterative Image Registration Technique with an Application to Stereo Vision," in Proc. of Int. Joint Conf. on Artificial Intelligence, pp. 674~679, August 1981).

A template image can use the image which photographed a reference part of one arbitrary same product. Practically, an image feature (An image feature to use for individual identification) in every individual of a product becomes a noise. This noise can lead to an error of normalization processing. Therefore it is desirable to use a feature only for the pattern that the same product is common to as a template image. As an example, there is a method of manually adjusting the positions of images obtained by imaging the reference parts of plural individuals on the same product and calculating the average luminance of all the images after adjust. By this method, it is possible to suppress errors among individuals and generate the template images having features common to the same product. In addition, a feature of a reference part is not limited only by a preparation method of the above mentioned template image. A feature of a reference part may be got by applying technique based on existing machine learning and statistical technique using a lot of images of same product.

Further, by setting a useful weight for the image normalization processing on the template image, it is possible to improve the accuracy of the image normalization processing. For example, it is realized by increasing the weight of a region of a pattern common to the same product such as a logo or a trademark in a template image, and reducing the weight for a textured region where individual differences between the same products are likely to occur.

Incidentally, the method of setting the weight for the template is not limited to the above mentioned method. For example, a method based on existing machine learning or a statistical method may be used for a large amount of images of the same product.

Figure 2:
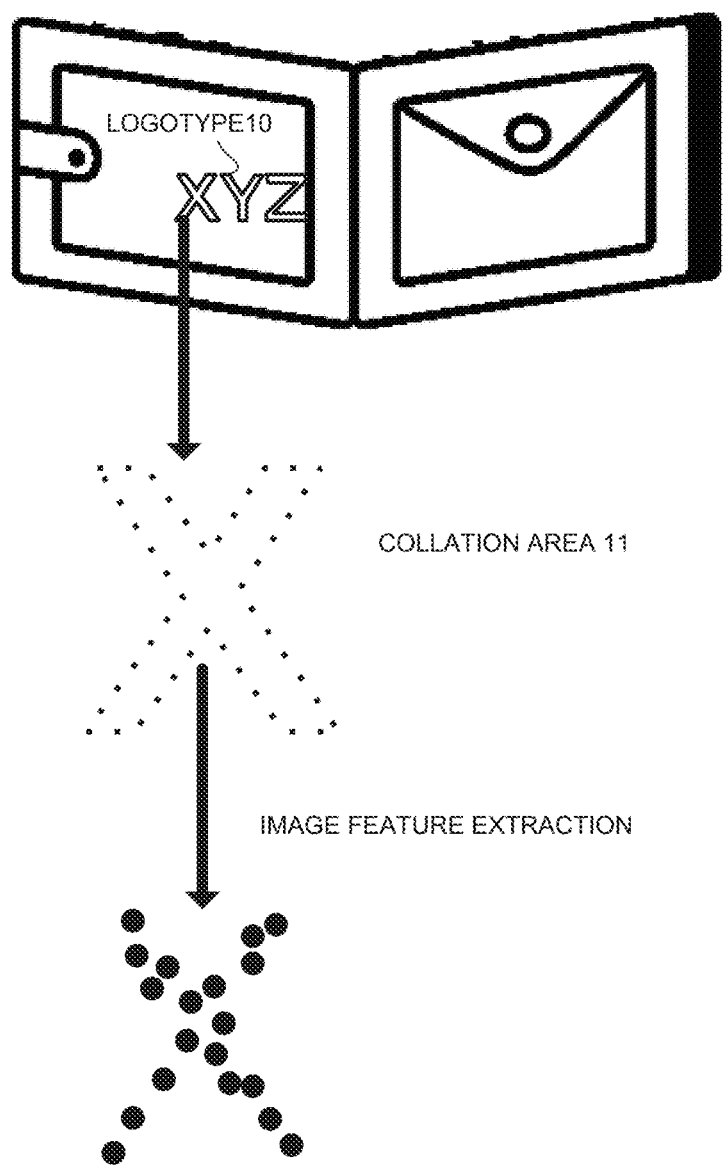
FIG. 2 illustrates a reference section and a collation area.

FIG. 2 illustrates an example of the reference section of the product and an example of the collation area thereof. In FIG. 2, a logotype 10, i.e., "XYZ", marked on a wallet is set to the reference section. Under the condition, a portion where "X" of the "XYZ" is marked and thus is formed into a recessed portion (i.e., a portion lower than the adjacent area) is set to the collation area (i.e., an inside portion of a dotted line). More specifically, the recessed portion of the reference section is set to the collation area.

Since normally the same logotype 10 is used, storing of a feature of the logotype 10 as the reference section facilitates identification of a position and a posture of the logotype 10. If the position and the posture of the logotype 10 can be identified by normalization thereof, the position and the posture of the collation area can be specified by normalization. As a result, as illustrated in FIG. 2, it is possible to extract an image feature of the surface design of the wallet as the collation area.

Meanwhile, this is a mere example and should not be construed in a limiting sense. For example, the recessed portion (i.e., the portion lower than the adjacent area) of all the letters "XYZ" of the logotype 10 can be set to the collation area.

Figure 3:
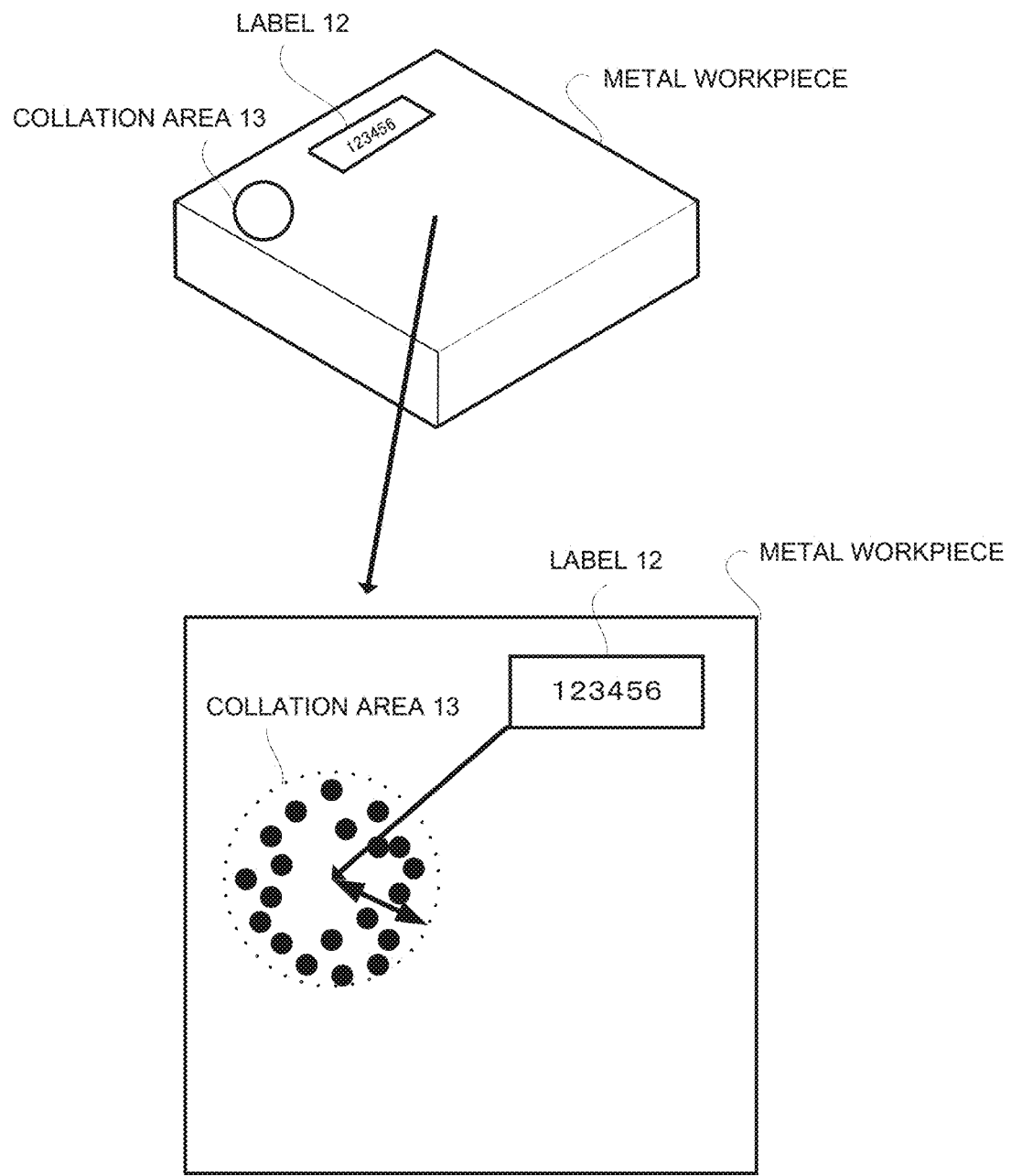
FIG. 3 illustrates another reference section and collation area.

FIG. 3 illustrates another example. In FIG. 3, a label 12 attached to a metal workpiece is set to the reference section. For example, the metal workpiece is subjected to press working, and an inside of the recessed portion (i.e., a portion lower than the adjacent portion resulted from the press working) is set to a collation area 13 existing at a standard position relative to the label 12. In FIG. 3, also, since the label 12 is commonly attached to every product, it is easy to detect the label 12. Also, even if the collation area 13 is positioned away from the label 12, only with the detection of the label 12, the collation area 13 positioned relative to the position of the label 12 can also be detected. For example, referring to a lower left top of the label 12 as a reference point, a position X mm away from the lower left top downwardly by 45 degrees is defined as a center of the collation area 13. The position and a size of the collation area 13 may be defined and stored in advance in such a manner that a circular area having a radius of r mm from the center is set to the collation area 13.

Further, the image feature of the registered product may be stored after the image feature of the registered product is associated with manufacturing information including a factory name, a producer name, a lot number, a production date, and quality information, and management information including a shipping point, a ship date, and distribution information of the product. This enables acquisition of also management information of the collated product. Thus, this also enables distribution management and quality control of the product.

The imaging unit 4 and the to-be-collated product feature extraction unit 5 belong to a person who performs collation of the product, e.g., a retailer, a distribution manager, and a consumer and are configured similarly to the imaging unit 1 and the product feature extraction unit 2, respectively.

A collation/retrieval unit 6 collates the image feature of the collation area of the product to be collated, extracted by the to-be-collated product feature extraction unit 5, with the image feature of the registered collation area stored in the storage unit 3. As a result, if a matching point is found therebetween, the collation/retrieval unit 6 determines that the product to be collated is the registered product. Here, collation of the image feature is performed in the following manner. For example, considering an end point, an intersection point, and corners of the line of the surface pattern as the feature points, an arrangement of the feature points are collated. If the number of arrangements of the feature points of which positions are matched (i.e., within a range of a certain threshold) is equal to or more than a predetermined number, the collation/retrieval unit 6 considers it as the same product. Such collation technology can employ the known fingerprint matching technology.

As described above, according to this embodiment, a collation determination of the product can be performed without use of a specific tag. At the same time, distribution of the product duly delivered from the producer and/or the distributor of the product can be controlled. As a result, fraud on the product such as an evil replacement of the product can be eliminated or reduced. Furthermore, it is unnecessary to read/write information on the product in the tag. Therefore, there is no need for a device to perform them.

Specifically, a portion having a pattern common to the products of the same kind is set to the reference section, and a portion or a whole of the recessed portion (i.e., the portion lower than the adjacent area) existing at the standard position relative to the reference section of the product is set to the collation area. A difference of the surface design in the collation area of the product is used in collation. This facilitates detection of the collation area. The recessed portion (i.e., the portion lower than the adjacent area), as the collation area, is more scratch-resistant and stain-resistant than the other portions, i.e., is advantageous in keeping a pattern, such as a surface design and minute unevenness within the area for collation/retrieval.

Further, if the manufacturing information including a production site, a factory name, a producer name, a lot number, a production date, and quality of the product, and the distribution information including a shipping point and a ship date of the product are associated with the image feature of the product in a corresponding manner to be stored, for example, the consumer is capable of also obtaining history information of the product.

Now, the management information retrieval system using the collation system according to the above described embodiment will be described below. The management information retrieval system of this embodiment is made to satisfy a demand for retrieving management information about a lot number of the product and a line number of the production site in the case where the system extracts a product from many products to perform a quality test of the product in a manner similar to the acceptance sampling of the factory.

Figure 4:
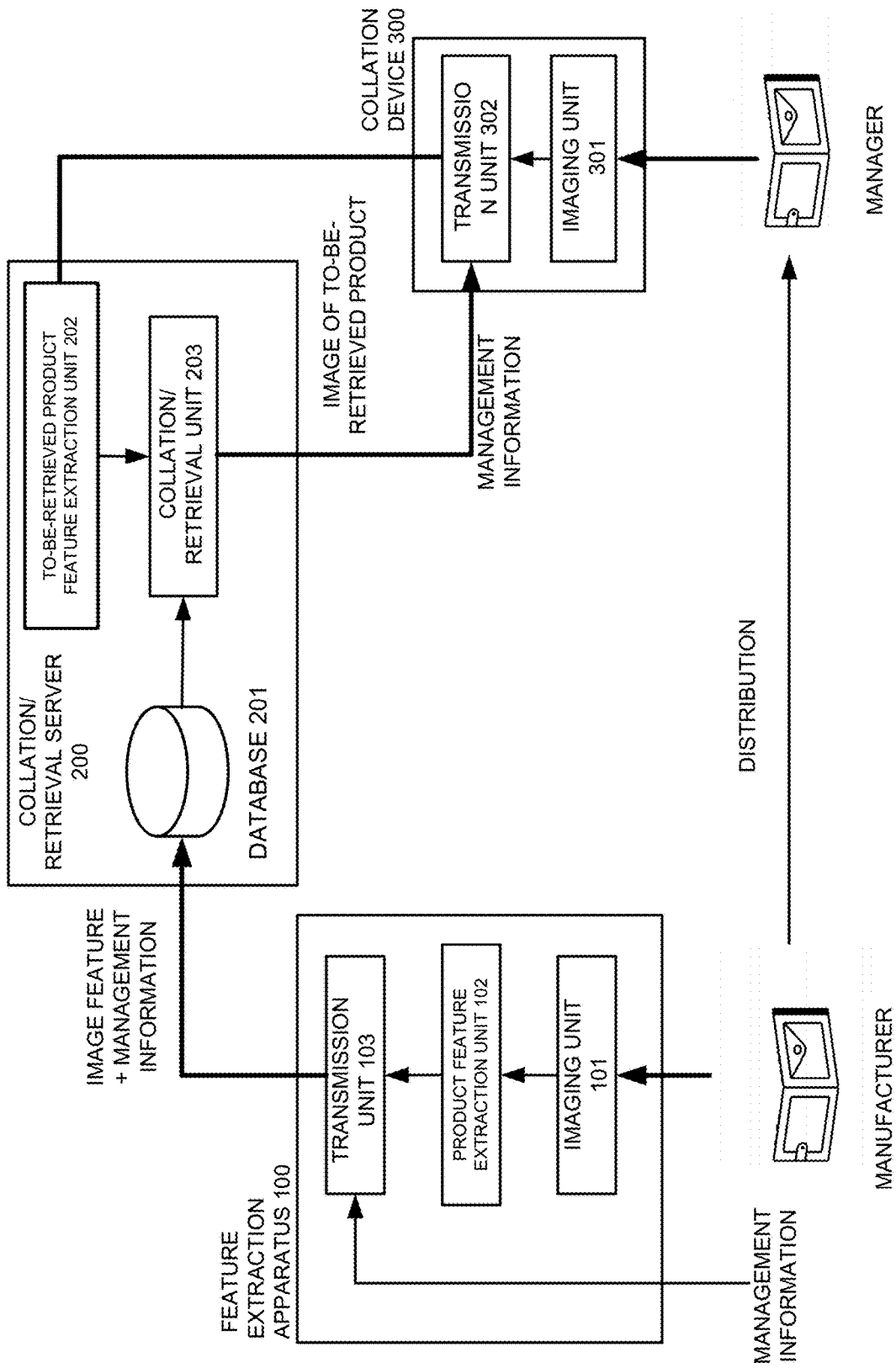
FIG. 4 is a block diagram of a management information retrieval system according to the embodiment.

FIG. 4 is a block diagram illustrating the management information retrieval system. As shown in FIG. 4, the management information retrieval system includes a feature extraction apparatus 100 belonging to a side of a leather wallet manufacturer, a collation/retrieval server 200 performing collation, and a collation device 300 belonging to a side of the quality control authority.

The image feature extraction apparatus 100 includes an imaging unit 101, a product feature extraction unit 102, and a transmission unit 103. The imaging unit 101 and the product feature extraction unit 102 are configured similarly to the above described imaging unit 1 and the product feature extraction unit 2, respectively. The transmission unit 103 transmits the image feature of the collation area of the wallet extracted by the product feature extraction unit 102 and the management information (including a production site, a producer name, a lot number, a production date, and quality information) for the collation thereof.

A collation server 200 includes a database 201, a to-be-retrieved product feature extraction unit 202, and a collation/retrieval unit 203. The to-be-retrieved product feature extraction unit 202 and the collation/retrieval unit 203 are configured similarly to the above described to-be-collated product feature extraction unit 5 and the collation/retrieval unit 6, respectively. The database 201 stores the image feature of the collation area of each wallet of the products transmitted from the image feature extraction apparatus 100 belonging to the side of the producer after the image feature is associated with the management information of the wallet.

A collation device 300 includes an imaging unit 301 and a transmission and reception unit 302. The imaging unit 301 is configured similarly to the above described imaging unit 4. The transmission unit 302 transmits an image of the wallet captured by the imaging unit 301 to the collation server 200. Also, the transmission unit 302 receives a retrieval result from the collation server 200.

Now, an operation of the above described configuration will be described below. First, a registration operation of the image feature of the surface design in the collation area of the wallet will be described.

The producer registers in advance, while the portion marked and thus recessed (i.e., that is lowered more than the adjacent area) on the logotype 10 is set to the collation area, the image feature of the logotype 10 marked on the wallet as illustrated in FIG. 2 and the position of the collation area in the product feature extraction unit 102.

Next, an imaging unit 101 captures an image of the surface of the wallet including the logotype 10 and the collation area determined with reference to the logotype 10.

The product feature extraction unit 102 detects the logotype 10 from the captured image of the wallet and extracts the image feature of the surface design of the recessed portion in the collation area determined with reference to the detected logotype 10. At this time, the product feature extraction unit 102 normalizes the collation area determined with reference to the logotype 10 based on the position and the posture of the logotype 10 on the image to extract the image feature of the normalized collation area.

The producer inputs the management information (e.g., information about a production site, a producer name, a lot number, a production date, and quality information) of the wallet thus captured into the image feature extraction apparatus 100. Then, the transmission unit 103 transmits the image feature of the wallet and the management information of the wallet to the collation server 200. This processing is repeated for the number of products the producer desires to register.

In the collation server 200, the image feature of the wallet and the management information of the wallet from the image feature extraction apparatus 100 belonging to the producer are registered in the database 201.

Now, an operation of the retrieval processing will be described below.

An administrator captures an image of the surface design of the wallet corresponding to the collation area including the logotype 10 by the imaging unit 301 of the collation device 300 in order to perform collation of a wallet to be collated. The captured image is transmitted to the collation server 200 by the transmission and reception unit 302.

A to-be-retrieved product feature extraction apparatus 202 of the collation server 200 detects the logotype 10 of the wallet to be retrieved from the received image by a method similar to the above described one to extract an image feature of the surface design of the collation area from the detected logotype 10. Then, the to-be-retrieved product feature extraction apparatus 202 outputs the extracted image feature to the collation/retrieval unit 203.

In the collation/retrieval unit 203, an image feature having the highest similarity to the received image feature of the product to be retrieved is retrieved from the image features registered in the database 201. Then, the collation/retrieval unit 203 reads out the management information associated with the image feature to transmit the same to the collation device 300. Here, the collation/retrieval unit 203 is not configured such that the image feature having the similarity more than a predetermined threshold is retrieved in order to perform the collation such as the authenticity determination, but is configured such that the image feature having the highest similarity to the image feature of the product to be retrieved is retrieved from the image features registered in the database 201. This is because, during the quality test, a fake product is least likely to be contaminated. In other words, the authenticity determination processing that strictly checks the possible fake product against a genuine product is not needed here.

The collation device 300 receives the management information from the collation server 200 and notifies the received management information to the administrator.

According to this embodiment, as described above, even without specific equipment, the administrator can retrieve the management information of a specific product among a lot of products.

Meanwhile, in the above described embodiment, the product feature extraction unit 102 initially extracting the image feature of the product has been illustrated as being disposed on the device belonging to the producer. It is also possible for the to-be-retrieved product feature extraction unit 202 of the collation server 200 to share the roll. In this case, the image of the collation area of the product is transmitted from the side of the producer.

Figure 5:
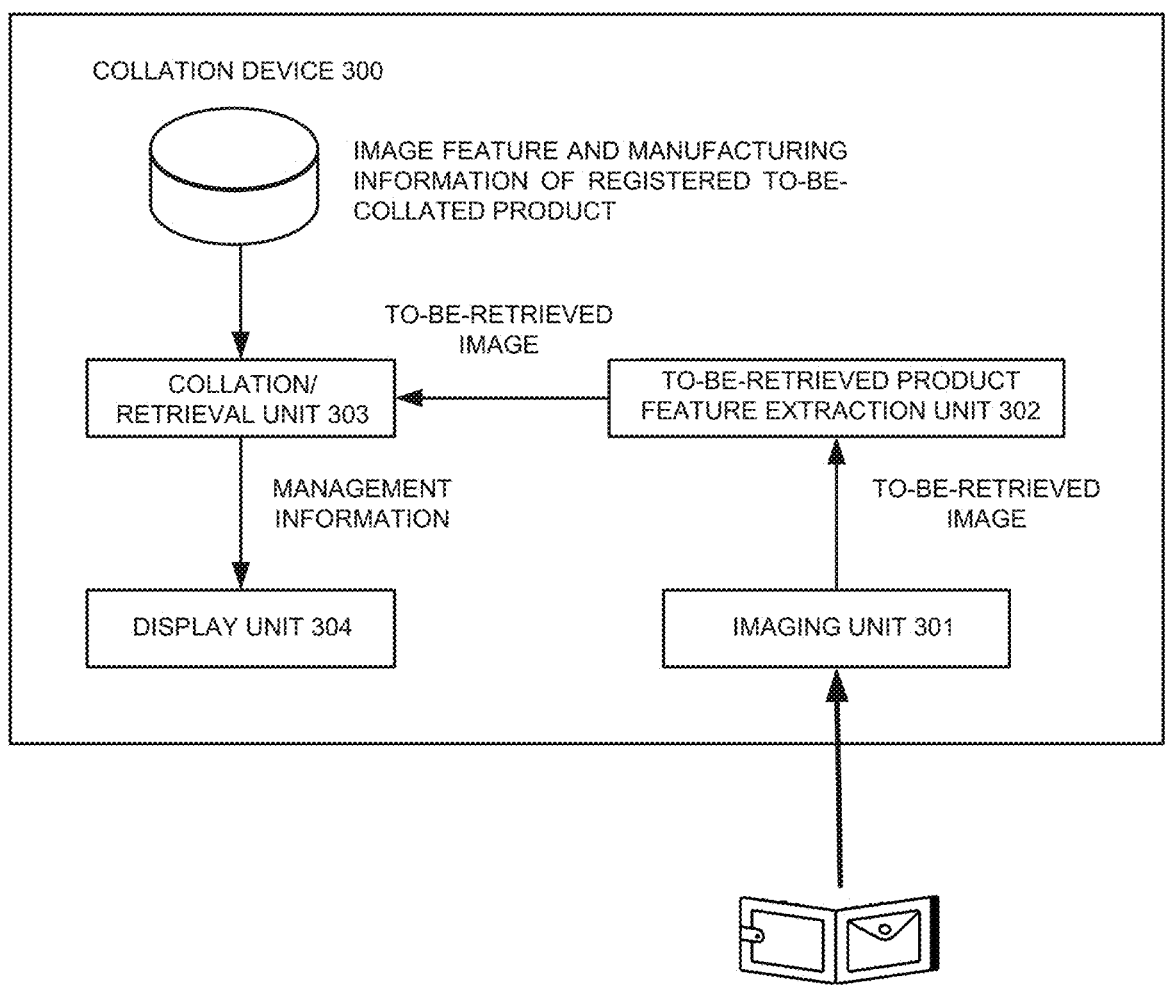
FIG. 5 illustrates a terminal device retrieving management information.

Further, the above described embodiment has been illustrated as performing the retrieval processing by the collation server 200 from the side of the administrator via communication. It is also possible to down load in advance features and management information of the surface design of the leather product from a database, e.g., the database 201 registering the image feature of the surface design and management information of the leather product, to perform the retrieval processing without using the communication. Such management information retrieval apparatus includes, as shown in FIG. 5, a storage unit 300 storing the image feature of the surface design and the management information of the registered leather product registered by, for example, the producer, the imaging unit 301, the to-be-retrieved product feature extraction unit 302, a collation/retrieval unit 303, and a display unit 304. The imaging unit 301, the to-be-retrieved product feature extraction unit 302, and the collation/retrieval unit 303 are configured similarly to the above described imaging unit, the to-be-retrieved product feature extraction unit, and the collation/retrieval unit, respectively. The display unit 304 displays, for example, the management information of the collation/retrieval unit 303.

Embodiment 2

In above mentioned embodiment, individual difference of minute unevenness in the surface of a product is utilized for authentication and collation. For this case, it is necessary to get the captured image which it is stable, and can extract the same feature point each time of registration time and collation time after registration in order to get a stable collation result. There is a need for an image apparatus capable of acquiring the image in which an emphasized contrast of minute surface unevenness of object.

Exemplary embodiments of the present invention relates to an imaging aid and an imaging device imaging minute concave and convex portions of a surface design of an object. Exemplary embodiments of the present invention are detailed as follows.

Figure 6:
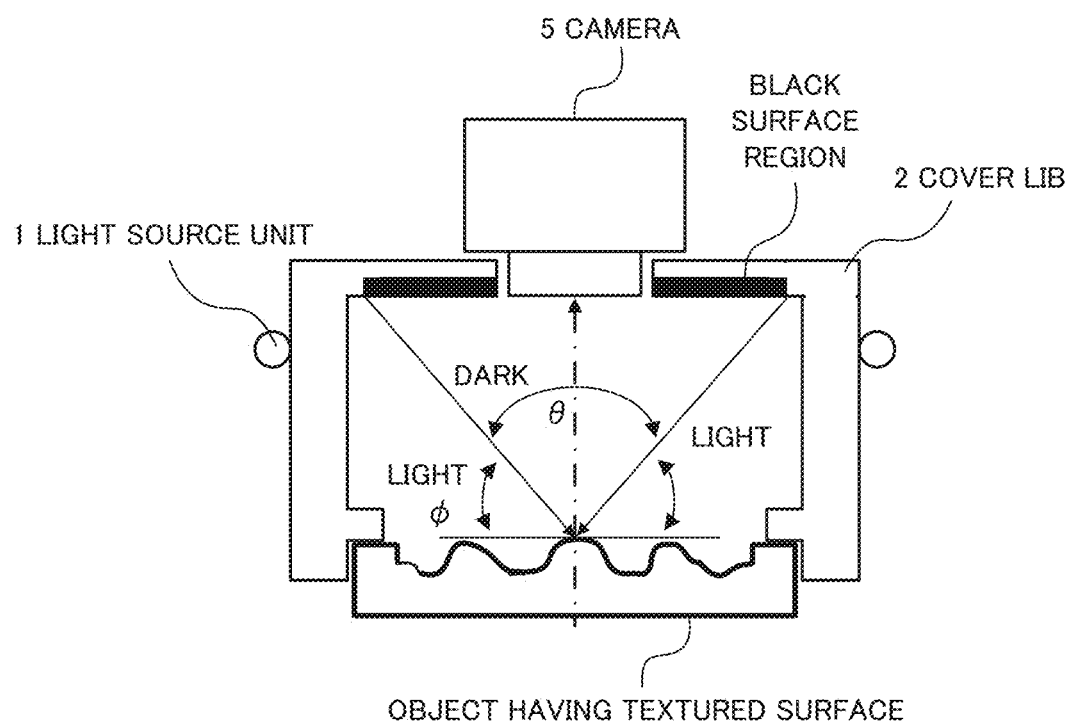
FIG. 6 is a diagram explaining an overview of the present invention.

The overview of the present invention is described with reference to FIG. 6. An imaging aid according to an exemplary embodiment of the present invention is an imaging aid aiding imaging of a predetermined region of a surface having minute concave and convex portions and being subject to intense specular reflection (e.g., a textured surface having a textured pattern), of an object, and includes a light source unit 61 irradiating light, and a cover lid 62 having a shape to cover a predetermined region of a surface of an object, a part of a surface of the cover lid 62 corresponding to a predetermined angular range from the normal line direction directly opposing the predetermined region being black and absorbing light, and another surface of the cover lid 62 corresponding to another angular range is formed by a light-source surface diffusing and emitting light irradiated from the light source unit 61. It is possible to use the macro lens built-in camera, mobile phone, or smartphone, etc. attached to such an imaging aid.

For example, the cover lid 62 is formed to be parallel to the textured surface, is provided with an imaging hole through which image capturing is performed from the normal line direction of the textured surface, and includes an upper portion having a region opposing the textured surface being black, and a side portion formed to be vertical to the upper surface and made of a material diffusing light of the light source unit 61.

The black surface region of the cover lid 62 is determined by the angular range of a dark region $\theta$ and the angular range of a light region $\phi$ with respect to the normal line of a surface in a verification region of the textured surface of an object (e.g., top surface of the convex portion at the center of the verification region). In this way, the distribution of the black surface and the diffusing surface is determined solely by the angular range with respect to the normal line direction of the textured surface, and its form and angle of the surface is arbitrary. In other words, although the diffusing material's surface is explained to be vertical to the black surface in the above, this is one example, and its form and arrangement angle are arbitrary. The black surface may not also be plane, and may have an arbitrary form as long as it covers all the range of the angle $\theta$ from the normal line direction of the textured surface.

Since the black surface region of the cover lid 62 does not reflect the illumination light from the light source unit 1, the top portion of the convex portion of the textured surface directly opposing the camera mounted to the imaging hole of the upper surface is imaged to be black. As shown in FIG. 7, there is a relation between the size of the black surface region of the cover lid 62 and the angular range $\theta$ of the dark region, such as the larger the angular range $\theta$ of the black dark region, the larger gets the black surface region of the cover lid 62, and as the smaller the angular range $\theta$ of the dark region, the smaller gets the black surface region of the cover lid 62. As the larger the black surface region of the cover lid 62, the portion of the textured surface imaged to be black gets larger, and as the smaller the black surface region, the portion of the textured surface imaged to be black gets smaller. In the present invention, the angular ranges $\theta$ and $\phi$ are adjusted so that the number of black pixels in the verification region in the captured image of the textured surface or the degree of separation of the brightness value of the pixels in the verification region is a predetermined value (e.g., 25%). Specifically, the size of the black surface region of the cover lid 62 may be changed, or the height of the side surface of the cover lid 62 may be changed. Various methods can be used to achieve this result. In one example, a screw mechanism for moving up and down the black surface region is included, and the height of the side surface of the cover lid 62 can be adjusted by rotating the screw mechanism. This is just one example, and other methods can also be used.

Since the actual sizes of the textured surface's concave and convex portions vary depending on the parameters used at the time of processing the authentication target, the angular ranges θ, φ are adjusted to obtain a black surface region of an adequate size, thereby optimizing the brightness distribution of the image to be captured. Note that a brightness value which yields the maximum first derivation of the brightness change histogram is used for the threshold value for binarization.

Accordingly, the top portion of the convex portion of the textured surface having the normal line in the direction directly opposing the camera will be imaged to be black, and the concave portion of the textured surface not directly opposing will be imaged to be white as a result of reflection of light from various directions. As a result, dark and light contrast in the concave and convex portions in the obtained image is emphasized, and it becomes easy to stably extract the top portion as the feature point from the image.

FIG. 8 shows an example of binarized image of the textured surface imaged by using the invention of the present application and binarized image of the textured surface imaged not using the invention of the present application. In Example 1 imaged not using the present invention, the concave portion of the verification region is also imaged to be white, and the feature point cannot be found therein. In another example (Example 2) imaged not using the present invention, it is difficult to set the threshold value used in binarizing the captured image, and the feature point changes by change in threshold value. As opposed to them, Example 3 obtained by imaging the textured surface using the present invention has a high degree of separation between the concave portion and the convex portion of the obtained image. Therefore, the feature point of the binarized image is stable and not vulnerable to even a small change in threshold value of binarization. In addition, even when the object is not firmly fixed when imaging the object and the orientation of the textured surface is minutely changed, if the angle is sufficiently smaller than θ, the top portion can still be always clearly extracted as the dark region, which means that the feature point can be stably extracted.

Exemplary Embodiment 2-1

Figure 9:
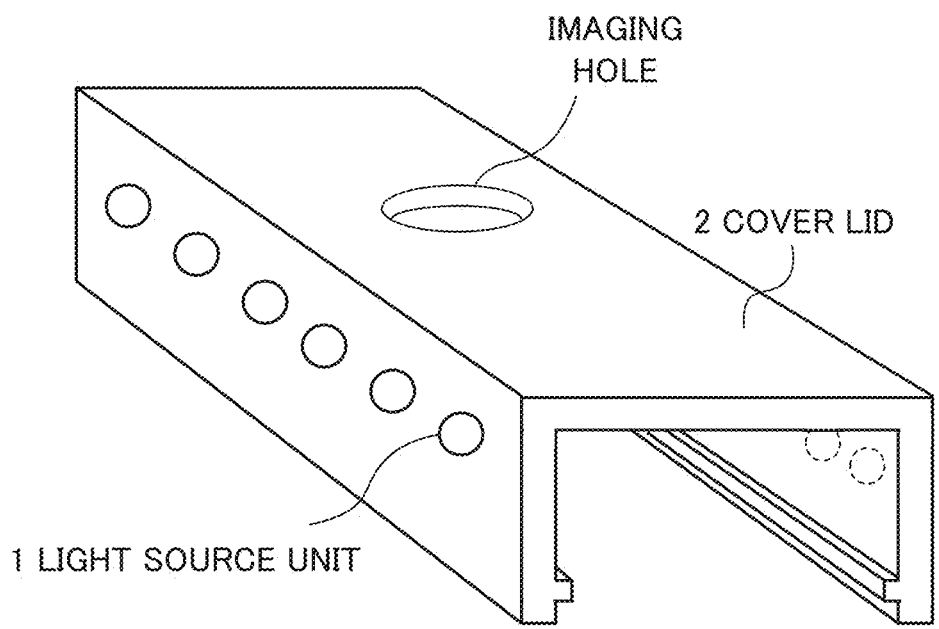
FIG. 9 is a diagram showing a configuration of an imaging aid according to a first exemplary embodiment of the present invention.

FIG. 9 shows a configuration of an imaging aid 60 according to the exemplary embodiment 2-1 of the present invention.

The imaging aid 10 according to the exemplary embodiment 2-1 includes the light source unit 61 and the cover lid 62 described above. The imaging aid 60 is formed to fit to the textured surface side of the object which is an imaging target, and to cover the textured surface. The inner surface of the upper portion of the cover lid 62, i.e., a part of the surface opposing the textured surface when fit to the object to be imaged is a black surface.

Figure 10:
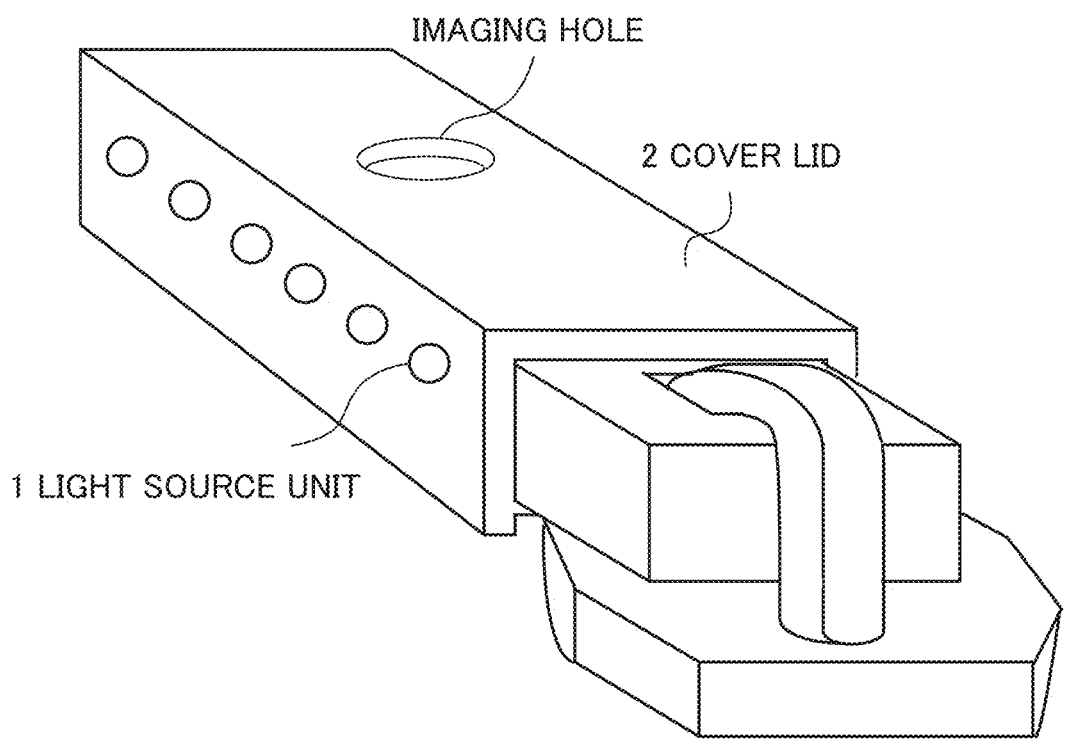
FIG. 10 is a diagram exemplifying a state in which an object is fit to the imaging aid according to the first exemplary embodiment.

By causing the object to fit the cover lid 62 of the imaging aid 60, the position and posture of the object is fixed. The object includes such parts as a fastening part, a slide fastener, a bolt, a nut, an emblem, or the like. FIG. 10 shows an example showing a state in which the object is fit to the imaging aid 60. In this example, the object is a slide fastener. In the state in which the object is fit in the imaging aid 60 in this way, a camera mounted in the imaging hole of the cover lid 62 is used to image the textured surface of the object. Since the black surface region inside the cover lid 62 does not reflect the illumination light from the light source unit 61, the top portion of the convex portion of the textured surface directly opposing the camera mounted to the imaging hole on the upper surface will be imaged to be black. Moreover, the concave portion of the textured surface not directly opposing the camera will reflect light from various directions and be imaged to be white. Consequently, the obtained image will have emphasized contrast between dark and light in the concave and convex portions.

The verification region of the textured surface is not particularly limited as long as it is a region having a textured pattern. However, desirably, the verification region is predetermined so that the verification becomes easy. In an example, the verification region may be determined to be a region at a position determined with reference to a reference portion of an article in common. For example, the reference portion of an article may be a trademark, a logo, a manufacturer's name, a manufacturing company, a brand name, a product name, a product number, or the like, of the product, which is attached, printed, impressed, marked with a hot iron on the article. These reference portions have the same pattern throughout items of the same article or product, and have a characteristic appearance. By determining the position and posture of these reference portions as a reference, and memorizing the characteristics thereof, the verification region of an article can be automatically detected.

Figure 11:
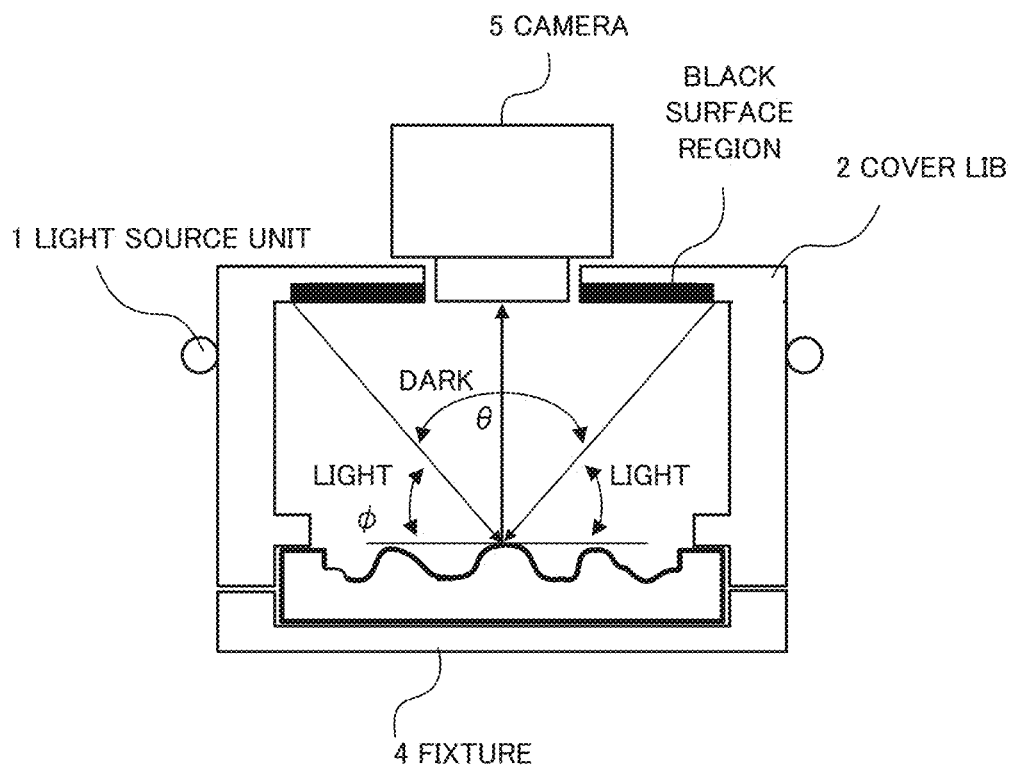
FIG. 11 is a diagram showing a modification example of the imaging aid according to the first exemplary embodiment.

Note that the imaging aid device 60 may further include a fixture 64 fixing the object fit to the cover lid 62 by sandwiching it from below as shown in FIG. 11.

Figure 12:
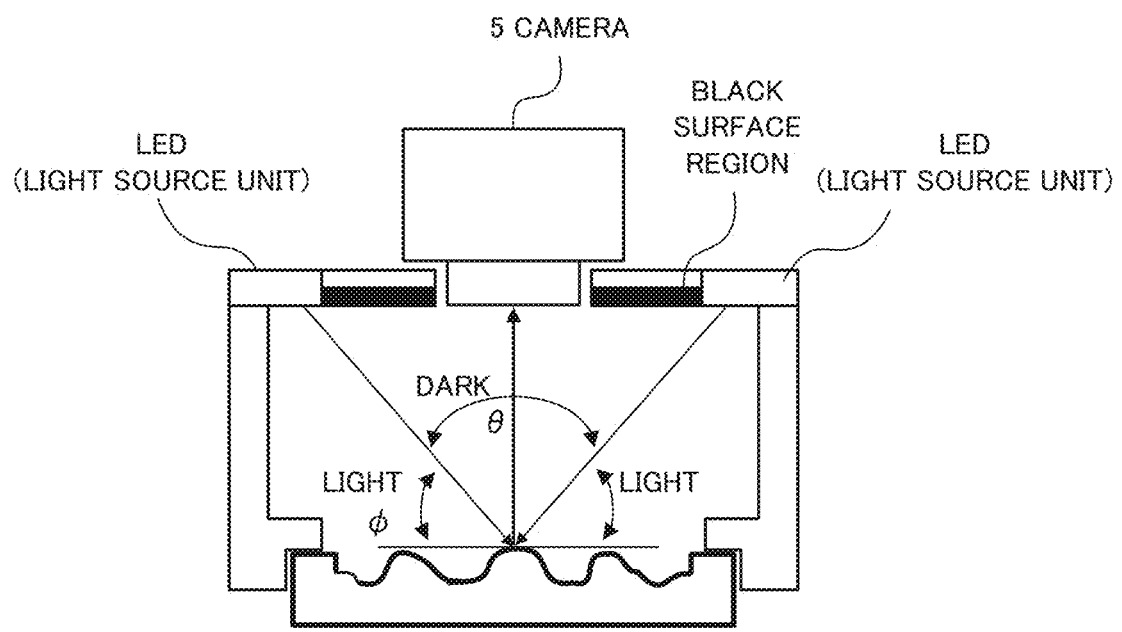
FIG. 12 is a diagram showing a modification example of the imaging aid according to the first exemplary embodiment.

Also as shown in FIG. 12, a light source unit 61 may be provided on the upper portion of the cover lid 62. In this case, the side portion may be formed by a material reflecting irradiated light (e.g., the inner side may be white).

Figure 13:
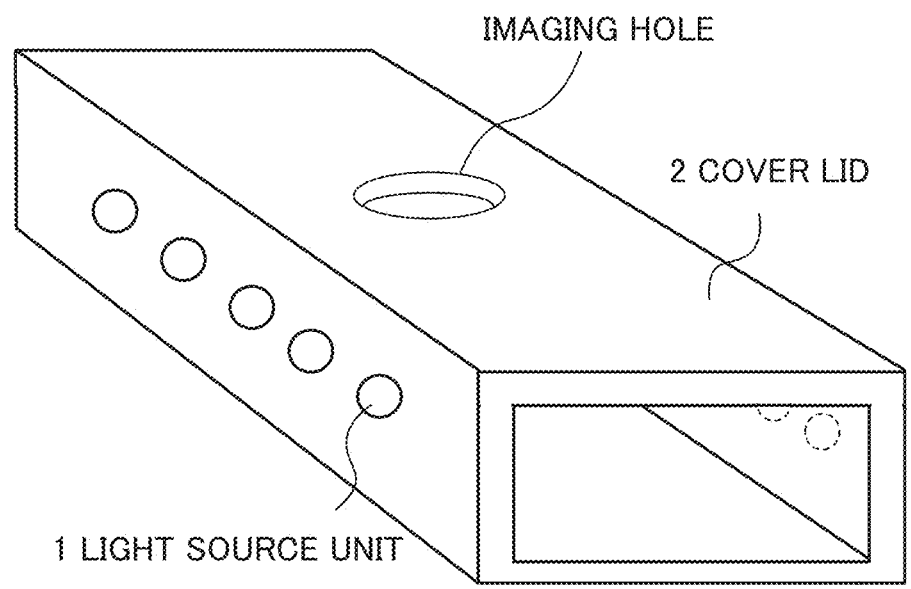
FIG. 13 is a diagram showing a modification example of the imaging aid according to the first exemplary embodiment.

Although an object is fit in the exemplary embodiment 2-1 described above, the present invention is not limited to this. It is possible to configure so that an object be inserted deep in the inner wall of the imaging aid as shown in FIG. 13. Such configurations as exemplified by these modification examples can also achieve effects similar to those of the above-described first exemplary embodiment.

The black surface region of the cover lid 62 may be configured to be replaceable. It is possible to configure so that the size (angular ranges of dark region θ and light region φ) of the black surface region for each type of object is memorized in the memory device in advance, and switch the size of the black surface region by replacing the imaging aid or the like for each type of object to be imaged. Accordingly, various types of articles can be authenticated with the highest quality.

Regarding the setting of size of the black surface region (setting of angular ranges of dark region θ and light region φ), the number of black pixels in the verification region of the captured image of the textured surface was explained to be 25% of the entirety for example. However, this numerical value is an example, and it is possible to use an optimal value that can achieve the highest authentication quality, which has been obtained through experiments in advance.

In addition, the predetermined optimal value may be defined for each type of article to be verified, respectively. So as to switch the predetermined value, the article can be identified by the shape and design of the reference portion of the article, and the size of the black surface region can be adjusted so as to yield the value determined for the article.

Exemplary Embodiment 2-2

Figure 14:
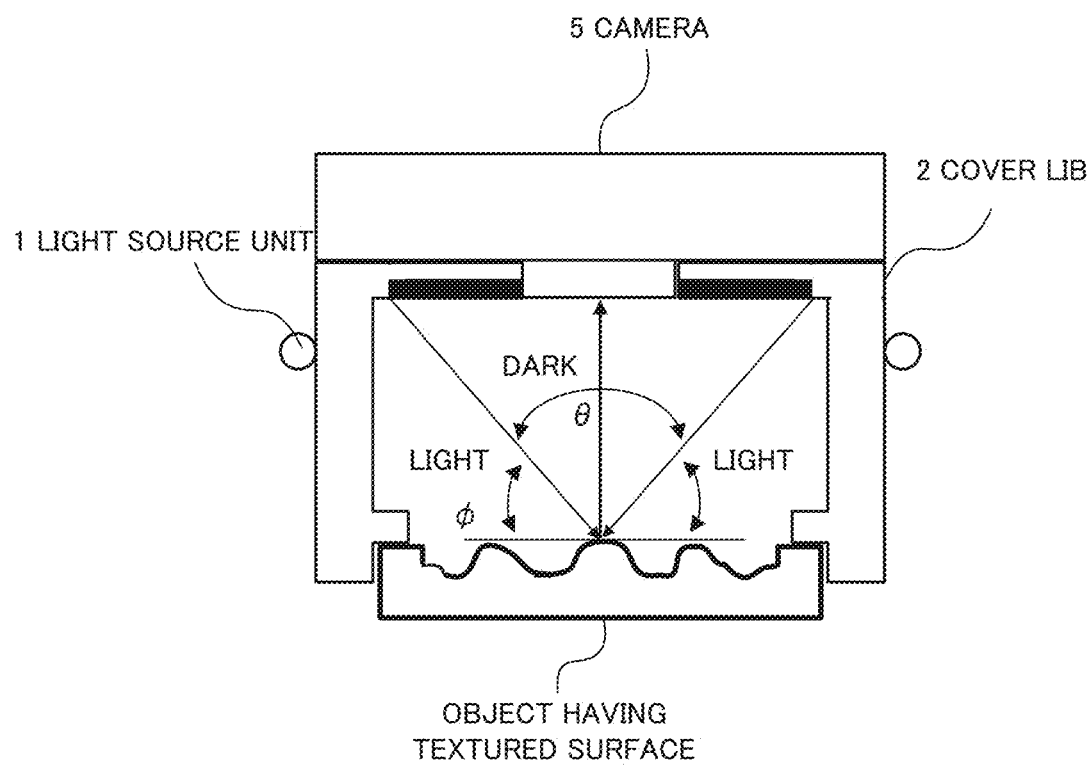
FIG. 14 is a diagram showing a configuration of an imaging device according to a second exemplary embodiment of the present invention.

FIG. 14 shows a configuration of the imaging device 66 according to the exemplary embodiment 2-2 of the present invention. The imaging device 66 according to the exemplary embodiment 2-2 is configured by the imaging aid 60 of the exemplary embodiment 2-1 and a camera 5 that are integrally formed, and the camera 65 is fixed to the imaging hole provided for the cover lid 62 of the imaging aid 60. This camera 65 images the textured surface of an object. The camera 65 may include a micro-lens.

According to the described configuration, the exemplary embodiment 2-2 can achieve a similar effect to that of the exemplary embodiment 2-1.

Note that the mechanism for capturing an image of a textured surface from the normal line direction is not limited to providing the cover lid with an imaging hole to mount the camera. For example, it may be provided a half mirror and configured to capture an image of a textured surface through this half mirror. Further, in the above embodiment, the configuration including the light source section 61 has been described.

However, by using a semitransparent diffusing material without constituting this light source unit 61, it may be possible to maintain a predetermined lighting condition while ensuring uniformity of illuminance. However, instead of this light source unit 61, a translucent diffusion material may be used. Thereby, uniformity of illuminance is secured, and predetermined lighting conditions are maintained.

Embodiment 3

In above mentioned embodiments, when a captured image of a collation area is acquired, it is necessary to stably extract the same feature point.

This embodiment explains a mobile terminal including a camera function that acquiring the captured image in which stably extract the same feature point. This embodiment of this invention is explained in detail as follows.

FIG. 15 is a configuration diagram illustrating mobile terminal in this embodiment of present invention. The mobile terminal includes a light source unit 61, a camera unit 152, a display unit 153, and a control unit 154. The control unit 154 superimposes the reference image on the through image displayed on the display unit 153 and displays it.

This reference image is an image for capturing a collation area in a state where the relative position/posture between the light source unit 61, the camera unit 152, and the collation area including the textured pattern of the object satisfies a predetermined relationship when the user images the collation area of the object.

The mobile terminal 150 is a device such as a smartphone, a mobile phone, a tablet, etc., and has a normal camera function.

The light source unit 61 is an LED (Light Emitting Diode) or the like, and is lighting during camera shooting. The camera unit 152 includes a lens and an image sensor elements, a controller for controlling the entire camera unit, and the like.

The display unit 153 includes a liquid crystal display or the like.

The control unit 154 controls the entire mobile terminal.

The through image is an image in which generated based on the output signal of the image sensor elements and is displayed on the liquid crystal display while the camera of the mobile terminal 150 is operating in the photographing mode.

The through image is also called a preview image or a live view image.

Figure 16:
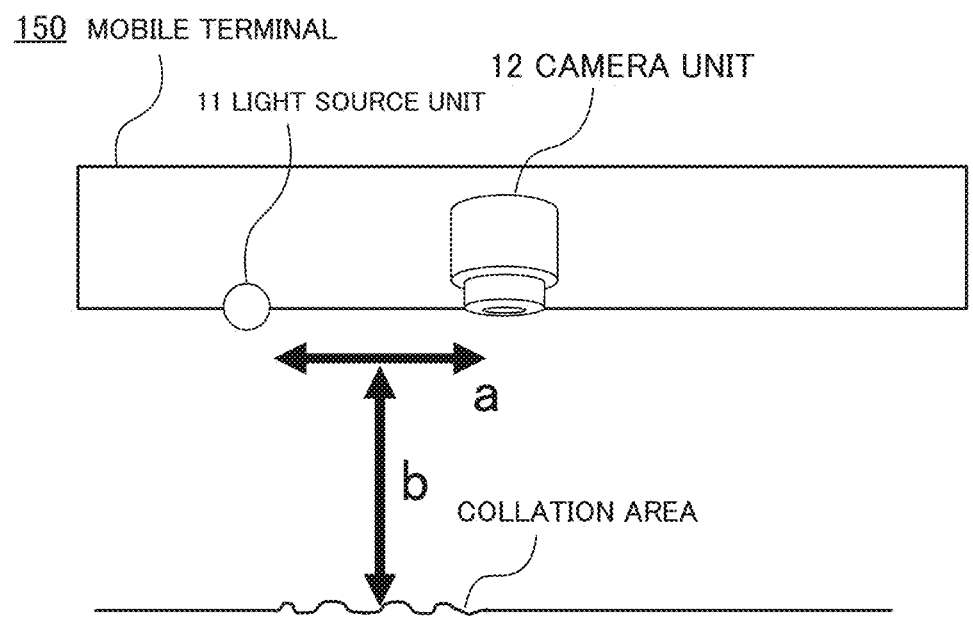
FIG. 16 is a diagram explaining a relative position attitude between the light source of the portable terminal and the camera and the collation area.

A viewing angle of the camera is determined by the number of pixels and the size of the image sensor elements of the camera, the focal length of the lens, and the like. The position of the light source of the mobile terminal, the number and size of pixels of the image sensor elements of the camera, the focal length of the lens and the like are different depending on the model of the mobile terminal. Therefore, the arrangement of the illumination at the time of shooting and the viewing angle of the camera also differ depending on the model of the mobile terminal. The present invention acquires in advance the image by shooting the matching area of the object with the same shooting condition (the irradiation direction and the shot image size is the same) among mobile terminals having different arrangement of illumination and view angle of the camera. Then, the control unit 154 acquires an image corresponding to the mobile terminal among the previously acquired images. An image acquired at the time of shooting is superimposed and displayed as the reference image on the through image. The user operates on the display so that the direction, the position and the size of the collation area of the target and the reference image match. As a result, the relative position attitude between the light source of the portable terminal and the camera and the collation area (the relationship between a and b in FIG. 16) is in the same relation as the reference image at the time of shooting. That is, it is possible to image the collation area of the object under the same shooting condition even among mobile terminals having different arrangement of lighting of the camera and viewing angle.

The image of the collation area shot in advance under the same shooting conditions among the different portable terminals is stored in the storage unit such as the memory of the mobile terminal. The stored image may be read and used by the control unit 154 from the storage unit at the time of shooting. The database in which images corresponding to various mobile terminals are associated with information (model type dependent information) such as the position of the light source of the mobile terminal, the pixel of the imaging device or the size, and the focal length of the lens, may be stored in the storage unit of the mobile terminal. In this case, the control unit 154 reads an image corresponding to the model type dependent information of the mobile terminal 150 from the database.

Figure 17:
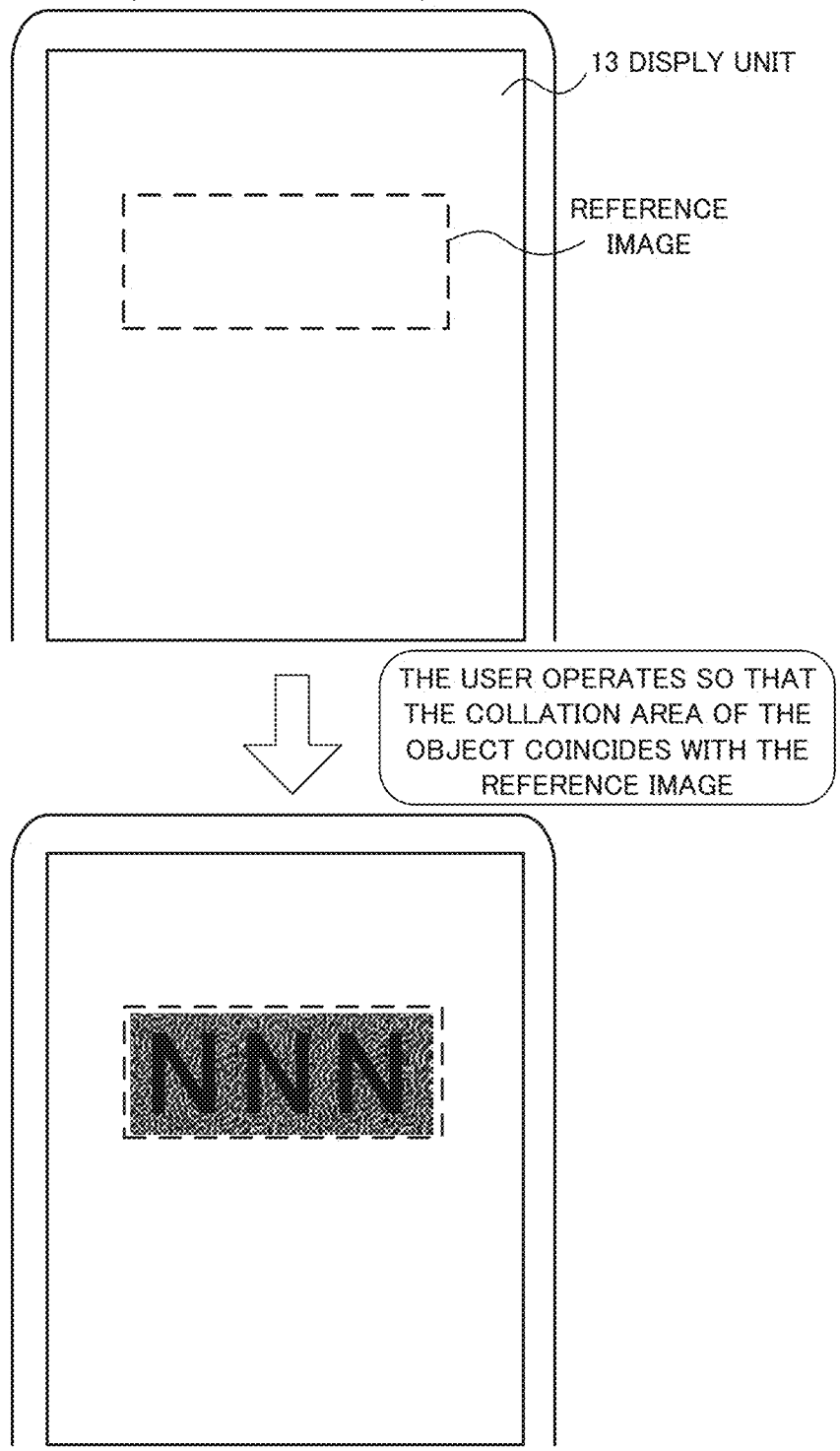
FIG. 17 is a diagram showing an exemplifying of a display screen on which a reference image is displayed.

The display form of the reference image on the display unit 153 is arbitrary. For example, an image captured in advance may be transparently displayed. Further, the contour line of the portion corresponding to the collation area in the previously captured image may be extracted and displayed. FIGS. 17 and 18 show examples of display on the mobile terminal of a different model when the reference image is the contour line of the portion corresponding to the collation area. As shown in FIG. 17, in a mobile terminal of a certain model, the reference image is displayed in, for example, landscape orientation. The user operates so that the matching region of the object matches the reference image displayed horizontally. Further, as shown in FIG. 18, in a mobile terminal of another model, the reference image is displayed in, for example, portrait orientation. The user operates so that the collation area of the object matches the reference image displayed vertically.

The collation area of the object is not particularly limited as long as it is a textured pattern area. However, in consideration of ease of verification, it is desirable to preliminarily define a collation area. It is conceivable that the collation area is a region of a position determined with reference to the reference part commonly present in a product. For example, the reference part of the product is the trademark, logo, manufacturer name, manufacturer, brand name, product name, product number, etc. of the product affixed, printed, engraved, and branded on the product. These reference parts possess the same pattern regardless of individuals if they are the same product, and they have a characteristic appearance on the appearance. Then, the position attitude of these reference parts is determined as a reference, the feature is stored, and the image of the reference part that has been shot in advance is transparently displayed, so that the user can display the image of the reference part at the reference part of the object operate to match. By doing this, it is also possible to automatically detect the collation area of the product.

The textured pattern includes, for example, not only a case where the textured pattern is formed as a design, but also a case where the textured pattern is intentionally formed in a collation area for identification or verification of product. Furthermore, the textured pattern can be applied not only to a textured finish pattern applied by processing to a metal or a synthetic resin (plastic, etc.), but also to a wrinkle pattern obtained by surface treatment (for example, graining) to a leather product) and the like. For example, in the case of a leather bag which has been subjected to grained processing, minute irregularities are randomly formed on the surface of the leather bag, and these minute irregularities can be regarded as the same as the textured pattern.

Figure 19:
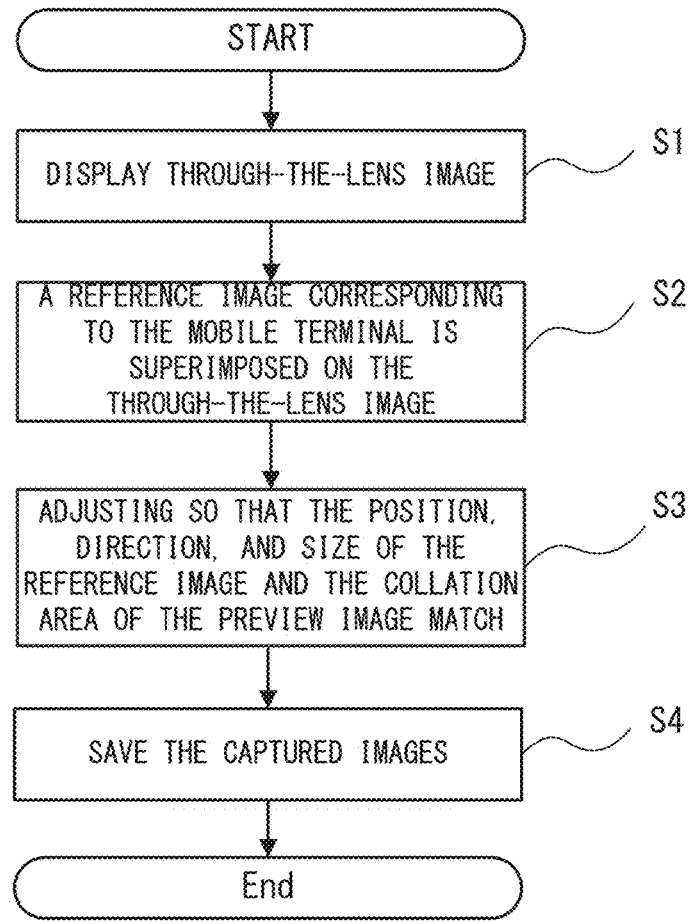
FIG. 19 is a flowchart for explaining the operation of the embodiment of the present invention.

Next, the operation of the embodiment of the present invention will be described with reference to FIG. 19.

The user instructs the execution of the collating area shooting process in the mobile terminal 150. The control unit 154 turns on the camera function and causes the liquid crystal display (display unit 153) to display the through image output from the camera unit 152 (S1). In addition, the control unit 154 reads the reference image corresponding to the mobile terminal 150 from the memory and superimposes the reference image on the through image displayed on the liquid crystal display (S2).

The user adjusts the direction, the position, and the size so as to match the collation area of the through image displayed on the display screen of the mobile terminal 150 and the reference image and presses the shutter button (S3). In response to this, the camera unit 152 performs photographing processing and stores the captured image data in the memory (S4).

In the present embodiment described above, an image obtained by shooting the collating area of the object under the same shooting condition is acquired in advance in each of mobile terminals having different arrangement of lighting and viewing angle of the camera. Then, when the collation area is captured, it is superimposed and displayed as the reference image on the live view image.

By shooting and matching the collation area of the live view image with the reference image on the display screen, it is possible for the user to be able to easily acquire the collate area of the object under the same shooting condition even among the mobile terminals with different lighting arrangement or camera viewing angle.

In S3 of the above described flow, the control unit 154 recognizes the collating area in the through image output from the camera unit 152 based on the predetermined reference position, and, based on the coordinates on the display screen, the zoom control may be performed automatically so that the recognized matching region and the reference image have the same size.

It is difficult to perfectly match the collation area of the through image with the reference image. Therefore, the control unit 154 recognizes the collation area in the through image outputted from the camera unit 152 based on the predetermined reference position. The camera unit 152 may be instructed to take an image at a point of time when the collation area of the through image is sufficiently close to the recognized reference image based on the coordinates on the display screen or the like.

Figure 20:
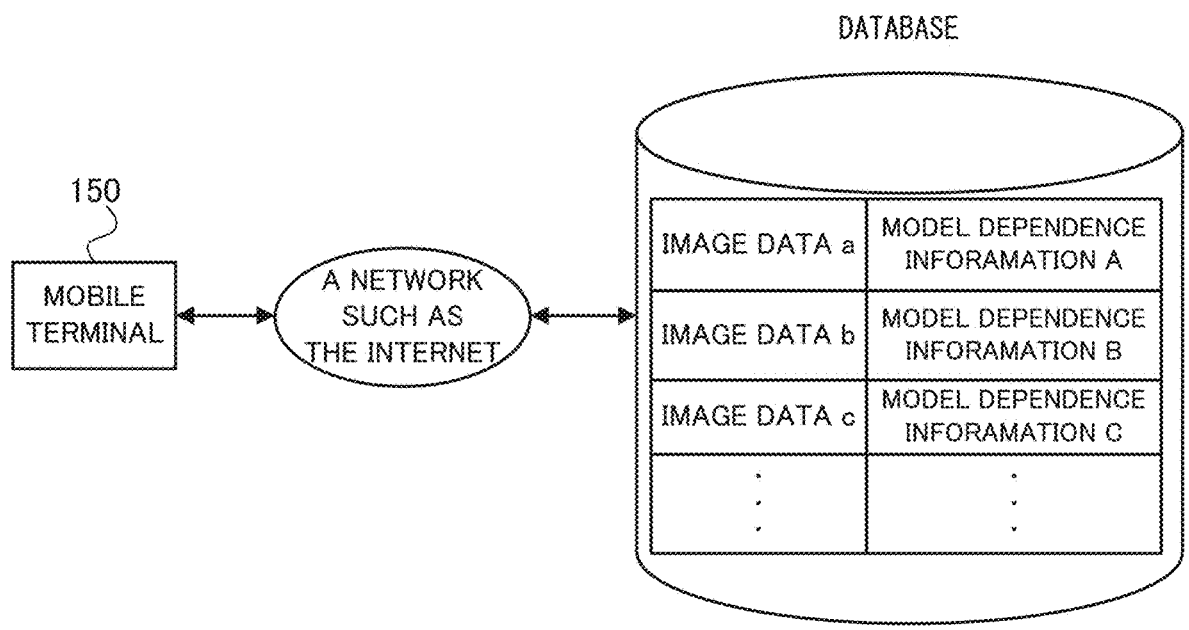
FIG. 20 is a diagram for explaining a process in which a mobile terminal downloads a reference image from a database via the network.

As shown in FIG. 20, the control unit 154 of the mobile terminal 150 downloads the reference image corresponding to the mobile terminal or the entire reference image from the database on the network such as the Internet, and stores those in the storage unit of the mobile terminal 150 may be used.

In the above description, an example in which the reference image and the model dependent information are registered in association with each other has been described. For example, the model dependent information such as the model name of the mobile terminal, the model code, and the like may be associated with the reference image in association with each other.

A method for obtaining a captured image using the image imaging aid and the image capturing apparatus in the second embodiment has been described. The method for obtaining the captured image with a simple operation even if the user does not have special skill with a general-purpose camera instead of the mobile terminal may be used. In this case, as shown in FIG. 21, the camera is brought into close contact with the commodity so that the irradiation direction from a light source such as commercially available LED light is parallel to the verification region. Guides the operator such that the collation region or the reference part matches the through-the-lens image displayed on the shooting screen of the portable terminal 150. The user adjusts the through-the-lens image displayed on the display screen of the mobile terminal 150 so that the collation area or the reference area overlaps and presses the shutter button. With such a configuration, even if the user does not have special skill and knowledge, it is possible to capture the collation area as a high-contrast image in the same shadow direction as that at the time of registration by a simple operation.

Embodiment 4

Embodiment 4 of the present invention will be described in detail with reference to the drawings. In the above described embodiment, an embodiment in which collation and retrieve for products are performed by using a difference in surface pattern (image pattern) in a collation area of a product has been described. In this embodiment, at least a part of a predetermined region on which a textured pattern is applied as a surface pattern is set as a collation region, and collating (identification) is performed using a textured pattern in the collation region. In addition, the same configurations as those of the above embodiment are indicated by the same reference numerals, and the detailed descriptions will be omitted. In the following descriptions, as an example, a case where the entire textured pattern applied to a fastener which is a component attached to a main body which is a casing constituting a major part of a product is set as a collation area, but need to be limited.

Embodiment 4-1

FIG. 22 is a configuration diagram illustrating of embodiment 4-1. The verification system of the present embodiment includes a storage unit 3 in which image features of a textured pattern in a collation area of a component are stored, image features of the textured pattern in a collation area of a component to be checked, image features of the stored satellite pattern and a collation/retrieval unit 6 for collating the product to be collated with each other.

Here, a component is a product attached to a main body which is a casing which constitutes a major part of a product produced by a manufacturer. The component is not particularly limited as long as it can specify the pattern of the predetermined region on the surface of the component. It is preferable that the part is subjected to low-cost surface processing which is not used as an application for verification or authenticity determination. Examples of the component include a fastener (a slide fastener, a hook and loop fastener, a snap fastener, a rail fastener, a buckle, a cord stopper, a belt adjuster, a loop clutch, a snap button, a button, and the like), a clasp (a caulking, an eyelet, a screw, a nail, a bolt, and nut etc.), decorative parts, and a semiconductors of electronic parts, and the like. Materials include metal, plastic, resin, leather, ceramics, ceramic etc. Screws, nails, semiconductor chips, plastic parts and the like.

Processing of the textured pattern provided to the component is considered to be roughly divided into two methods.

One is a processing method for providing the textured pattern to a mold that manufactures the component by injection molding or casting. In a textured finish to the mold, various methods such as etching and blasting, can be used. In a general method, a particle size and the like of the textured pattern can be controlled. Further, also a position and a size of the fine irregularity are not correctly reproduced one by one but a random pattern is generated in each case of the processing. Accordingly, in the case where the mold that manufactures the same component is fabricated in plurality, the fine irregularities in a textured finish area through each mold are different from each other in each mold. Also in the case where an imitation product is fabricated, of course, it is possible to imitate the same mold at a glance. However, it is difficult to completely take out the fine irregularities of the textured pattern one by one. Through the processing method, an approximately identical textured pattern can be provided to all individuals fabricated by the same mold. On the contrary, when a different mold is used, fine features of the textured pattern are different from each other. In the case of the above-described processing, at least one or more are selected from among an individual group (component group) that has the textured pattern provided thereto by a certain mold. Further, the image features of the textured pattern in the verification area of the individual are registered as a representative value being a reference of the verification in the image feature storage unit 1. Further, a component individual having the image features that are consistent with the image features registered in the image feature storage unit 1 can be verified as a component that has the textured pattern provided thereto by the mold.

This method has the advantage of being able to verify the individual group (component group) fabricated by a specific mold by using small registration data. In addition, the image of the textured pattern portion of the mold (the portion subjected to textured finishing to parts etc.) to be registered in the image feature storage unit is registered without change in luminance value of the image. At the time of verification, the brightness value of the satin pattern image in the collation area may be reversed and collated.

In another method, fine surface irregularities are generated by a plating process, painting, or the texture processing through a process of generating random fine irregular patterns in each individual of the component through etching, blasting, cutting, crystallization and powder painting, dispersion plating process, or the like. In the case of using the above-described processing, provided textured pattern is different in each individual of the component. Therefore, in each individual of the component, the image features of the textured pattern provided to the verification area are registered in the image feature storage unit 1. Further, a component having the image feature that is consistent with image features registered in the image feature storage unit 1 can be verified as the component registered in the image feature storage unit 1.

This method has the advantageous effect capable of verifying (identifying) the component in units of individuals since the textured pattern is different in each individual of the component.

Further, the above-described two methods are combined and the painting and the plating process are further applied to a portion that has the textured process applied thereto by the mold. Thereby, generation in a difference between individuals in the fine irregularities can be advanced, and further an identification property can be improved. At this time, a difference between features in each mold still remains and a difference between features in each individual due to a process is further added, and thereby both can be verified, respectively. Particularly, a size of the irregularity of the textured process that is applied to the mold is made rougher than that of the textured process in a subsequent stage, and thereby a difference between the molds can be made larger than a difference between individuals. By use of the above method, a threshold to a degree of similarity of the feature amount at the time of the verification can be set loosely at the time of the verification in each mold as compared to the time of the verification in each individual, and verified by using small registration data as described above. Further, by using this advantage, the verification throughput can be reduced by hierarchic verification.

Next, when the verification area is an area that has the textured pattern provided thereto, it is not particularly limited. Further, it is to be desired that ease of the verification processing be considered and the verification area be previously determined. As the verification area, an area of a position in which a reference portion that is present in common to the component is determined as a reference is considered to be designated as the verification area. Examples of the reference portion of the component include a trademark, a logo, a manufacturer name, a manufacturing company, a brand name, a manufacture name, and a serial number, and the like of the product attached, printed, die stamped, or heated and printed to or in the component. When the components are the same, these reference portions have the same pattern in common regardless of the individuals, and are distinctively viewed from an external appearance. Further, when a position and an attitude of the reference portion are determined as a reference and the features are stored, the verification area of the component can be automatically detected.

Further, an imaging aid (adapter), described in above exemplary embodiment 2 that is engaged with the side of the component that has the textured pattern provided thereto may be prepared, a hollow wall (hole) capable of viewing (imaging) the textured pattern from the outside may be provided in a part of the member, and an area capable of viewing (imaging) the textured pattern may be designated as the verification area. As described above, in each case where the position and the attitude in the verification area are identified, it is unnecessary to recognize the position and the attitude in the verification area and the verification area can be definitely identified.

It should be noted that the image features of the textured pattern for verification may differ depending on the lighting condition at the time of shooting the textured finished pattern applied to the same component even though they are the same components individual. However, this problem is solved by the use of the imaging aid described in the second embodiment.

Next, as an example of the component, a specific embodiment will be described with reference to a fastener 220.

Figure 23:
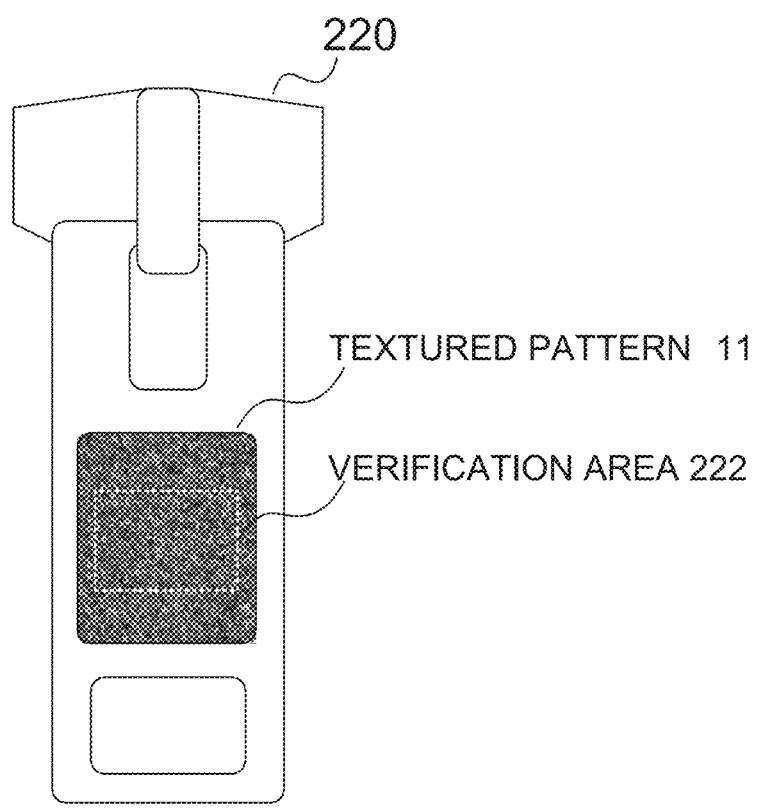
FIG. 23 is a view for illustrating a textured pattern of a leather product.

FIG. 23 is a view for illustrating the fastener 220 as an example of the component.

To a predetermined region of the pull-tab of the fastener 220, the textured pattern 221 is provided. In the present example, a predetermined range of the textured pattern 221 is designated as the verification area 222, and further the entire area that has the textured pattern 221 provided thereto may be designated as the verification area.

Figure 24:
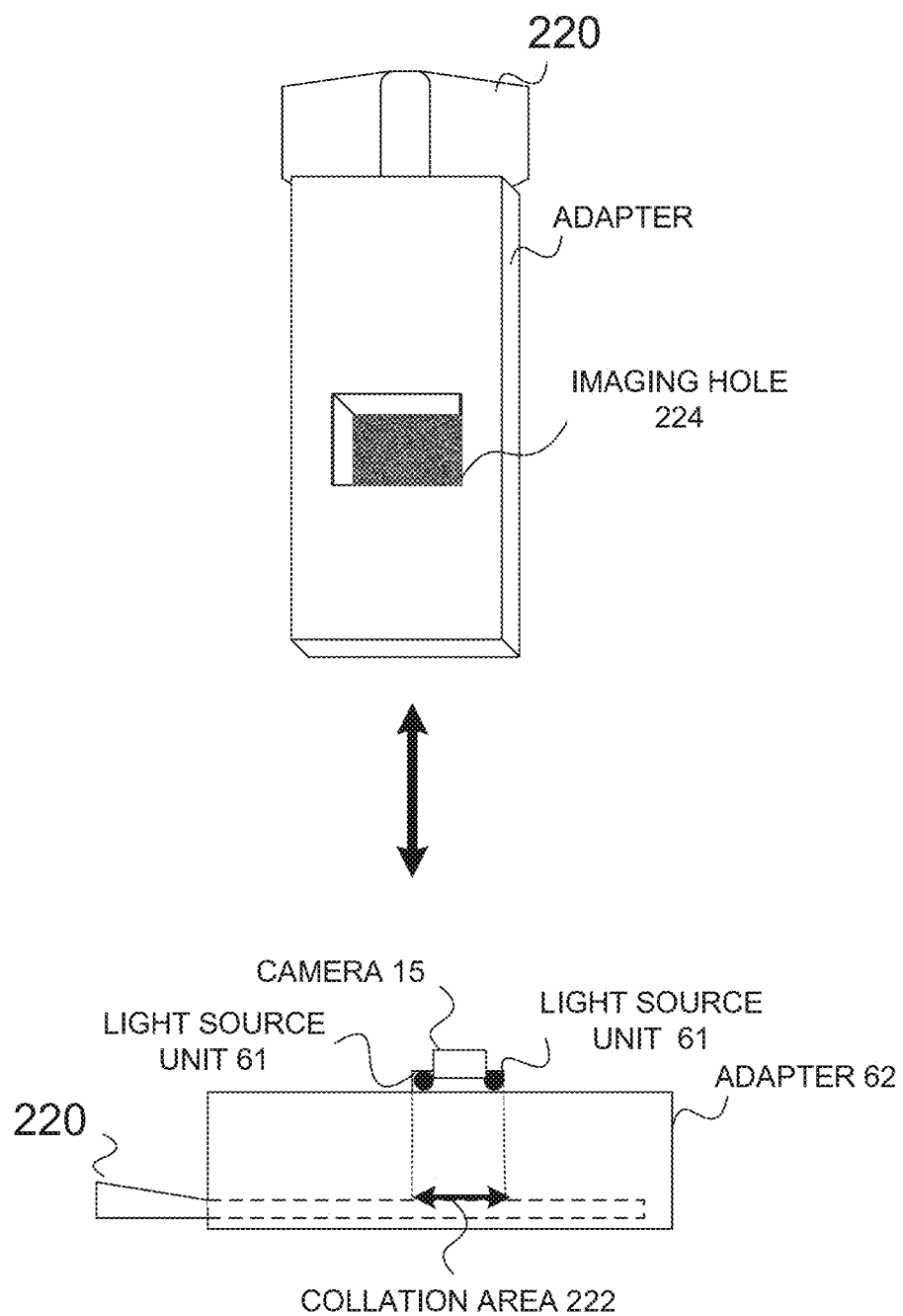
FIG. 24 is a view for illustrating a fastener 10 as an example of an article.

Here, how to determine the verification area is to determine the verification area 222 by the cover lid 62 of the imaging aid. An example of the imaging aid is illustrated in FIG. 24. The cover lid 223 is configured so as to be engaged with the fastener 220 on the side of the textured pattern 221, and is formed in a shape to cover the fastener 220. Further, the fastener 220 is inserted into a deep location of an internal wall of the cover lid 223, and thereby the cover lid 223 is configured so as to fix a position and an attitude of the fastener 220. Further, on the cover lid 223, an imaging hole 224 is provided so as to photograph a part of the textured pattern 11 of the fastener 220. Further, an area to be determined through the imaging hole 224 is designated as the verification area 222.

Next, the textured pattern 221 of the verification area 222 is photographed by a camera. The camera is fixed so as to cover the imaging hole 224. Further, light sources 61 for imaging are provided on the side of the cover lid 62.

The cover lid 62 is configured as described above, and thereby the verification area 222 of the fastener 220 can be uniformly determined. Further, the light sources 61 are arranged in a given position toward the verification area 222. As a result, the textured pattern in the verification area 222 can be photographed under the same lighting conditions, and a change in the image features of the textured pattern generated by a change in the lighting conditions can be prevented.

Next, the image features of the image feature storage unit 3 are registered. In the texture processing through the mold, about several fasteners 220 are selected from the fasteners 220 that have the texture processing applied thereto by the mold, the cover lid 62 are engaged with the fasteners 220, and the textured pattern 221 in the verification area 220 is photographed by the camera. Further, in the texture processing through the process, the cover lid 62 is engaged with each of the fasteners 220, and the textured pattern 221 in the verification area 222 is photographed by the camera. The image feature is extracted from the imaged textured pattern 221, and is registered in the storage unit 3. In the extraction of the image feature from the imaged image, an extraction technique of the image feature of fingerprints such as luminance values and feature points of the image, inflection points, intersection points, end-points, and central points of lines of a binary image can be used.

On the other hand, in the case where the fastener 220 is verified, the fastener 220 to be verified is photographed by the same imaging method as that of the above, and an image of the textured pattern 221 in the verification area 222 of the fastener 220 to be verified is acquired. The image features from the imaged image are extracted in the same manner as in the above.

The collation/retrieval unit 6 compares the image feature of the fastener 220 to be verified and the image features stored in the storage unit 3. Suppose, for example, that the number of combinations of the minutiae in the same position (a range within a certain threshold) is more than or equal to a predetermined number. In this case, both are consistent with each other is determined, and the fastener 220 to be verified is the same as that registered in the storage unit 3 is determined.

As described above, according to the embodiment 4-1, a special device such as a tag for identifying the article or an RFID tag is not particularly used but components can be verified through the textured pattern generated in a normal production process of the components.

Figure 25:
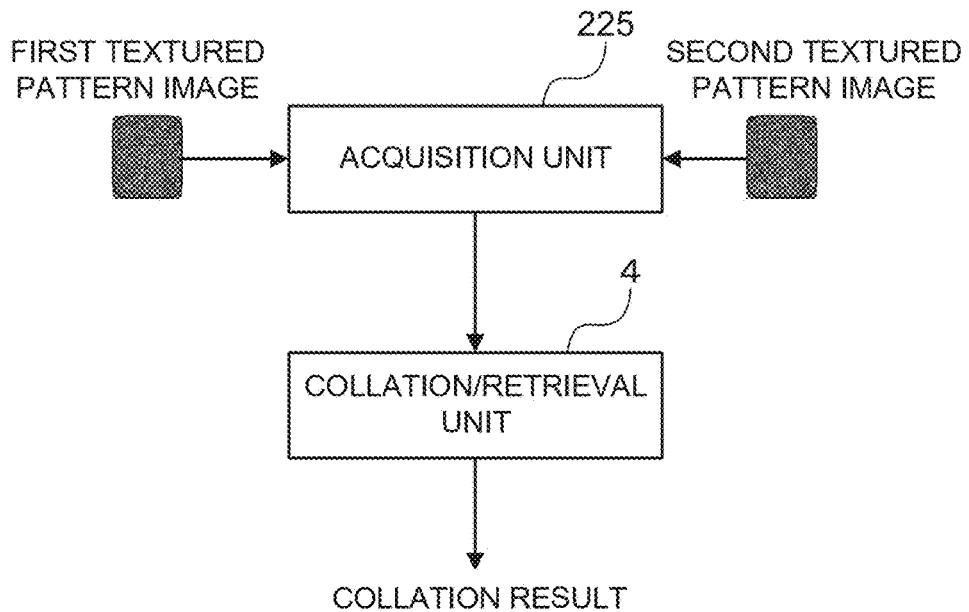
FIG. 25 is a view for illustrating an adapter 13.

The embodiment 4-1 as described above has a configuration in which the collation/retrieval unit 6 inputs and verifies the image features of the textured pattern; however, it is not limited thereto. As illustrated in FIG. 25, for example, an acquisition unit 225 may acquire a first textured image and a second textured image, and a collation/retrieval unit 6 may verify the acquired first and second textured images, and output verification results. Even the above-described configuration can acquire the same advantageous effects as those of the embodiment 4-1.

Embodiment 4-2

An embodiment 4-2 will be described.

The embodiment 4-2 relates to a verification system of a fastener in the case where a component is designated as the fastener as an example, and the fastener has a textured pattern provided thereto by a mold.

Figure 26:
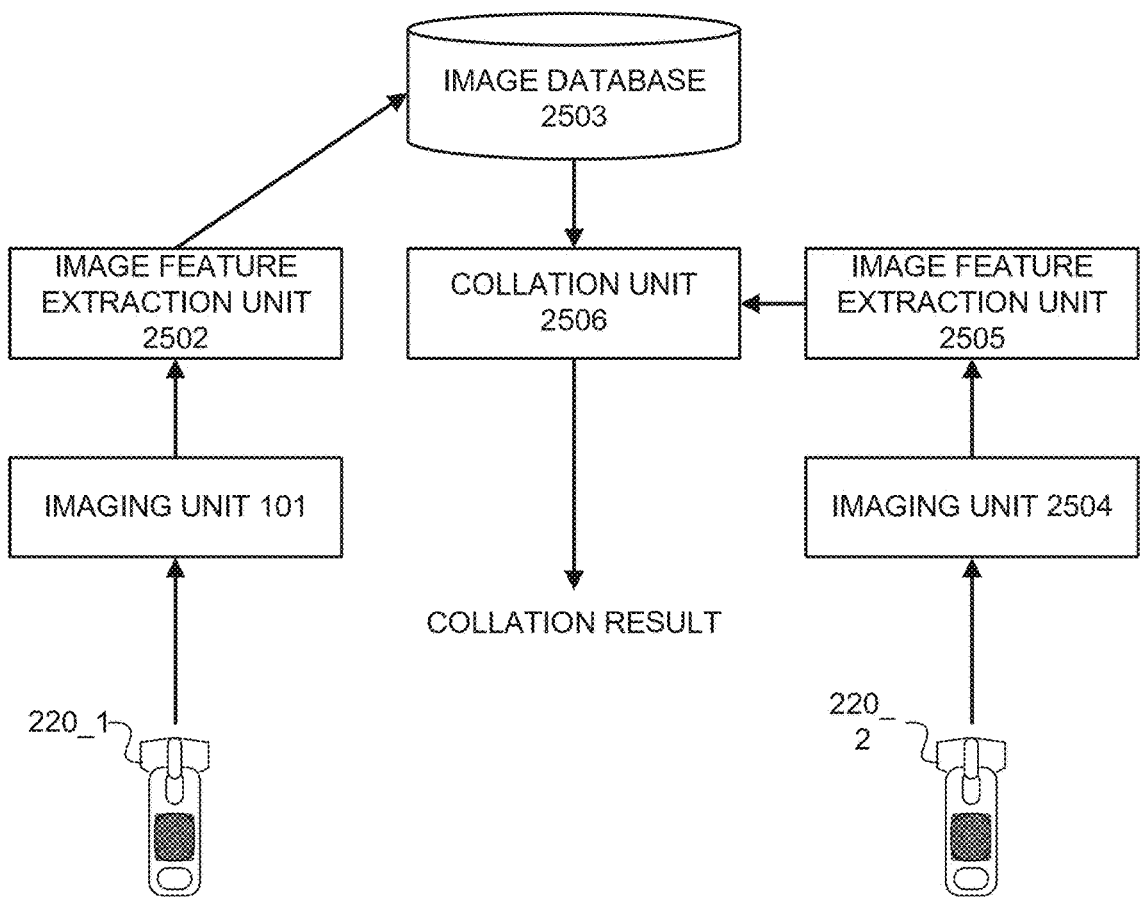
FIG. 26 is a block diagram of a modification according to the first embodiment.

FIG. 26 is a configuration diagram illustrating the verification system of the fastener.

An imaging unit 2501 is present on the side of a person (fabricator and the like of the fastener) that relates to fabrication of a fastener 220_1 or a person that performs quality control of the fastener 220_1, and images the verification area of the fastener 2201_1 by the fabricators or the like. The imaging unit 2501 is the same as the above-described cover lib 62 and camera. With regard to the number of pieces to be photographed, in the case of the texture processing through the mold, an approximately identical textured pattern is formed in each mold. Therefore, several fasteners may be selected in each mold, and the selected fasteners may be photographed. Further, regardless of a file format of the imaged image, JPEG or the like may be used.

An image feature extraction unit 2502 extracts the image features of the textured pattern in the verification area from the image imaged by the imaging unit 2501. In the extraction of the image features, an extraction technology of the image features of fingerprints such as luminance values and minutiae of the image, inflection points, intersection points, end-points, and central points of lines of a binary image can be used. The above-described extracted image features are registered in an image feature database 2503.

As illustrated in FIG. 27, the image feature database 2503 stores the mold and the image features of the textured pattern in the verification area of the fastener 220 processed by the mold in association with each other. In addition, the mold and the image features may be stored in association with production information about production places, merchandise category, and production date and time, or distribution information about shipment destinations, shipment date, and the like. Through the above, history information about the fastener to be verified can be also acquired.

An imaging unit 2504 and an image feature extraction unit 2505 are present on the side of an inspection department of the fastener or on the side where the fastener is verified, such as a shipment destination of the fastener. The imaging unit 2504 and the image feature extraction unit 2505 have the same configurations as those of the imaging unit 101 and the image feature extraction unit 2502, respectively.

A verification unit 2506 verifies the image feature in the verification area of a fastener 2202_2 to be verified extracted by the image feature extraction unit 2505 and the image features stored in the image feature database 2503. In the case where both are consistent with each other, the verification unit 2506 determines that the fastener 2202_2 to be verified is a regular fastener registered in the image feature database 2503. For example, when the image feature of the fastener 2202_2 is "YYY", the fastener 2202_2 can be identified as a fastener processed by the mold 2. In addition, with regard to a method for verifying the image features, for example, end-points and intersection points of lines and corners of the textured pattern are designated as the minutiae, and arrangements of the minutiae are verified. In the case where the number of combinations of the minutiae in the same position (a range within a certain threshold) is more than or equal to a predetermined number, both are consistent with each other is determined. As the above-described verification technology, an existing technology of fingerprint verification can be used.

Further, each of the above-described imaging unit, image feature extraction unit, image feature database, and verification unit may be present individually and mutually connected via a network. Alternatively, several units may be combined.

As described above, according to the present embodiment, a special device such as a tag for identifying the article or an RFID is not required. Further, an individual of the components or the mold for manufacturing the article can be verified by the textured pattern generated in a normal production process of the components. In particular, in the embodiment 2-2, since the texture processing is performed by the mold, an approximately identical textured pattern is formed in each mold. Therefore, for example, when the verification is performed in each mold, it is useful for a quality inspection and the like in each mold. Further, since an imitation component or the like is fabricated by using the mold different from that of a regular component, the imitation component can be also determined.

Embodiment 4-3

An embodiment 4-3 will be described. In the case where a component is designated as a fastener as an example and the fastener has a textured pattern provided thereto separately by blasting, this embodiment relates to a verification system of the fastener.

An imaging unit 2501 is present on the side of a person (a fabricator and the like of the fastener) that relates to fabrication of a fastener 220_1 or a person that performs quality control of the fastener 220_1, and images the verification area of the fastener 220_1 by the fabricators or the like. The imaging unit 2501 is the same as the above-described cover rib 62 and camera. Further, regardless of a file format of the imaged image, JPEG or the like may be used.

An image feature extraction unit 2502 extracts the image features of the textured pattern in the verification area from the image imaged by the imaging unit 2501. In the extraction of the image features, an extraction technology of the image features of fingerprints such as luminance values and minutiae of the image, inflection points, intersection points, end-points, and central points of lines of a binary image can be used. The image features extracted as described above are registered in an image feature database 2503.

As illustrated in FIG. 28, the image feature database 2503 stores the identification information for identifying an individual of the fastener 220_1 and the image feature of the textured pattern in the verification area of the fastener 220_1 in association with each other. In addition, the identification information and the image feature may be stored in association with production information about production places, merchandise category, and production date and time, or distribution information about shipment destinations, shipment date, and the like. Through the above, history information about the fastener to be verified can be also acquired.

An imaging unit 2504 and an image feature extraction unit 2505 are present on the side of an inspection department of the fastener or on the side where the fastener is verified, such as a shipment destination of the fastener. The imaging unit 2504 and the image feature extraction unit 2505 have the same configurations as those of the imaging unit 2501 and the image feature extraction unit 2502, respectively.

A verification unit 2506 verifies the image feature in the verification area of a fastener 220_2 to be verified extracted by the image feature extraction unit 2505 and the image features stored in the image feature database 2503. In the case where both are consistent with each other, the verification unit 2506 determines that the fastener 220_2 to be verified is a regular fastener registered in the image feature database 2503. For example, when the image feature of the fastener 220_2 are "YYY", the fastener 220_2 can be identified as a fastener identified by the identification information "fastener 2". In addition, with regard to a method for verifying the image features, for example, end-points and intersection points of lines, and corners of the textured pattern are designated as the minutiae and arrangements of the minutiae are verified. In the case where the number of combinations of the minutiae in the same position (a range within a certain threshold) is more than or equal to a predetermined number, both are consistent with each other is determined. As the above-described verification technology, an existing technology of fingerprint verification can be used.

Further, each of the above-described imaging unit, image feature extraction unit, image feature database, and verification unit may be present individually and mutually connected via a network. Alternatively, several units may be combined.

As described above, according to the present embodiment, a special device such as a tag for identifying the component or an RFID tag is not required. Further, the component can be verified by the textured pattern generated in a normal production process of the component. In particular, in the embodiment 4-3, since the texture processing is performed by a processing trace, the textured pattern that is different in each component is formed. Therefore, the verification of the component can be identified in an individual level.

Embodiment 4-4

An embodiment 4-4 will be described.

In the case where a component is designated as a fastener as an example, and blasting, texture processing using powder painting, or a plating process is applied as a process in a subsequent stage on a textured pattern of the fastener provided by a mold, the fourth embodiment relates to a verification system of the fastener.

An imaging unit 2501 is present on the side of a person that relates to fabrication of a fastener 220_1 (fabricator and the like of the fastener) or a person that performs quality control of the fastener 220_1, and images a verification area of the fastener 220_1 by the fabricators or the like. The imaging unit 2501 is the same as the above-described cover lib 62 and camera. Further, regardless of a file format of the imaged image, JPEG or the like may be used.

The image feature extraction unit 2502 extracts the image features of the textured pattern in the verification area from the image imaged by the imaging unit 2501. In the extraction of the image features, an extraction technology of the image features of fingerprints such as luminance values and minutiae of the image, inflection points, intersection points, end-points, and central points of lines of a binary image can be used. The image features extracted as described above are registered in an image feature database 2503.

The image feature of the fastener 220_1 are acquired. The blasting, texture processing using the powder painting, or a plating process is applied to the fastener 220_1 as a process in the subsequent stage on the textured pattern provided by the mold. Accordingly, as described above, a difference between features still remains in each mold and a difference between features is further added in each individual due to a process. Therefore, it is to be desired that several samples of the fastener 220_1 be selected in each mold and only the image features (referred to as mold difference image features) of the textured pattern through the mold before the process in the subsequent stage be acquired. With regard to other individuals, in addition to the textured pattern through the mold, the image feature (individual difference image feature) of the textured pattern after the processing in the subsequent stage are further acquired.

As an example of an acquisition method of each of the mold difference image feature and the individual difference image feature, the following method is used. An each size of the fine irregularities generated by the texture processing in the mold is supposed to be 'a', and a size of the irregularities further generated by the process in the subsequent stage is supposed to be 'b'. Here, for example, the process is supposed to be controlled so that a>b holds. In the image of the individual fabricated by the same mold, mottles of a size 'a' and mottles of a size 'b' are mixed and generated. Here, when only the mottles of a size of approximately 'a' are acquired as the feature point, the mold difference image feature can be acquired. Further, when the mottles of the size 'b' are acquired, the individual difference image feature can be acquired.

The mold difference features are extracted from a plurality of samples, and the average and the like are taken. As a result, a mold can stably be verified.

As illustrated in FIG. 29, the image database 2503 stores the identification information for identifying an individual of the fastener 220_1, the image feature of the textured pattern in the verification area through the mold that has the fastener 220_1 fabricated thereby, and the image feature of the textured pattern in the verification area of a fastener 220_1 group fabricated by each of the molds in association with each other. In addition, the identification information and the image feature may be stored in association with production information about production places, merchandise category, and production date and time, or distribution information about shipment destinations, shipment date, and the like. Through the above, history information about the fastener to be verified can be also acquired.

An imaging unit 2504 and an image feature extraction unit 2505 are present on the side of an inspection department of the fastener or on the side where the fastener is verified, such as a shipment destination of the fastener. The imaging unit 2504 and the image feature extraction unit 2505 have the same configurations as those of the imaging unit 2501 and the image feature extraction unit 2502, respectively.

A verification unit 2506 verifies the image feature in the verification area of a fastener 220_2 to be verified extracted by the image feature extraction unit 2505 and the image features stored in the image database 2503. In the case where both are consistent with each other, the verification unit 306 determines that the fastener 220_2 to be verified is a regular fastener registered in the image database 2503. Here, the verification unit 306 first verifies the image features in the verification area of the fastener 220_2 to be verified and the image features (mold difference image features) of the textured pattern in the verification area through the mold. Thereby, the verification unit 306 determines the mold that fabricates the fastener 220_2. Next, the verification unit 306 verifies the individual difference image features of the fastener group fabricated by the determined mold and the individual difference image features of the fastener 220_2, and verifies an individual of the fastener 220_2.

As described above, for example, in the case where the image feature of the fastener 307 is "AAA+YYY", the image feature can be divided into the image feature AAA and the image feature YYY, for example, by sorting of a size of the mottle or a thickness of the line. Here, the image feature of the fastener 307 have "AAA", and thereby a fastener is fabricated by the mold A can be determined. Further, the image feature of the fastener 307 group fabricated by the mold A and the image feature "AAA+YYY" of the fastener 307 to be verified are verified, and thereby the fastener 307 is a fastener identified by the identification information fastener 2 can be identified. In addition, with regard to a method for verifying the image feature, for example, end-points and intersection points of lines, and corners of the textured pattern are designated as the minutiae and arrangements of the minutiae are verified. In the case where the number of combinations of the minutiae in the same position (a range within a certain threshold) is more than or equal to a predetermined number, both are consistent with each other is determined. As the above-described verification technology, an existing technology of fingerprint verification can be used.

Further, each of the above-described imaging unit, image feature extraction unit, image feature database, and verification unit may be present individually and mutually connected via a network. Alternatively, several units may be combined.

As described above, the embodiment 4-4 is characterized in that in addition to the advantageous effects of embodiment 4-2 as described above, even in the case of identifying individuals, all the registered image features are not required to be verified but the verification processing can be fast performed. Further, the hierarchic verification can be also performed in which the verification is not required up to an individual level of the fastener but only the verification of a level of the mold that fabricates the fastener is performed.

Embodiment 5

In the fourth embodiment described above, at least a part of a predetermined region of a component subjected to a satin pattern is set as a collation area, and a configuration in which collation (identification) of the component is performed by a matte pattern in the collation area has been described. In the present embodiment, the product (concavo-convex pattern) applied to a predetermined region on the surface of the component is collated to identify the product on which the component is mounted. The same reference numerals are attached to the same configurations as those in the above embodiment, and a detailed description thereof will be omitted.

The collation system according to the present embodiment includes an image feature storage unit 311 in which image features of a collation area of a component attached to the main body of a product are stored and collation of a construction to a product to be collated, and a collation apparatus 312 for collating the product on which the component is mounted based on the image feature of the area.

Figure 31:
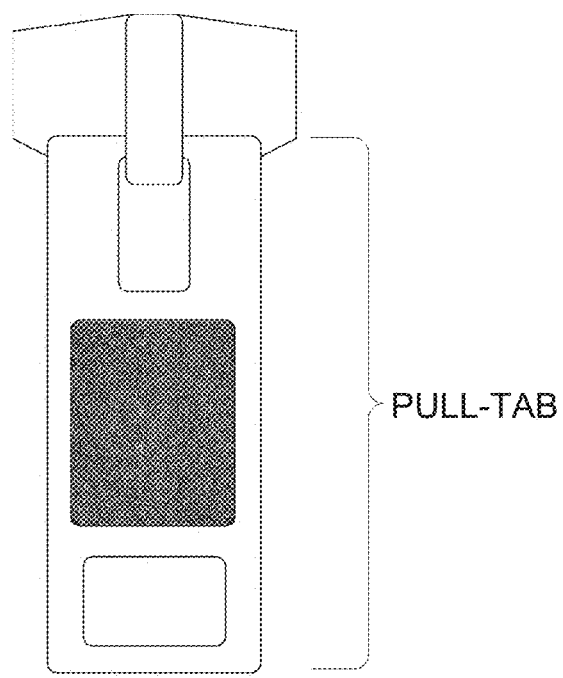
FIG. 31 is a view for illustrating an example of a verification area.

As illustrated in FIG. 31, in the following descriptions, the descriptions will be made by using a slide fastener as the component and a textured pattern as the pattern. An example where the entire textured pattern in a concave portion of a pull-tab of the slide fastener is set as the verification area will be used and described; however, it is not necessarily limited thereto.

Figure 33:
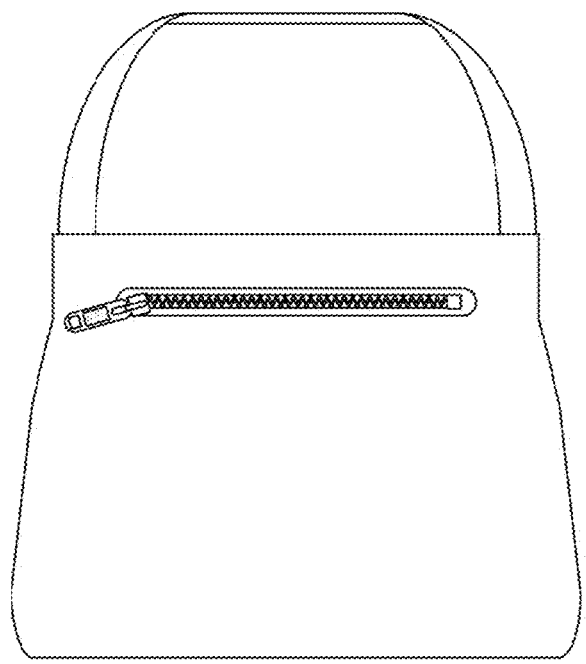
FIG. 33 is a view for illustrating a product to be verified.

When the product is a product on which the above-described component is fixed, it is not particularly limited thereto. As illustrated in FIG. 33, in the following descriptions, a bag on which the slide fastener is fixed will be described as an example.

Embodiment 5-1

Next, a configuration of each unit will be described.

Figure 30:
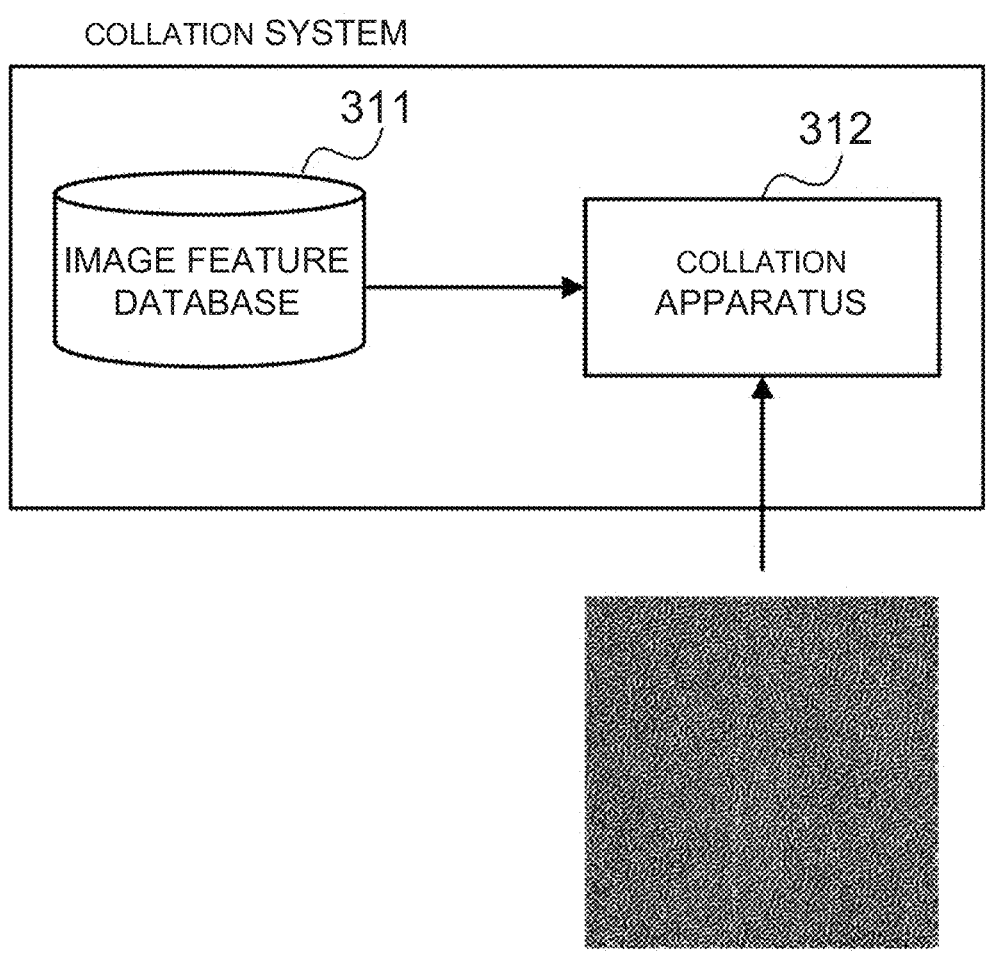
FIG. 30 is an example of a block diagram illustrating a verification apparatus of a verification system of the present invention.

As illustrated in FIG. 30, the verification system 310 according to the present application includes the image feature storage 311 and the verification apparatus 312.

The image feature storage 311 is a database in which the image features of the textured pattern in the verification area of the pull-tab of the fabricated slide fastener are stored in association with product information. Here, the product information is information including at least one or more of producer identification information, product identification information, individual identification information, distribution course information, and verification information. The producer identification information is identification information for uniquely identifying a producer that produces bags being a product, for example, a manufacturer name, a brand name, and the like. In addition, the producer identification information is, for example, a concept including also a shipment destination and a shipment date and time of the slide fastener as the producer identification information. The product identification information is information for uniquely identifying a product on which the component is fixed, and is, for example, information indicating a merchandise name, a model number, a production date and time, a selling date and time, or a selling period. The individual identification number is identification information for individually identifying the product on which the component is fixed, and includes a production lot number and a serial number as an example therefor. The distribution course information is information in which a distribution course of the slide fastener or the bag on which the slide fastener is fixed is accumulated as a log, and is, for example, information about the distribution of a seller on the way of distribution, a selling date and time, a passing date and time and a passing place of a custom office, a final seller, a final selling date and time, a purchaser, and the like. The verification information is information about the verification of the product through the component having the image feature. Further, the verification information is information about imitation inspection results of the product on which the component having the image feature is fixed, a place, and a date and time at which the image feature is acquired, a worker that acquires the image feature, identifiable information from an appearance of the product on which the component having the image feature is fixed, and the like.

The verification apparatus 312 extracts the image feature from an image obtained by imaging the textured pattern of the pull-tab of the slide fastener that is fixed on the bag to be verified. Further, the verification apparatus 312 verifies the extracted image feature and the image features of the textured pattern stored in the image feature storage 311. Further, the verification apparatus 312 verifies whether both are consistent with each other. In the case where both are consistent with each other, on the basis of the product information in association with the image feature, the verification apparatus 312 verifies consistency between product information in association with the image feature and obvious information (the brand, the serial number, and the like) from the design and the like or described separately in the product to be verified. In the case where both are consistent with each other, the verification apparatus 312 can authenticate the above bag as an authentic product. Here, with regard to the verification method of the image features, for example, in the case where a center of dots in the textured pattern is set to a feature point, an arrangement of the feature point is verified, and the number of combinations of the feature points in the same position (a range in a certain threshold) is more than or equal to a predetermined number, both is the same is determined. Further, in the case of a leather pattern or a wood grain pattern, end-points, an intersection point of lines, and a corner are set to the feature points, the arrangement of the feature points is verified, and the number of combinations of the feature points in the same position (a range in a certain threshold) is more than or equal to a predetermined number, both is the same is determined. An existing technology of fingerprint verification can be used as the above-described verification technology. In the descriptions, an example in which the image features of the stored textured pattern and the image features of the textured pattern to be verified are verified is described; however, it is not limited thereto in the present invention. In place of the image features, for example, an image of the stored textured pattern and an image of the textured pattern to be verified may be verified.

Embodiment 5-2

Continuously, an embodiment 5-2 of the verification system of the present application will be described. In the second embodiment, verification in the case where a component is managed so that a product is set to a bag, the component is set to a slide fastener, a pattern is set to a textured pattern, product information is set to a shipment destination, and a component fabricated from the same mold is shipped in each shipment destination will be described.

Figure 32:
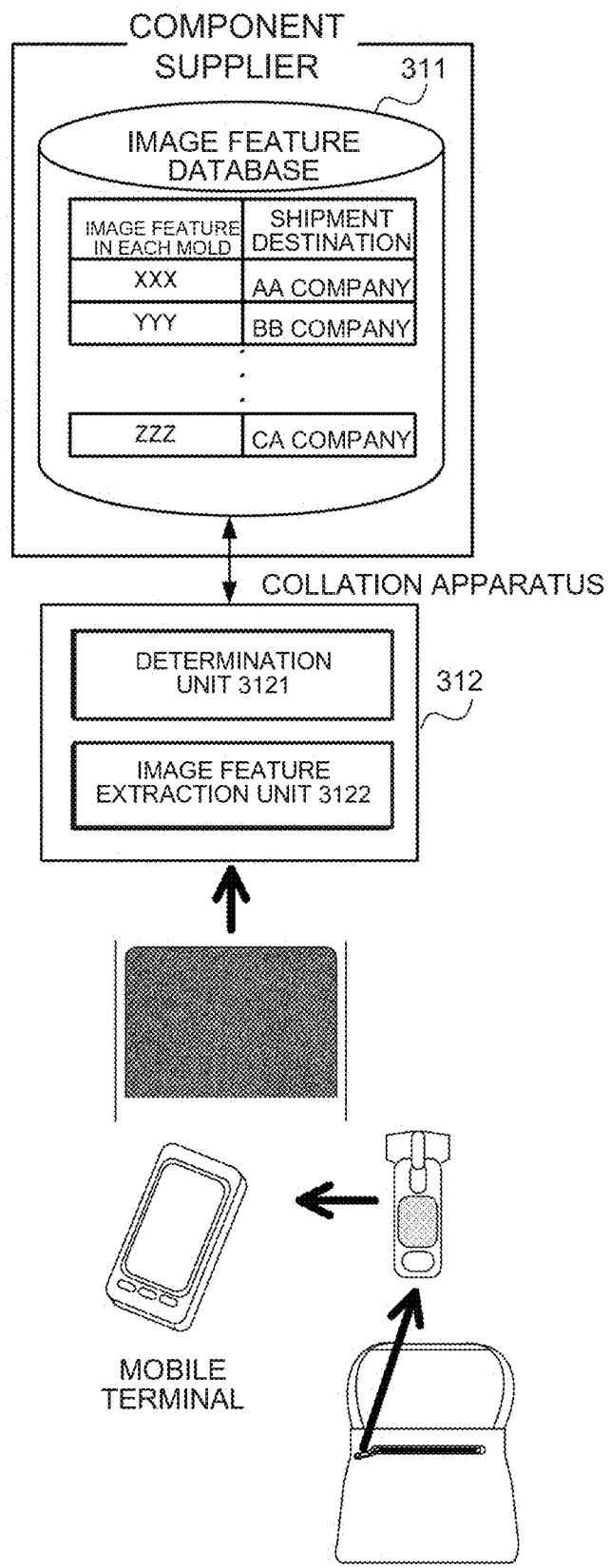
FIG. 32 is an example of a block diagram according to a second embodiment of the present invention.

FIG. 32 is a block diagram illustrating a verification system of the embodiment 5-2. The verification system 310 includes the image feature storage 311, the verification apparatus 312, and a cell-phone of a consumer.

As illustrated in FIG. 32, in the image feature storage 311, the image feature extracted from an image obtained by imaging in each mold the slide fastener that has the textured pattern provided thereto by the mold is stored in association with the shipment destination. When a component supplier fabricates or ships components, the image feature storage 311 is created while the image feature of the component is associated with the producer identification information of the shipment destination, and the image feature storage 311 is installed as a device of the component supplier side. In addition, in imaging the textured pattern of the pull-tab of the slide fastener, the component, lighting, and a position and an attitude of an image pickup device are supposed to be mutually fixed and then imaged with the use of the adapter.

The verification apparatus 312 includes an image feature extraction unit 3122 and a determination unit 3121. The image feature extraction unit 3122 extracts the image feature from the image that is transmitted from the cell-phone of the consumer and that is obtained by imaging the textured pattern of the pull-tab of the slide fastener that is fixed on the bag to be verified. The determination unit 3121 verifies the image feature extracted by the image feature extraction unit 3122 and the image features of the textured pattern stored in the image feature storage 311, and searches for whether both are consistent with each other. In the case where both are consistent with each other, the verification apparatus 312 verifies consistency between product information (the producer identification information being the shipment destination) in association with the image feature and obvious information (the producer identification information such as a brand, or the product identification information such as a serial number) from the design and the like or described separately in the product to be verified. In the case where both are consistent with each other, the verification apparatus 312 can authenticate the above bag as an authentic product. On the other hand, as a result of the verification, in the case where the consistency is not recognized, there is the possibility that the bag is an imitation product can be determined.

From an appearance design of the bag of FIG. 33, for example, in the case where the bag is a product of AB company (or, an imitation product thereof) can be easily determined, when the image feature of the component is YYY, the consistency can be verified and the bag can be authenticated as an authentic product. Suppose, on the other hand, that the component is not a component of a component dealer that uses a regular component, or suppose that even if the component is a normal component, a third party that is not a producer of the bag obtains the components separately and produces the imitation products. In this case, the image feature of the component is different from YYY and, since the bag is not verified, the bag is an imitation product or may be an imitation product can be determined.

With the use of the adapter, by the cell-phone, the textured pattern of the pull-tab of the slide fastener of the bag to be verified is imaged by mutually fixing the component, the lighting, and the position and the attitude of the image pickup device on a predetermined relative relationship, and the imaged image is transmitted to the verification apparatus 312. In the present embodiment, the cell-phone will be used as an example, and the descriptions will be made. Further, when an image obtained by imaging the textured pattern of the pull-tab of the slide fastener of the bag to be verified can be transmitted, devices except the cell-phone may be used.

Figure 34:
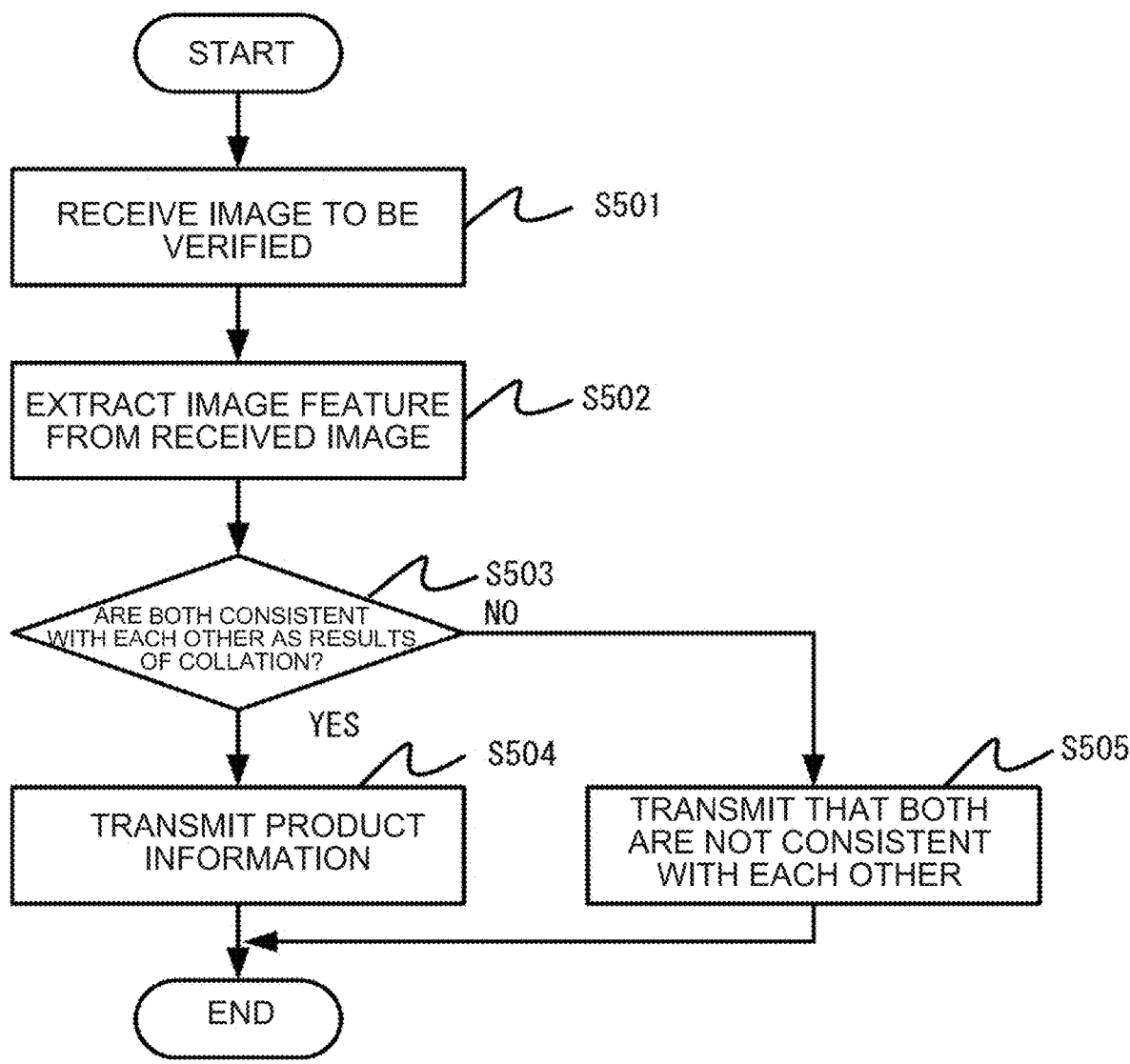
FIG. 34 is a flowchart for illustrating an example of operations according to the second embodiment of the present invention.

Next, operations of the verification system of the present application will be described with reference to FIG. 34.

For verifying the bag to be verified, the consumer transmits an image obtained by imaging the textured pattern in the predetermined region of the pull-tab by the cell-phone, and the verification apparatus 312 receives the image (S501).

The image feature extraction unit 3122 of the verification apparatus 312 extracts the image feature of the textured pattern in the predetermined region from the received image by the same method as the above-described method and outputs the extracted image feature to the determination unit 3121 (S502).

The determination unit 202 verifies the extracted image feature and the image features registered in the image feature database 11 (S503). In the case where both are consistent with each other (YES of S503), the determination unit 202 reads out the product information (shipment destination and the like) in association with the image feature and transmits the product information to the cell-phone 2 (S504). The consumer verifies the consistency between the received information about the shipment destination and the obvious product information (the brand, the serial number, and the like) from a logo and the like described in the product or design of the bag, and authenticates the bag as an authentic product in the case where both are correctly consistent with each other. As a result, an imitation product, a false description, and further the imitation product using another fastener fabricated by a regular components dealer can be also refused.

On the other hand, as a result of the verification, in the case where both are not consistent with each other (NO of S503), the fact that both are not consistent with each other is transmitted to the cell-phone 2 (S505). As a result, the consumer recognizes that the bag is camouflaged or may be camouflaged.

As described above, in the present embodiment, even if a producer of the product does not build an RFID chip or the like into the product one by one, a fastener the image feature of which is previously registered by a component dealer is used, and thereby the verification for an authenticity assessment and the like of the product can be performed. Therefore, the verification for the authenticity assessment and the like of the product merchandise can be performed at low cost.

Further, even if the consumer does not have special equipment, the bag can be verified. Further, as a result of the verification, product information about the product can be also acquired.

In the above-described embodiment, a case where the image feature is registered in each mold is used and descriptions are made. Further, the second embodiment may have a configuration in which the image feature in each fastener extracted from an image obtained by separately imaging the slide fastener that has the textured pattern provided thereto by the blasting is stored in association with the product identification information for identifying each of the products individually.

Further, in place of the shipment destination, or in addition to the shipment destination, information about the shipment date and time, a producer of products on which the fastener is fixed, a production period of the products, and the like is stored. Further, the consistency between any of the above information or the combined information and the obvious information (the brand, the serial number, and the like) from a logo and the like described in the product or design of the bag may be verified. Further, in the case where both are correctly consistent with each other, the bag may be authenticated as an authentic product.

Further, a configuration in which the image feature storage 311 is provided on the component supplier side is used and descriptions are made. Further, the second embodiment may have a configuration in which the component supplier provides the image feature storage 311 to the producer and the image feature database 311 is provided on the producer side. Further, the second embodiment may have a configuration in which the image feature storage 311 is provided on the network.

Embodiment 5-3

Continuously, an embodiment 5-3 of the verification system of the present application will be described. In the third embodiment, verification in the case where a product is set to a bag, a component is set to a slide fastener, a pattern is set to a textured pattern, and product information is set to product identification information will be described. In addition, the same configurations as those of the embodiment 5-3 are indicated by the same reference numerals, and the detailed description will be omitted.

Figure 35:
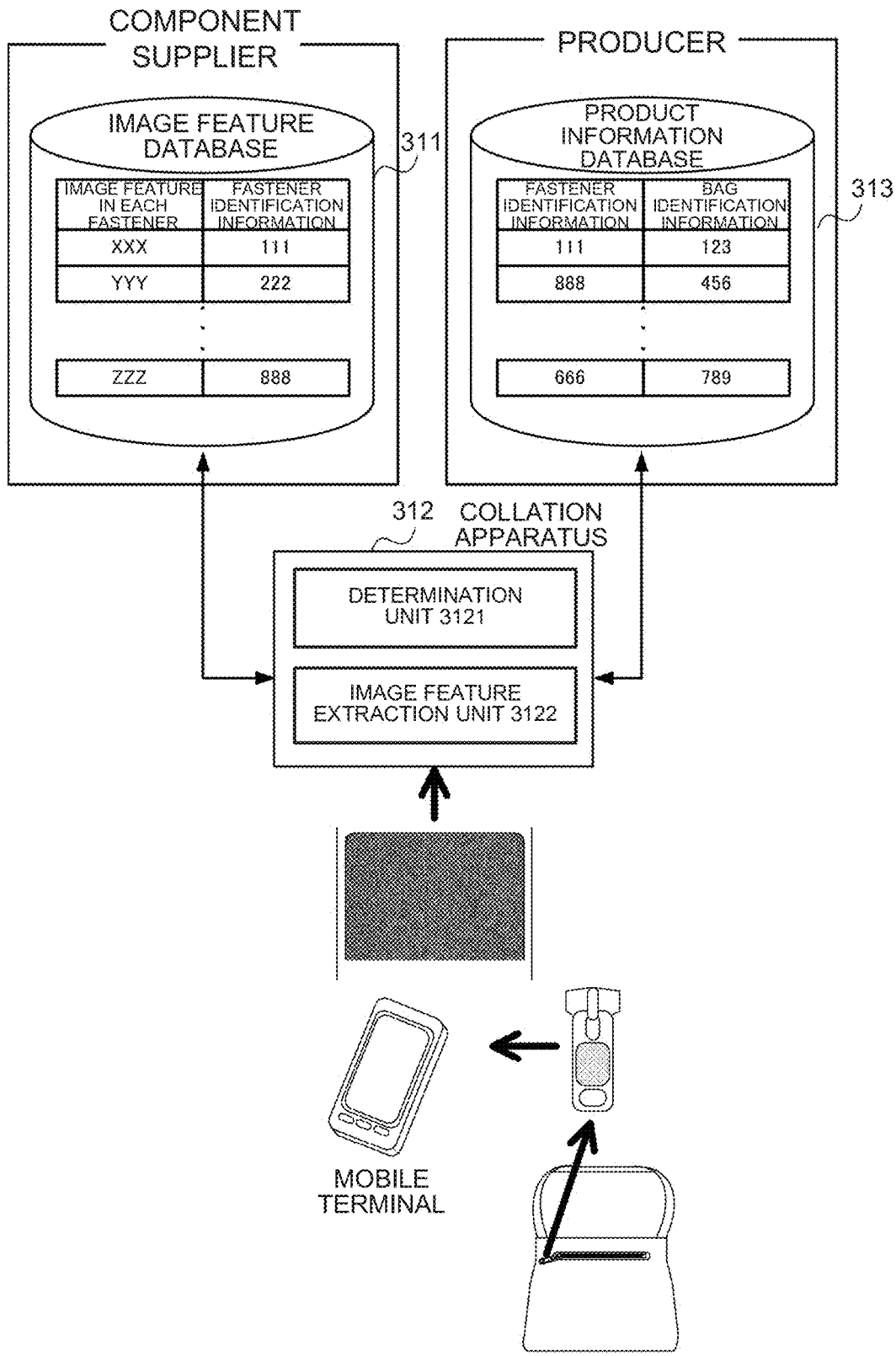
FIG. 35 is an example of a block diagram according to a third embodiment of the present invention.

FIG. 35 is a block diagram illustrating the verification system of the present embodiment.

In the present embodiment, the verification system 310 has the image feature storage 311 and a product information storage 313. In the image feature storage 311, the image feature in each fastener extracted from an image obtained by separately imaging the slide fastener that has the textured pattern provided thereto by the blasting is stored in association with the fastener identification information for identifying each of the fasteners individually. At the time when a component supplier ships the fastener, the image feature storage 311 is created while the image feature of the component is associated with the shipment destination, and the image feature storage 311 is installed as a device on the component supplier side. In the product information storage 313, the fastener identification information is stored in association with bag identification information (product identification information) for individually identifying each bag on which the fastener is fixed. The product information storage 313 is created at the time of producing the products while the fastener identification information is associated with the bag identification information, and the product information storage 313 is installed as a device on the producer side. In addition, in the present embodiment, a configuration in which the fastener identification information is associated with the product identification information will be described. Further, in addition to the product identification information, the fastener identification information may be stored also in association with a production date of the product, and the like.

The determination unit 3121 of the verification apparatus 312 verifies the image feature extracted by the image feature extraction unit 3122 and the image features of the textured pattern stored in the image feature storage 311, and searches for whether both are consistent with each other. In the case where both are consistent with each other, the determination unit 3121 reads out the fastener identification information in association with the image feature, and searches the product information storage 313 for the bag identification information on the basis of the read-out fastener identification information. That is, in the present embodiment, the determination unit 3122 searches for the bag identification information. A consumer verifies the consistency between the received bag identification information and the bag identification information about the bag, and authenticates the bag as an authentic product in the case where both are consistent with each other.

Figure 36:
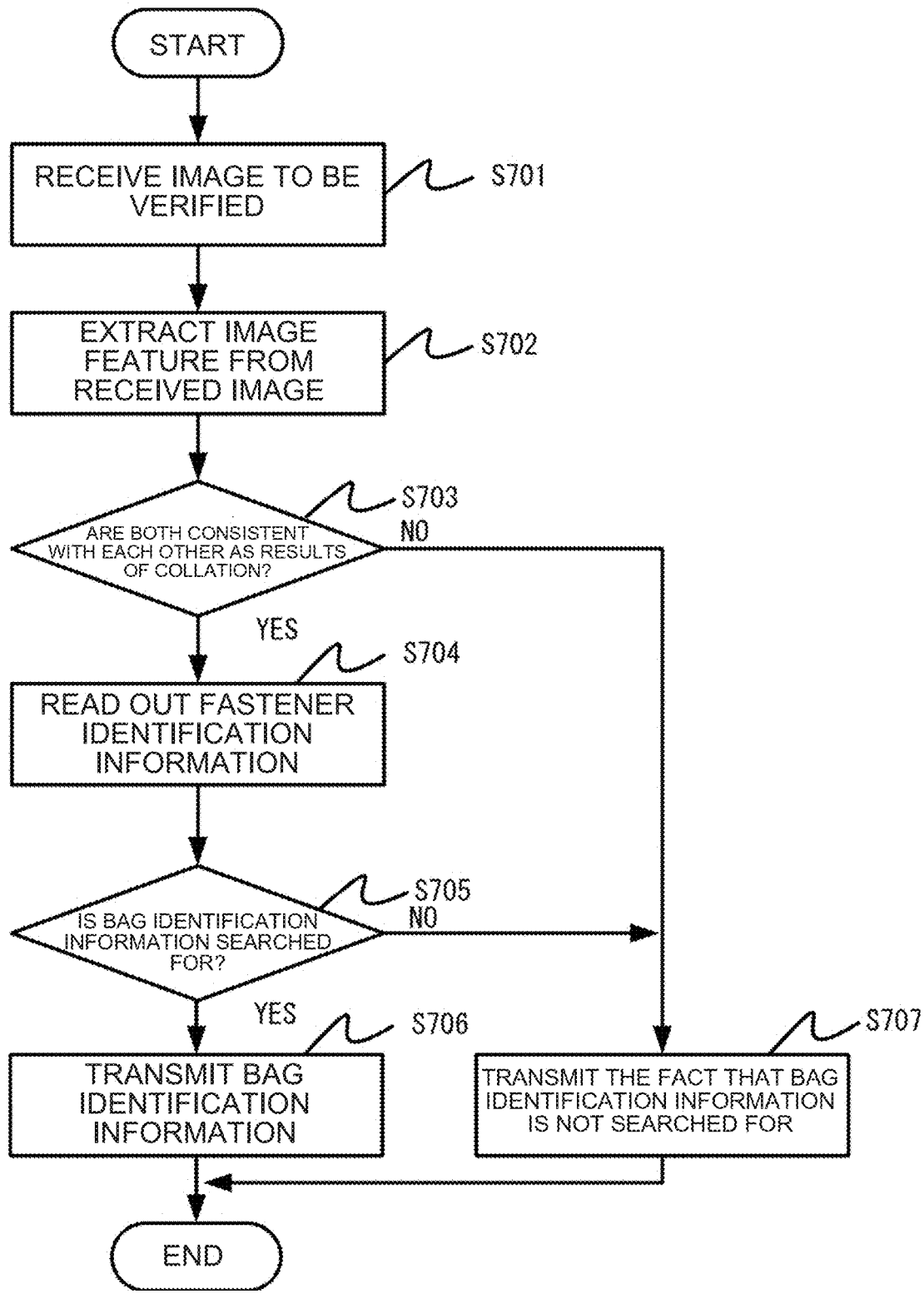
FIG. 36 is a flowchart for illustrating an example of operations according to the third embodiment of the present invention.

Next, operations of the verification system of this application will be described with reference to FIG. 36.

For verifying the bag to be verified, the consumer transmits an image obtained by imaging the textured pattern in the predetermined region of the pull-tab by the cell-phone, and the verification apparatus 312 receives the image (S701).

By the same method as the above-described method, the image feature extraction unit 3122 of the verification apparatus 312 extracts the image feature of the textured pattern in the predetermined region from the received image, and outputs the extracted image feature to the determination unit 3121 (S702).

The determination unit 3121 verifies the extracted image feature and the image features registered in the image feature storage 311 (S703).

In the case where both are consistent with each other (YES of S703), the determination unit 3121 reads out the fastener identification information in association with the image feature (S704). The determination unit 3121 searches the product information storage 313 for the bag identification information on the basis of the read-out fastener identification information (S705). In the case where the bag identification information is searched for (YES of S705), the determination unit 202 transmits the searched-for bag identification information to the cell-phone (S706). On the basis of whether the received bag identification information is consistent with the bag identification information about the bag to be verified, the consumer can authenticate whether the bag is a regular product.

On the other hand, as a result of the verification at S703, in the case where both are not consistent with each other (NO of S703), and as a result of the searching at S705, in the case where the bag identification information is not searched for (NO of S705), the determination unit 3121 transmits to the cell-phone the fact that information about the bag to be verified is not present (S707). As a result, the consumer recognizes that the bag is camouflaged or may be camouflaged.

As described above, in the present embodiment, even if an RFID chip is not built into fasteners one by one, the verification for the authenticity assessment and the like can be performed. Therefore, the verification for the authenticity assessment and the like for merchandise can be performed at low cost.

Further, even if the consumer does not have special equipment, the bag being the product can be verified. Further, as a result of the verification, information about the product can be also acquired.

Further, like the present embodiment, when the product information is configured as a database different from the image feature database, the producer can grasp component identification information about components that are built into the products by himself or herself. Therefore, the component identification information has only to be associated with the product identification information, and trouble for imaging components and acquiring the image feature of the component can be saved. Further, a secret of information about the product of his or her own can be kept to a component dealer, and on the other hand, the product of his or her own can be authenticated if necessary. Further, even if the component dealer does not manage the product information, the component identification information about his or her own component is only attached to components and provided to producers, and thereby value-added service of the component can be provided.

In the above-described embodiments, a case where the image feature is registered separately is used and descriptions are made. Further, like the embodiment 5-2, the third embodiment may have a configuration in which the image feature in each mold is stored in association with the product identification information for identifying each of the products individually or information about a product group like a merchandise name and the like.

Further, in place of the bag identification information or along with the bag identification information, information about the selling date and time of the products, producers of the products, production period of the products, and the like may be stored. As a result, the consistency between the above information and the obvious information (the brand, the serial number, and the like) from a logo and the like described in the product or design of the bag is verified, and the bag may be authenticated as an authentic product in the case where both are correctly consistent with each other. Further, through the present configuration, a physical distribution management of the products can be also performed.

Further, a configuration in which the image feature storage 311 is provided on the component supplier side and the product information storage 313 is provided on the producer side is used and descriptions are made. Further, the embodiment 5-3 may have a configuration in which both are provided on the component supplier side, on the producer side, and on the third party on the network. Alternatively, the embodiment 5-3 may have a configuration in which one of the both is provided on the third party on the network.

Embodiment 5-4

Continuously, an embodiment 5-4 of the verification system of this application will be described. In the present embodiment, a case where distribution log information is stored as the product information will be described. In the embodiment 5-4, verification in the case where a product is set to a bag, a component is set to a slide fastener, a pattern is set to a textured pattern, and product information is set to product identification information will be described. In addition, the same configurations as those of the above-described embodiments are indicated by the same reference numerals, and the detailed description will be omitted.

Figure 37:
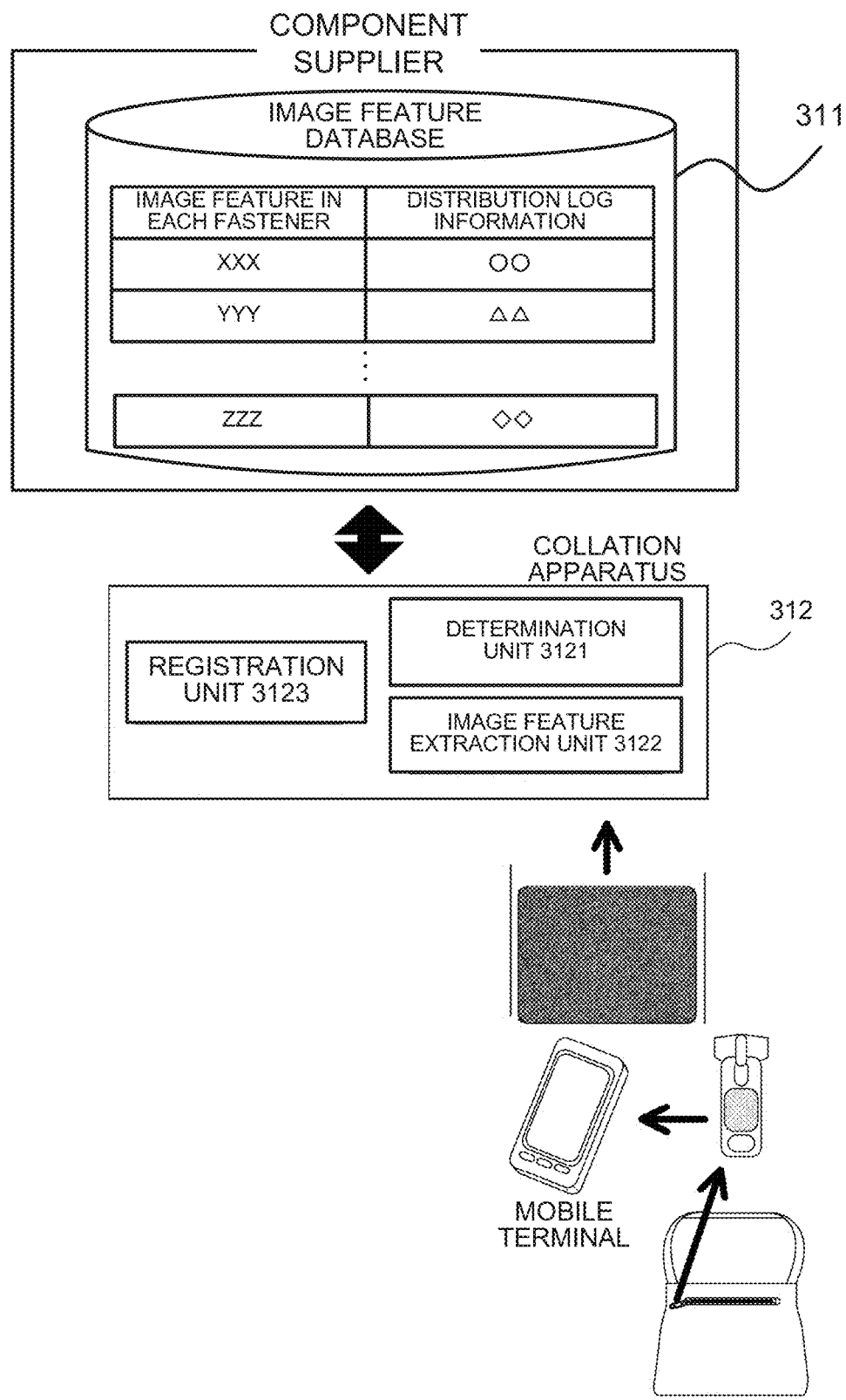
FIG. 37 is an example of a block diagram according to a fourth embodiment of the present invention.

FIG. 37 is a block diagram illustrating the verification system according to the fourth embodiment. In addition to the configuration of the above-described embodiments, the verification system 1 of the present embodiment includes a registration unit 3123.

The registration unit 3123 searches the image feature storage 311 for an image feature that is consistent with the image feature extracted by the determination unit 3121, and stores the image feature and the distribution log information about the fastener in association with each other. Here, the image feature and the distribution log information are stored in association with each other; further, the distribution log information may be stored in a form added to the product information except the distribution log information. Further, the distribution log information is not only one kind of information, but also information to be stored may be increased in an added form.

The image feature storage 311 stores the image feature information in each fastener and the distribution log information in association with each other, and the image feature storage 311 is installed on the component supplier side. The distribution log information is information in which the distribution course of the fastener or the bag on which the fastener is fixed is accumulated as a log. For example, the distribution log information is information about the distribution of a seller on the way of the distribution, a selling date and time, a passing date and time and a passing place of a custom office or an imitation product inspection, a final seller, a final selling date and time, a purchaser, and the like.

Figure 38:
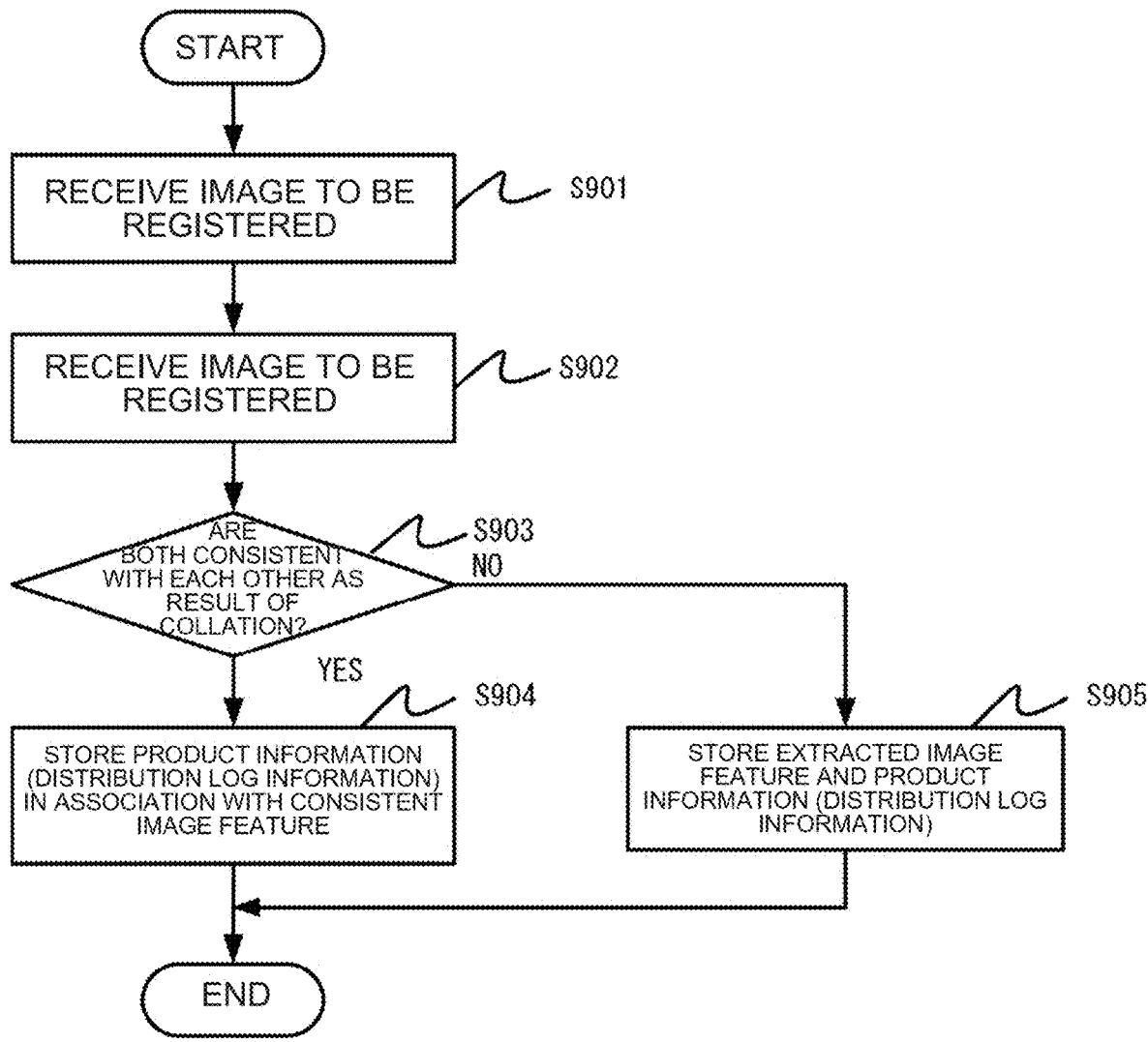
FIG. 38 is a flowchart for illustrating an example of registration operations according to the fourth embodiment of the present invention.

Next, operations of the present embodiment will be described. First, operations for registering the distribution log information in the distribution information database 5 will be described with reference to FIG. 38.

In a process of the distribution, by the cell-phone, a user transmits an image obtained by imaging the textured pattern in the predetermined region of the pull-tab, and the verification apparatus 312 receives the image (S901).

By using the same method as the above-described method, the image feature extraction unit 201 of the verification apparatus 312 extracts the image feature of the textured pattern in the predetermined region from the received image, and outputs the extracted image feature to the determination unit 3121 (S902).

The registration unit 3123 verifies the extracted image feature and the image features registered in the image feature storage 311 (S903).

In the case where both are consistent with each other (YES of S903), the determination unit 3121 stores the distribution log information in association with the image feature (S904). In the case where both are not consistent with each other (NO of S903), the determination unit 3121 stores the image feature and the distribution log information in association with each other (S905).

Operations for distribution authentication through the verification apparatus 312 of the present embodiment are the same as those of the embodiment 5-2, and therefore the descriptions will be omitted.

In addition, in the descriptions, a configuration in which the registration unit 3123 is provided in the verification apparatus 312 is used and descriptions are made. Further, by use of a configuration that is different from that of the verification apparatus 312, a registration device may be provided.

Further, in the descriptions, the distribution log information is stored in association with the image feature. In addition, the distribution log information may be further stored in association with the database in which the producer identification information, the product identification information, the individual identification information, and the like are already associated with the image feature. Further, the distribution log information is stored in the image feature database 11; further, a configuration in which a manager that manages the distribution log information is newly arranged, for example, on the network or the like may be used. In this case, the fourth embodiment has a configuration in which a database in which the image feature in each fastener and the fastener identification information are associated with each other is provided on the component supplier side, a database in which the fastener identification information or the image feature, and the product information, for example, the bag identification information are associated with each other is provided on the producer side, and further a database in which the fastener identification information or the image feature, and the distribution log information are associated with each other is provided on the manager side.

Figure 39:
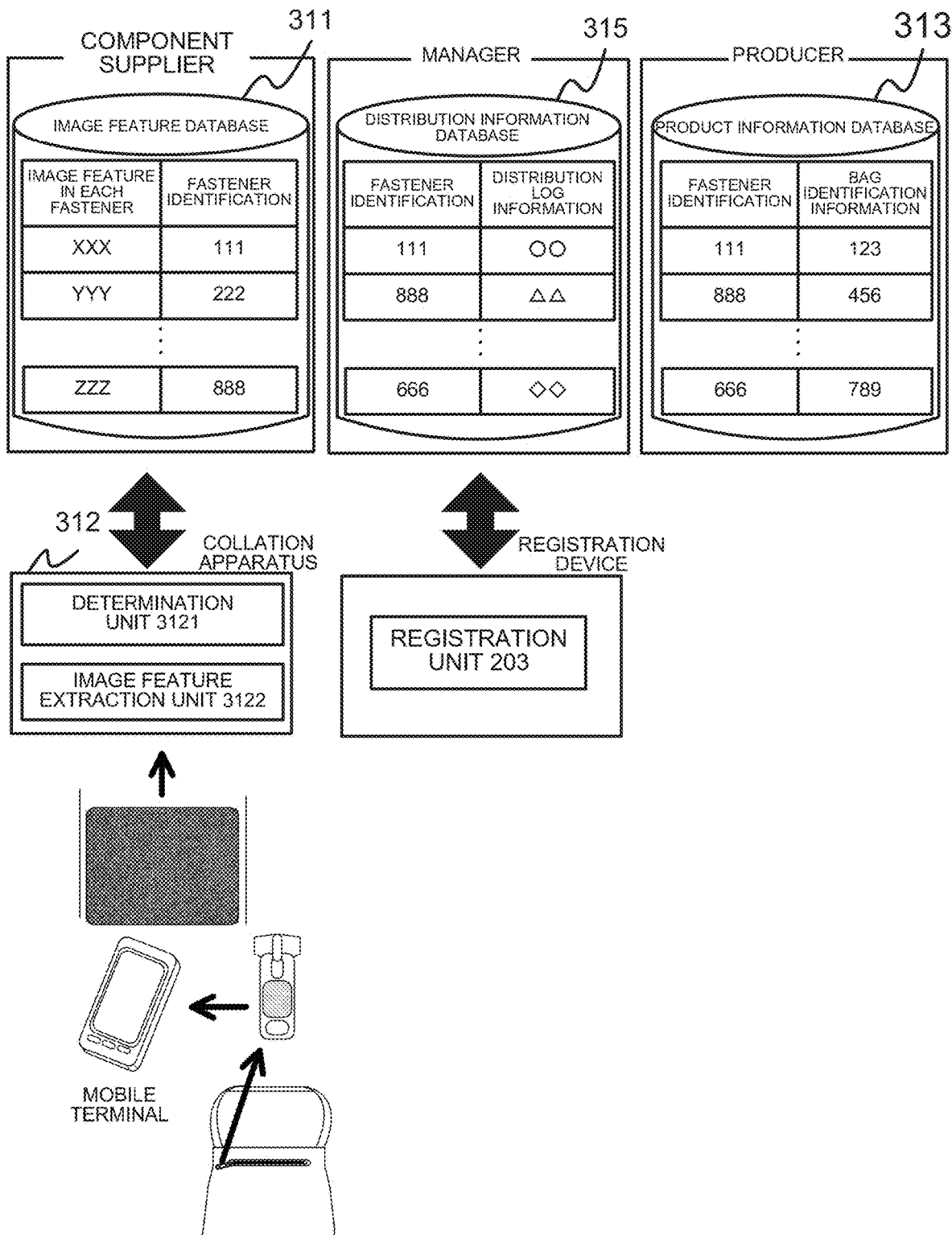
FIG. 39 is an example of a block diagram according to the fourth embodiment of the present invention.

Further, the registration unit 3123 may be configured apart from the verification apparatus 312, and further a configuration in which a manager that manages the distribution log information is arranged may be used. A configuration in this case is illustrated in FIG. 39. Here, a configuration will be described in which a database in which the image feature in each fastener and the fastener identification information are associated with each other is provided on the component supplier side and a database in which the fastener identification information and the bag identification information are associated with each other is provided on the producer side.

The registration device 3123 includes the registration unit. When the fastener identification information is received from the determination unit 3121 of the verification apparatus 312, the registration unit 3123 stores the fastener identification information and the fastener distribution information in the distribution information storage 315 in association with each other.

The distribution information storage 315 stores the fastener identification information and the distribution log information in association with each other, and is installed on the distribution manager side.

In addition to operations of the above-described embodiments, on the basis of the fastener identification information, the determination unit 3121 of the verification apparatus 312 can search the distribution information storage 315 for the distribution log information.

Figure 40:
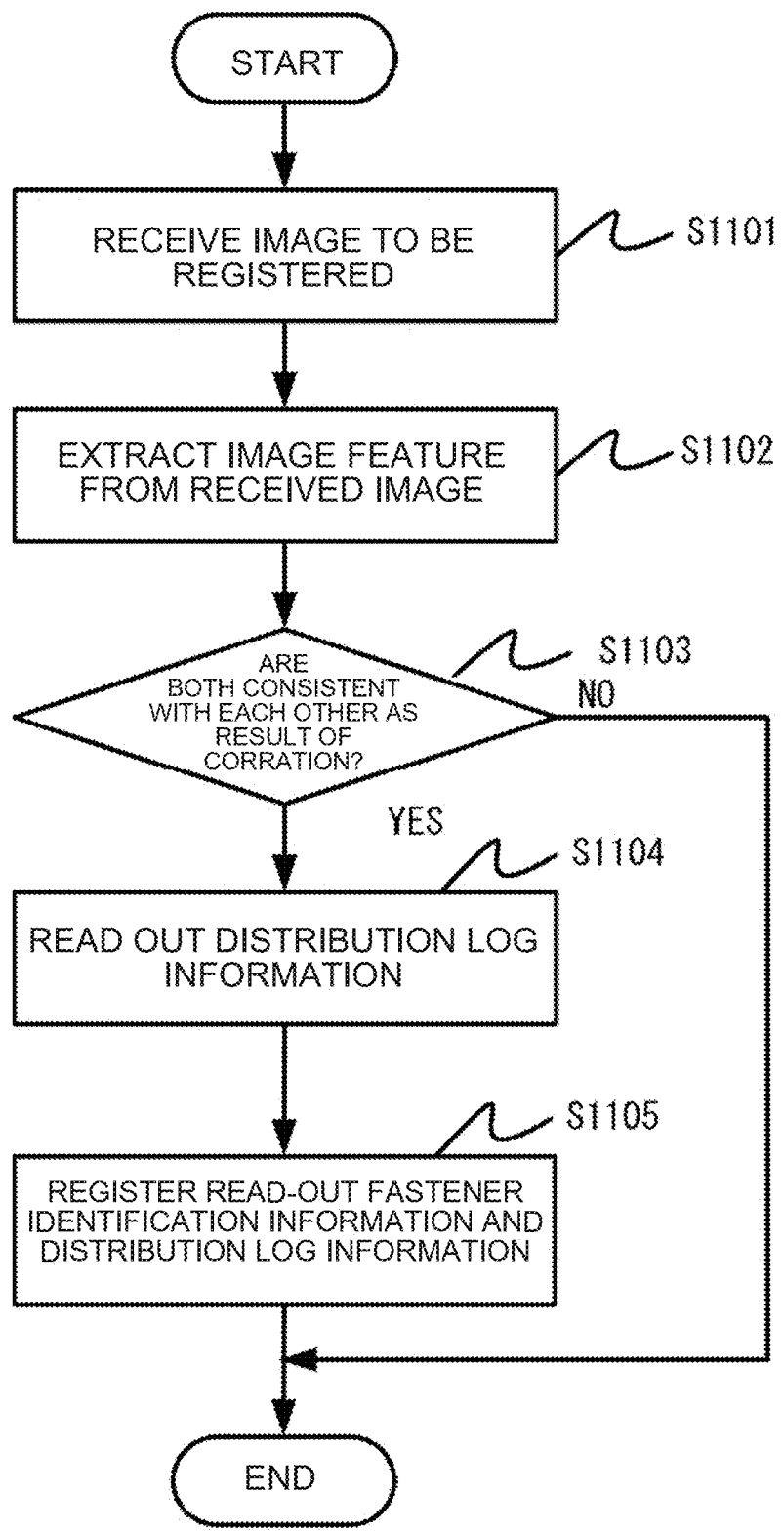
FIG. 40 is a flowchart for illustrating an example of registration operations according to the fourth embodiment of the present invention.

First, operations for registering the distribution log information in the distribution information storage 315 will be described with reference to FIG. 40.

In a process of the distribution, by the cell-phone, the user transmits an image obtained by imaging the textured pattern in the predetermined region of the pull-tab, and the verification apparatus 312 receives the image (S1101).

By using the same method as the above-described method, the image feature extraction unit 3122 of the verification apparatus 312 extracts the image feature of the textured pattern in the predetermined region from the received image, and outputs the extracted image feature to the determination unit 3121 (S1102).

The determination unit 3121 verifies the extracted image feature and the image features registered in the image feature storage 311 (S1103).

In the case where both are consistent with each other (YES of S1103), the determination unit 3121 reads out the fastener identification information in association with the image feature, and notifies the registration unit 3123 of the read-out fastener identification information (S1104). In the case where both are not consistent with each other (NO of S1103), the process is ended.

The registration unit 3123 associates the notified fastener identification information and the distribution log information input by the user with each other, and registers the distribution log information in the distribution information storage 315 (S1105).

Figure 41:
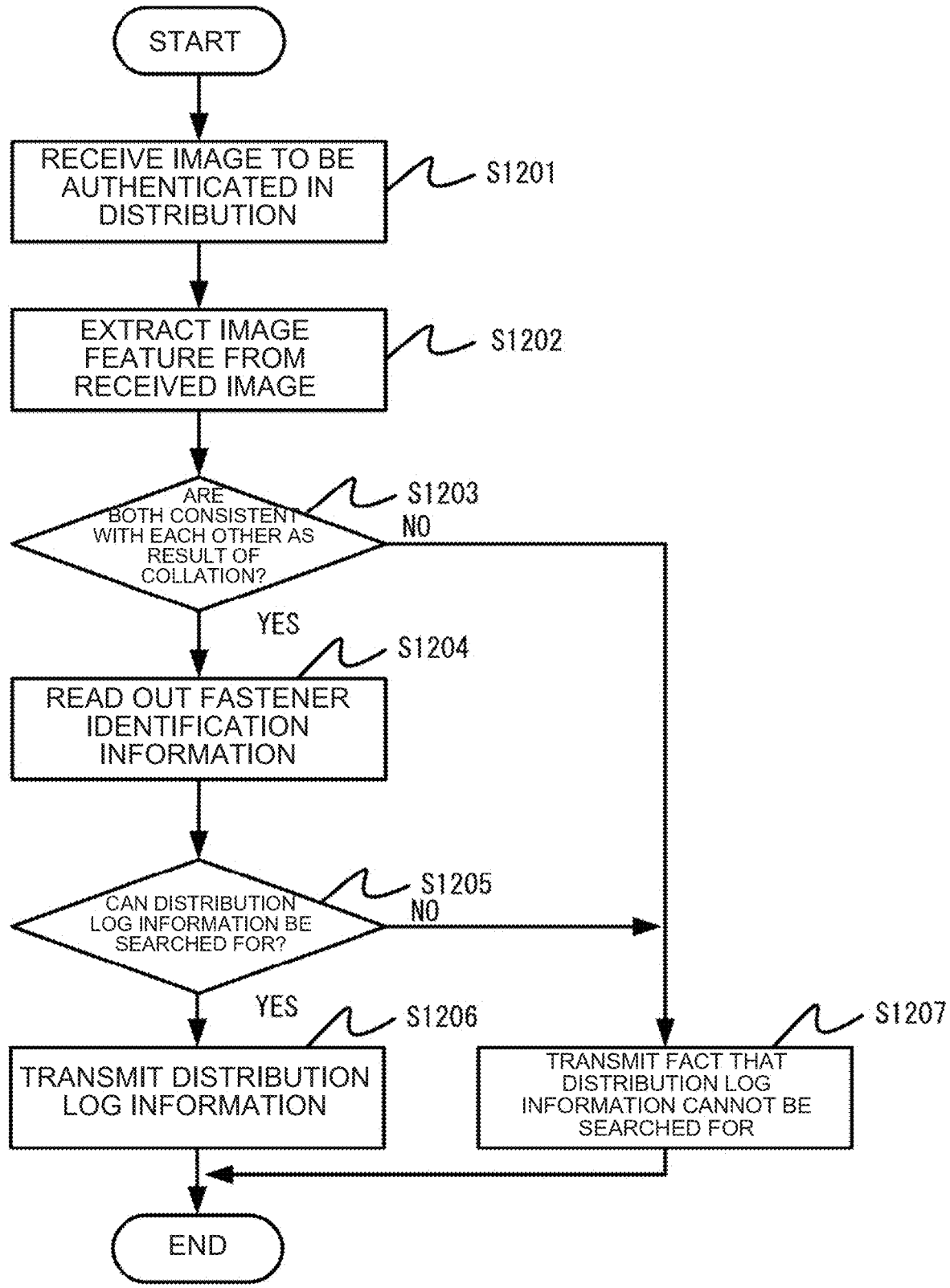
FIG. 41 is a flowchart for illustrating an example of operations for distribution authentication according to the fourth embodiment of the present invention.

Next, operations for the distribution authentication through the verification apparatus 312 will be described with reference to FIG. 41.

A consumer transmits the image obtained by imaging the textured pattern in the predetermined region of the pull-tab of the bag to be authenticated in the distribution, and the verification apparatus 312 receives the above image (S1201).

By using the same method as the above-described method, the image feature extraction unit 3122 of the verification apparatus 312 extracts the image feature of the textured pattern in the predetermined region from the received image, and outputs the extracted image feature to the determination unit 3121 (S1202).

The determination unit 3121 verifies the extracted image feature and the image features registered in the image feature storage 311 (S1203).

In the case where both are consistent with each other (YES of S1203), the determination unit 3121 reads out the fastener identification information in association with the image feature (S1204). On the basis of the read-out fastener identification information, the determination unit 3121 searches the distribution information storage 315 for the distribution log information (S1205). In the case where the distribution information storage 315 is searched for the distribution log information (YES of S1205), the searched-for distribution log information is transmitted to the cell-phone (S1206). The consumer may verify the consistency between the received distribution log information and information about the distribution assumed from the obvious information (the brand, the serial number, and the like) from a logo and the like described in the product or design of the bag, and authenticate the bag as an authentic product in the case where both is consistent with each other. In addition, through the above configuration, a physical distribution management of the products can be also performed.

On the other hand, as a result of the verification at S1203, in the case where both are not consistent with each other (NO of S1203), and as a result of the searching at S1205, in the case where the distribution information storage 315 is not searched for the distribution log information (NO of S1205), the determination unit 3121 transmits to the cell-phone the fact that information about the bag to be verified is not present (S1207). As a result, the consumer recognizes that the bag is camouflaged or may be camouflaged.

Figure 42:
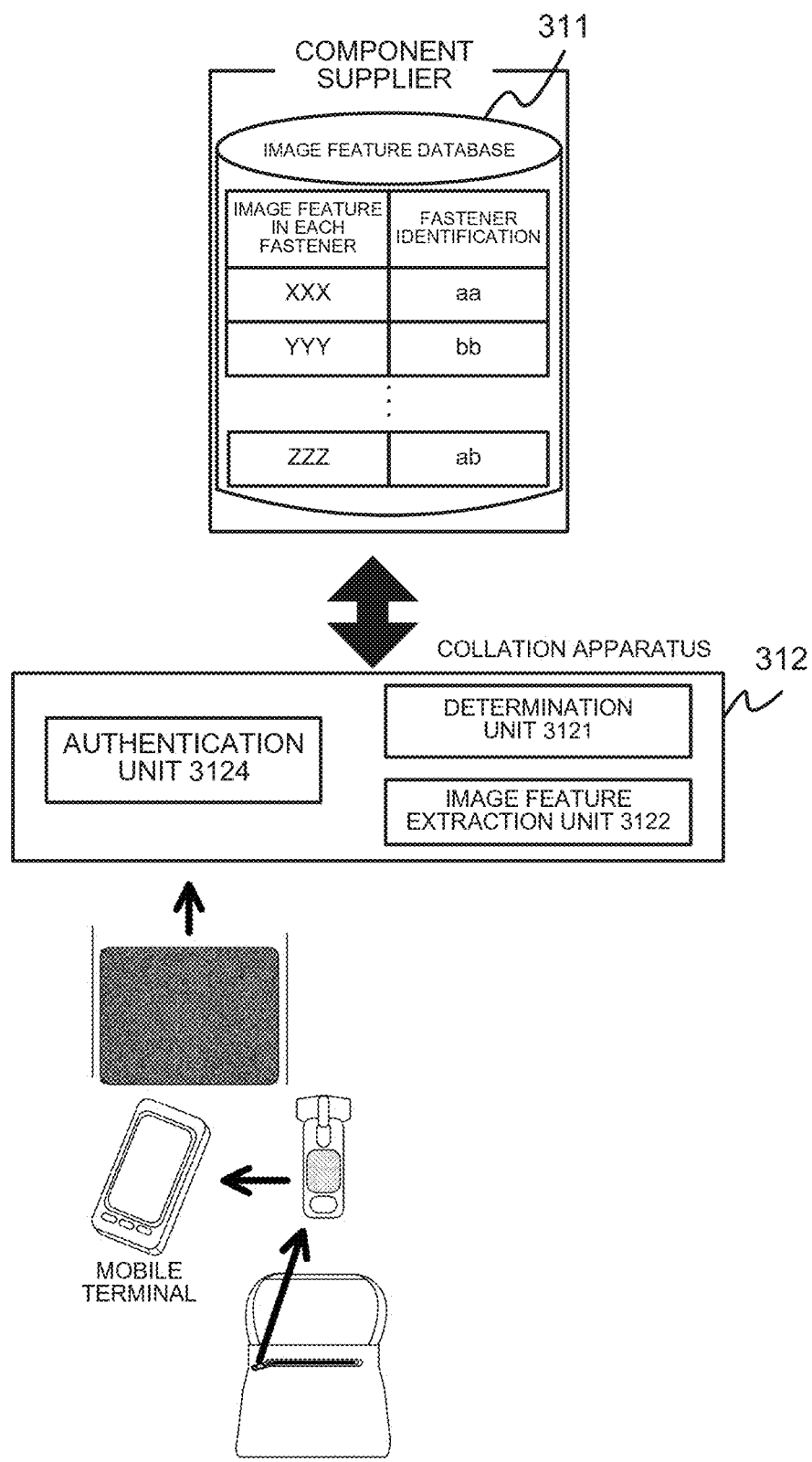
FIG. 42 is an example of a block diagram according to a sixth embodiment of the present invention.

In addition, the distribution information storage 315 on the manager side is provided in a distribution undertaker; further, may be stored in a form added to the image feature storage of the component dealer and the product information database of the producer. In that case, the distribution information storage 315 is managed through a string by information capable of searching for in common the component identification information, the image features of components, and the like. Further, in the configuration as illustrated in FIG. 42, the distribution log may be stored in association with each of the image feature database and the product information database.

As described above, according to the present embodiment, even if an RFID chip is not built into merchandise one by one, the physical distribution management, the authenticity assessment of the merchandise, and the like can be verified. Therefore, the verification for the physical distribution management of the merchandise can be performed at low cost. Further, when the distribution log in the case of failure in the verification (both are not consistent with each other) is analyzed, a finding place and a period of the imitation product can be also grasped.

Embodiment 5-6

Continuously, a fifth embodiment of the verification system of this application will be described. In the present embodiment, a configuration in which the verification information is stored as the product information will be described. In addition, the same configurations as those of the above-described embodiments are indicated by the same reference numerals, and the detailed descriptions will be omitted. Further, the embodiment 5-6 is applied to a case of the same configuration as that of the embodiment 5-4, and the descriptions will be made. Further, the fifth embodiment may be applied to any configuration of the embodiments as described above.

In the image feature storage 311, the registration unit 3123 of the present embodiment stores, as the product information, the verification information about verification results through the verification apparatus 312 of the above-described embodiments. Further, in the case where the verification place is stored as the verification information, positional information of the cell-phone by which the image information of the fastener to be verified is imaged is supposed to be acquired by a GPS function of the cell-phone, or by the positional information input with the use of the cell-phone through a consumer.

In addition, operations from the results up to the registration of the verification are the same operations as those of S903 to S905, and therefore the detailed descriptions will be omitted.

As described above, according to the present embodiment, when the products or the components are verified, the verification results and information about a place and a date and time of an object to be verified, a person in charge that performs the verification, and the like are accumulated as log data. Therefore, the component dealer or the product dealer can acquire market information about sales conditions, distribution course of his or her own products, how the products have been used, where an imitation product is generated, or the like. Further, the producer can acquire information obtained by performing market research or through distribution undertakers.

Embodiment 5-6

In the above-described embodiments, a consumer verifies the consistency between the verification results and the obvious information (the brand, the serial number, and the like) from a logo and the like described in the product or design of the bag, and authenticates the bag as an authentic product in the case where both are correctly consistent with each other. In the present embodiment, a configuration in which the verification apparatus performs the above will be described with reference to FIG. 42. In addition, the same configurations as those of the second embodiment are indicated by the same reference numerals, and the detailed descriptions will be omitted. In the following descriptions, a case where the image feature of the fastener and the brand name as the shipment destination information are stored in the image feature storage 311 on the component supplier side in association with each other will be used, and the present embodiment will be described. Any one of the configurations described in the first to fifth embodiments may be used.

In the verification apparatus 312 of the present embodiment, an authentication unit 3124 that performs an authenticity assessment of the product to be verified is newly provided. The authentication unit 3124 verifies the brand name of the bag transmitted from the cell-phone and the shipment destination read-out by the determination unit 3121. In the case where both are consistent with each other, the bag is authenticated as an authentic product. On the other hand, in the case where both are not consistent with each other, the bag is camouflaged or may be camouflaged is determined.

The cell-phone transmits the brand name of the bag to be verified input by the consumer along with the imaged image.

Figure 43:
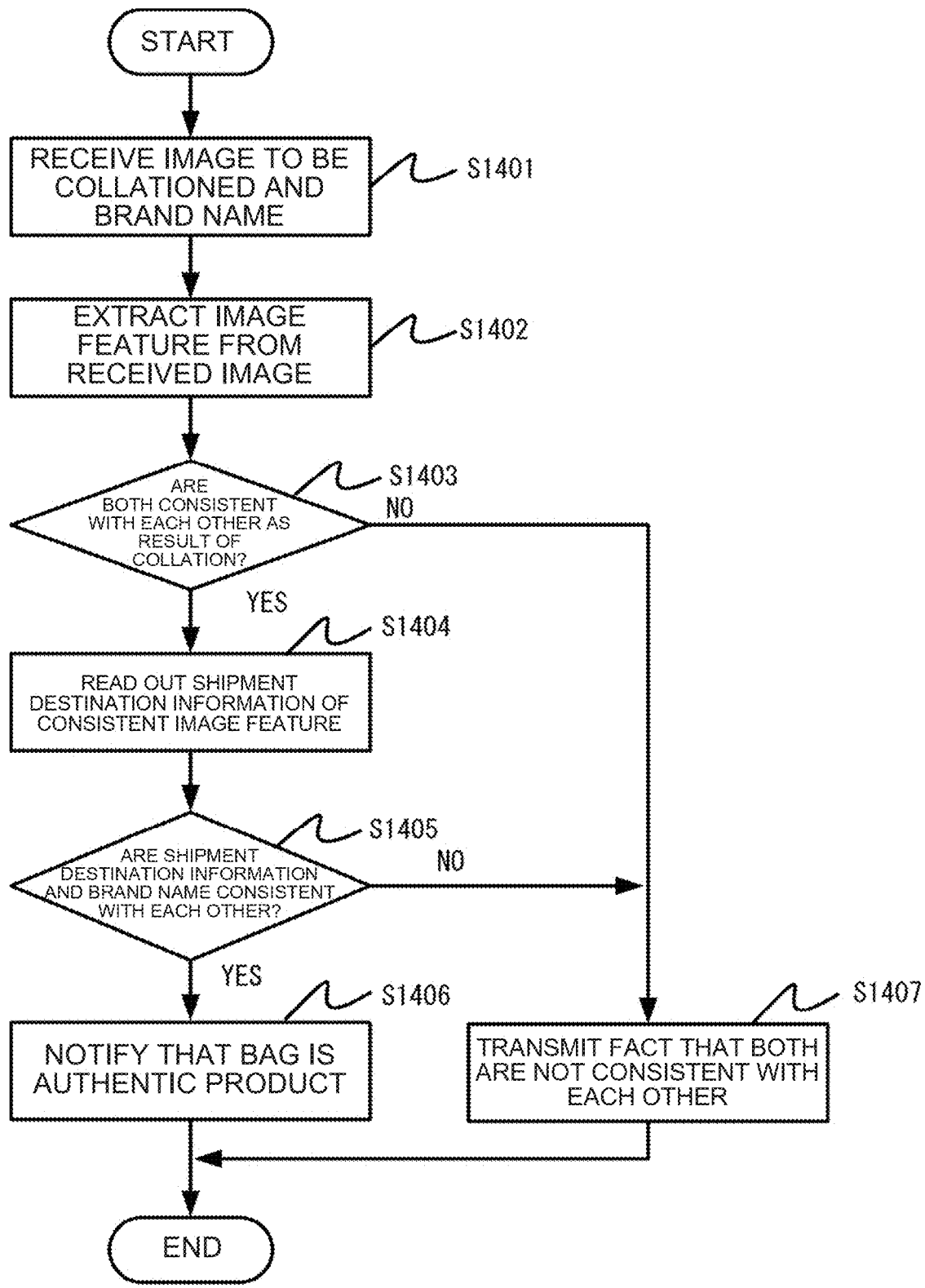
FIG. 43 is a flowchart for illustrating an example of operations according to the sixth embodiment of the present invention.

Operations of the present embodiment will be described with reference to FIG. 43.

For verifying the bag to be verified, by the cell-phone, the consumer transmits the brand name of the bag and the image obtained by imaging the textured pattern in the predetermined region of the pull-tab, and the verification apparatus 312 receives the image (S1401).

By using the same method as the above-described method, the image feature extraction unit 3122 of the verification apparatus 312 extracts the image feature of the textured pattern in the predetermined region from the received image, and outputs the extracted image feature to the determination unit 3121 (S1402).

The determination unit 3121 verifies the extracted image feature and the image features registered in the image feature storage 311 (S1403). In the case where both are consistent with each other (YES of S1403), the determination unit 3121 reads out the shipment destination information in association with the image feature and notifies the authentication unit 3124 of the read-out shipment destination information (S1404). The authentication unit 3124 verifies the notified shipment destination information and the received brand name of the bag (S1405). As a result of the verification, in the case where both are consistent with each other (YES of S1405), the bag is authenticated as an authentic product and the above fact is transmitted to the cell-phone (S1406). Thereby, an imitation product, a false description, and further the imitation product using another fastener fabricated by a regular components dealer can be also refused.

On the other hand, as a result of the verification, in the case where both are not consistent with each other in the verification of S1403 (NO of S1403), or in the case where both are not consistent with each other in the verification of S1405 (NO of S1405), the fact that both are not consistent with each other is transmitted to the cell-phone 2 (S1407). As a result, the consumer recognizes that the bag is camouflaged or may be camouflaged.

In the above-described embodiments, an authenticity assessment is performed by a kind of information. Further, plural kinds of information are input by the consumer, and the plural kinds of information may be combined to perform the authenticity assessment. In this case, a rate of the possibility that the bag is an authentic product or an imitation product can be also calculated and proposed to the consumer.

In the embodiments 5-1 to 5-5 described above, the verification apparatus 312 performs the verification processing. Further, from a database in which the image features of the components are registered like the image feature storage 311, the image feature is previously downloaded, and the verification processing may be performed by the cell-phone without the communication.

Further, in the embodiments 5-1 to 5-5 described above, a configuration in which the image imaged by the cell-phone is transmitted to the verification apparatus 312 is used. Further, a configuration in which the image feature of the imaged image is extracted and the extracted image is transmitted by the cell-phone, and the transmitted image feature is verified by the verification apparatus 312 may be used.

Further, the verification apparatus of the embodiments 5-1 to 5-5 described above may be configured in the cell-phone.

In the above-described embodiments, when the distribution log information or the verification information is stored as the product information, statistical processing of information about the predetermined component or product may be performed and a statistical processing unit that outputs distribution, sales, and usage conditions of the products may be provided. Further, when the verification results or the authentication results of the authenticity assessment of the products, and the verification places are stored as the verification information, statistical processing of information about failure in the verification may be performed and an analyzing device that analyzes generation conditions of the imitation products may be provided.

As an example thereof, in the above-described embodiments, the brand name of the bag to be verified input by the consumer is stored in the distribution information database 5 in association with the image feature of the textured pattern acquired from the fastener of the bag.

At this time, when a component producer manages the distribution information database, the fastener in association with the image pattern used in the verification can be known to be used in which bag of which brand. Further, the fastener component dealer can know a usage purpose of the fastener and apply the usage purpose to performance or designing. Alternatively, when the producer of the products manages the distribution information database, the produced product can be known to be distributed to which area for usage, and marketing information about the products can be obtained.

Further, in the case where an imitation product of a certain brand is distributed in a certain area in plurality, when the brand is verified in the area, the fact that failure in the verification is generated in plurality is stored in the distribution information database 5. Accordingly, data that is failed in the verification is collected, and thereby distribution conditions of imitation products of the brand can be statistically known.

Further, in the embodiments 5-1 to 5-4 described above, an example where the verification is performed for the authenticity assessment is used and descriptions are made. Further, the verification can be, of course, used as a purpose not for performing the authenticity assessment but for specifying an individual identification number, a production lot number, and the like of the product.

Embodiment 6

In the above embodiment, an embodiment has been described in which collation and retrieval of products are performed by utilizing differences in surface patterns (image patterns) in collation regions of components mounted on products or products. In the present embodiment, at least a part of the skeleton portion of the identification mark attached to the component or the product is set as a collation region, by using the textured pattern formed in the collation region of the component or the product or the component identifying the product having the component in one of its constituent elements. The terms used in this embodiment will be described below. Note that the same names and numbers are given to the same configurations and phrases as those in the above embodiment, and a detailed description thereof will be omitted.

The term identification mark refers to characters, figures, symbols, three-dimensional shapes, or a combination of thereof, or a combination thereof with colors, which are attached for identifying a component or a product. Examples of the identification mark include a trademark, a logo, the name of a manufacturer, the name of a manufacturing company, the name of a brand, the name of a product, a serial number, and a lot number.

Figure 44:
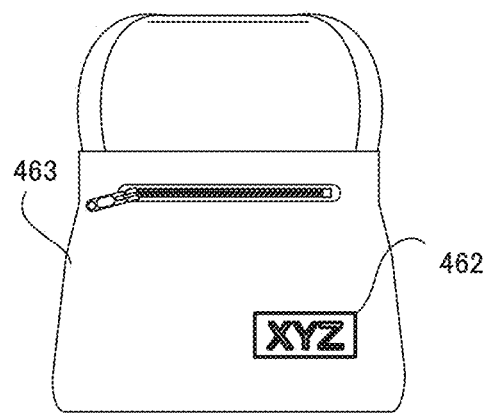
FIG. 44 is a diagram for explaining a skeleton part of an identification mark.

The term skeleton part of an identification mark refers to the portion of the main shape of the identification mark that can serve as an object perceived by human senses for identifying the identification mark, and is sometimes called colored portion or foreground portion. For example, assuming that there is an identification mark 451 as shown in FIG. 44, the identification mark 451 is comprised of a character portion 1a of "XYZ", a frame line portion 451b enclosing the character portion 451a of "XYZ", and a planar portion 451c. Out of these portions, the portion that can serve as the object perceived by human senses for identifying the identification mark, i.e., the skeleton part of the identification mark 451, is the character portion 451a of "XYZ" and the frame line portion 451b. It should be noted that the skeleton part is not necessarily three-dimensional having physical bumps or dips relative to portions other than the skeleton part, for example, to a texture (textile) portion, and it may be planar, similar to the other portions.

In this embodiment, the term matching area refers to at least a part of a skeleton part of an identification mark. In other words, it means that the whole skeleton part or only a part of the skeleton part may be defined as the matching area. In the example in FIG. 44, the character portion 1a and frame line portion 451b, for example, may be the matching area, or only the character portion 451a or frame line portion 451b may be the matching area. Furthermore, only a part of the character portion 451a or frame line portion 451b may be the matching area.

The term textured pattern formed in a matching area in a skeleton part of an identification mark includes a textured pattern formed as a design of the skeleton part of the identification mark, and in addition, a textured pattern deliberately formed in the matching area in the skeleton part of the identification mark for identifying a component or a product. It further includes a case in which a textured pattern only in the matching area is used even when the textured pattern is formed all over the skeleton part of the identification mark.

Now specific embodiments will be described hereinbelow.

Embodiment 6-1

An embodiment 6-1 of the present invention will be described. FIG. 22 is a block diagram of this embodiment of the present invention.

An identification system in the embodiment 6-1 of the present invention comprises: an image feature storage 3 in which, with at least a part of a skeleton part of an identification mark attached to a component or a product defined as a matching area, an image feature of a textured pattern formed in the matching area is stored; and an identification unit 11 for matching an image feature of a textured pattern formed in a matching area in a skeleton part of an identification mark attached to a component or a product to be identified, or in a skeleton part of a component that is one of constituent elements of a product to be identified, with an image feature stored in the image feature storage unit 3, and identifying the component, product, or product having the component as one of its constituent elements to be identified.

Figure 45:
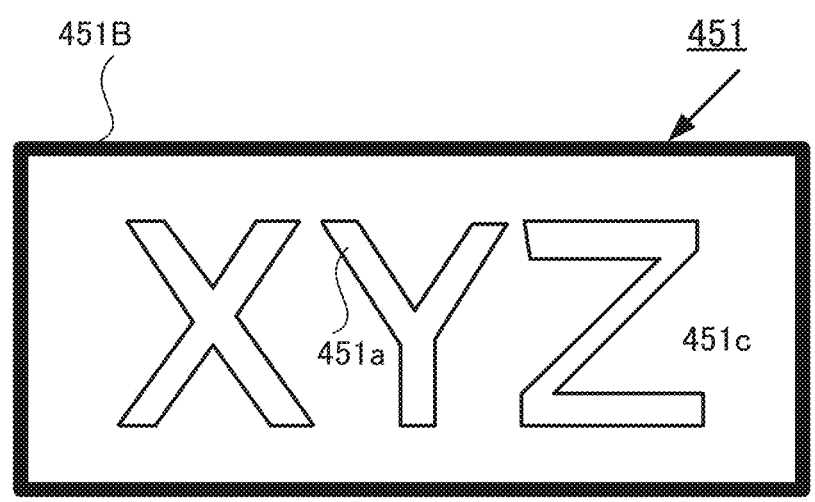
FIG. 45 is a diagram for explaining the product to be identified.
Figure 46:
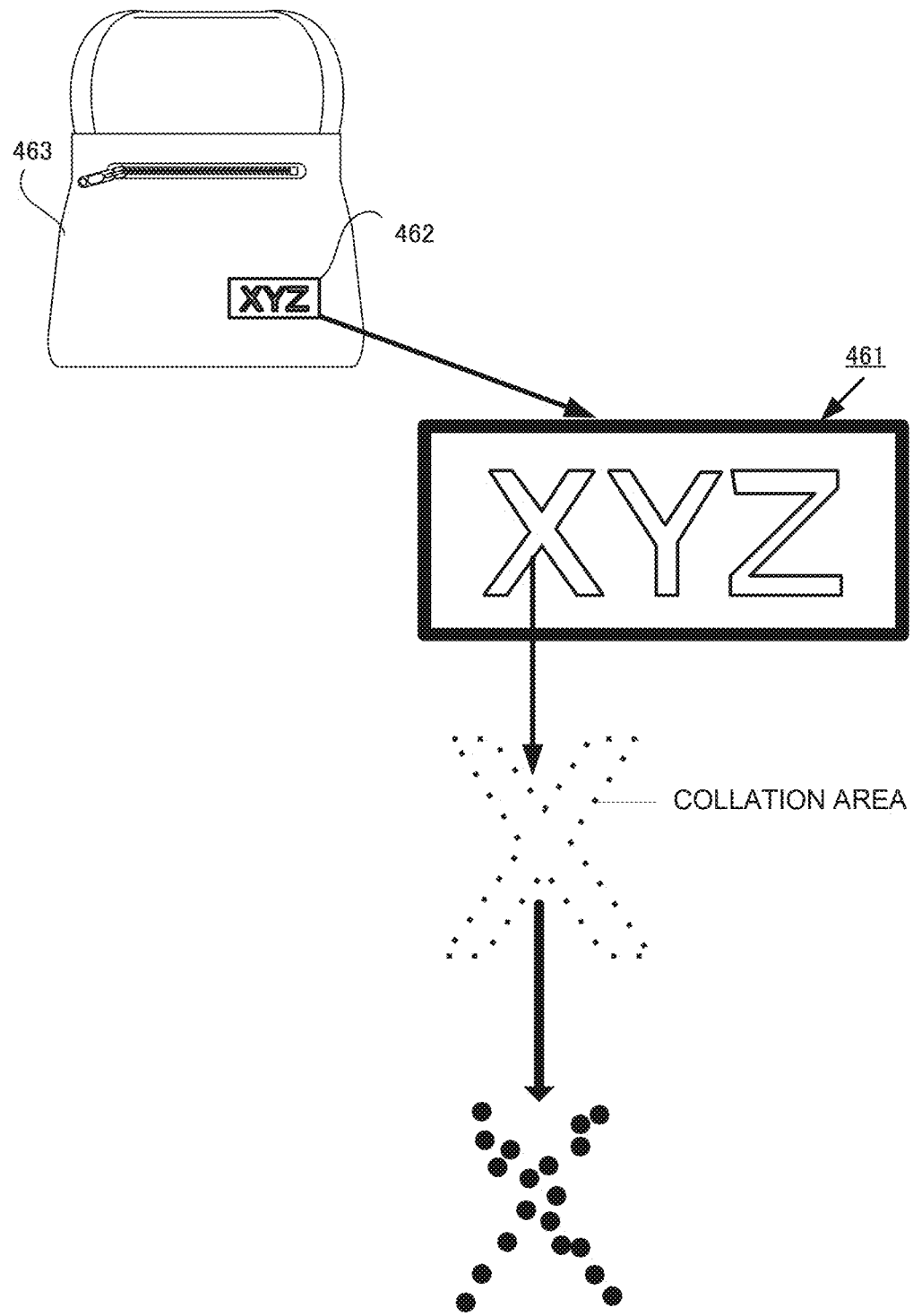
FIG. 46 is a diagram for explaining an embodiment 6-1.

The following description will address a case in which the component is a logo plate 462, and a bag 463 having the logo plate 462 as one of its constituent elements, i.e., bag 463 attached with the logo plate 462, is to be identified, as shown in FIG. 45. As such, assume that the portion of a character "X" within a skeleton part of an identification mark 1 of the logo plate 462 is defined as a matching area, in which area a textured pattern is formed, as shown in FIG. 46. The matching area, however, may be defined in a part of the character "X", rather than the whole character "X". As such, possible processing methods for making the textured pattern formed in the skeleton part of the identification mark may be generally classified into two types. One of the types is a processing method involving applying a textured pattern to a mold for fabricating a component and/or a product by injection molding or casting. Methods of the other type include textured processing by a process of generating a microscopic random bumps-and-dips pattern for each individual object, such as etching, blasting, cutting, crystal/powder coating, dispersion plating.

Next, imaging of the textured pattern in the matching area, extraction of the image feature of the textured pattern in the matching area, and registration into the image feature storage 10 will be described; according to the present embodiment, the portion of the character "X" is defined as the matching area, and the image feature of the textured pattern formed in the matching area is extracted beforehand for storing in the image feature storage 10. In mold-based textured processing, several samples of the logo plate 462 undergoing textured processing by the mold are chosen, and the textured pattern in the matching area of the samples of the logo plate 462 is imaged by an imaging apparatus, or the textured pattern of the mold (the portion for applying textured processing to a component or the like) is imaged by the imaging apparatus. Moreover, in the textured processing by finishing, the textured pattern of each logo plate 462 in the matching area is imaged by the imaging apparatus. An image feature is extracted from the imaged textured pattern and is registered in the image feature storage 10. The extraction of an image feature from a captured image may be achieved by performing extraction using an extraction technique for image features of fingerprints, such as the brightness value of the image, feature points, and points of inflection, intersecting points, end points and center points of lines in a binarized image.

In registering the image feature of the logo plate 462 in the image feature storage unit 3, management information for the bag 463 having the logo plate 462 as one of its constituent elements is registered in correspondence with the image feature of the logo plate 462. By doing so, the bag 463 is identifiable insofar as the logo plate 462 is identifiable.

Moreover, when extracting an image feature of a textured pattern in the matching area from a captured image of the textured pattern in the matching area, it is preferable to extract the image feature of the textured pattern in the matching area after normalizing the captured image of the textured pattern in the matching area. Since at least a part of a skeleton part of an identification mark attached to a component or a product is defined as a matching area according to the present embodiment, the skeleton part of the identification mark may be defined as a reference site. In the case of FIG. 46, for example, the portion of the character "X" within the skeleton part of the identification mark 1 of the logo plate 462 is defined as the matching area (the inside of the dotted line). As such, since the character "X" within the skeleton part is a part of the identification mark 461 and has a common shape and size among all samples of the logo plate 462, the character "X" may be defined as a reference site. The features of the character "X" serving as the reference site may then be stored, thus facilitating identification of the position/posture of the character "X" in the captured image. Therefore, by normalizing and identifying the position/posture of the character "X", the position/posture of the character "X" in the matching area may be normalized and specified for extracting the image feature of the textured pattern formed in the matching area. While a case in which the character "X" within the skeleton part is defined as the reference site is described in the present embodiment, the present invention is not limited thereto, and other component of the skeleton component, such as any other character or the surrounding frame line portion 461*b*, for example, may be defined as the reference site.

As described below, the collation/retrieval unit 6 normalizes a captured image of the textured pattern formed in the matching area 4 at the character "X" in the logo plate 462 to be identified that is captured under predetermined imaging conditions, and extracts an image feature. The extracted image feature for the logo plate 462 to be identified is then matched with an image feature stored in the image feature storage 3 to thereby identify the logo plate 462. When the logo plate 462 can be identified, the bag 463 can also be identified from management information corresponding to the image feature of the logo plate 462.

Effects of the present embodiment described above are as follows:

(1) since the textured pattern for identifying a component or a product is formed in the skeleton part of the identification mark, the textured pattern is perceived by human eyes as a colored region, thus inhibiting the design or the like of the identification mark;

(2) since the matching area is placed within the skeleton part of the identification mark and the identification mark is ordinarily recognized by anyone, it is easy, in identifying a component or a product, to determine which portion to image for identifying the component or product; and (3) in extracting an image feature of the texture, the skeleton part of the identification mark may be defined as a reference site, which enables easy normalization of the captured image.

This is because the skeleton part of the identification mark serving as the reference site in components or products of the same kind is given the same pattern in common, independent of individual objects.

Embodiment 6-2

Figures 47, 48:
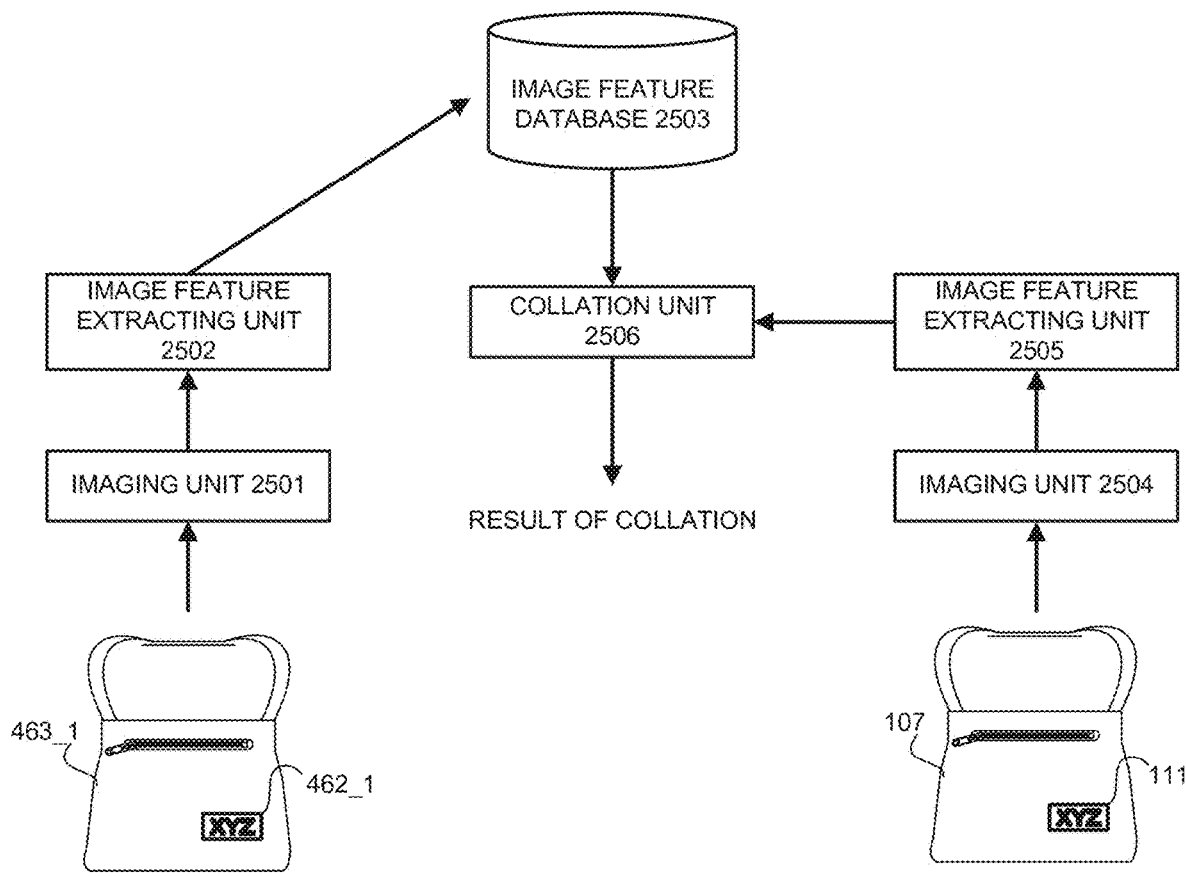
FIG. 47 is a block diagram of an embodiment 6-2.
FIG. 48 is a diagram showing an exemplary image feature database.

An embodiment 6-2 will be described. The embodiment 6-2 is directed to an identification system for a bag using a logo plate, in which an example of the component is the logo plate, and a textured pattern is formed in a matching area in a skeleton part of an identification mark in the logo plate by a mold. FIG. 47 is a configuration diagram of an identification system for a bag.

An imaging unit 2501 exists in a party engaged in production of a bag 463_1 (a manufacturer or the like of the bag) or a party engaged in quality control of the bag 100, for imaging a matching area in a skeleton part of an identification mark in a logo plate 462_2 attached to the bag 463_1 by a manufacturer or the like. The imaging unit 2501 is for performing imaging under the predetermined imaging conditions as described above. As for the number of samples to be imaged, since generally the same textured pattern is formed for each mold in the case of the mold-based textured processing, several samples of the logo plate may be chosen for each mold, and the chosen samples of the logo plate may be imaged. Moreover, the file type of the captured image is arbitrary, and may be JPEG or the like.

An image feature extracting unit 2502 is for extracting an image feature of a textured pattern in the matching area from the image captured at the imaging unit 2501. The extraction of the image feature is achieved by, as described above, normalizing the image captured at the imaging unit 2501 using the skeleton part of the identification mark, and then performing extraction using an extraction technique for image features of fingerprints, such as the brightness value of the image, feature points, and points of inflection, intersecting points, end points and center points of lines in a binarized image. The thus-extracted image features are registered in an image feature database 2503.

The image feature database 2503 stores therein a mold, an image feature of the textured pattern in the matching area of the logo plate 462_1 processed by the mold, and management information for the bag 463_1 attached with the logo plate 462_1 in correspondence with one another, as shown in FIG. 48. It should be noted that the management information refers to a concept encompassing identification information for a component or a product, or a product attached with the component, and in addition, management information for the component or product such as production information including the place of manufacture, product line, and date and time of production for the component or product, and distribution information including the name of the product in which the component is used, delivery destination, date of delivery, and the like.

As such, by making an image feature of a textured pattern in a component in correspondence with management information for the component or product, or product attached with the component, it is possible to achieve acquisition of historical information on the identified logo plate 462_1 (component), and identification of the bag 463_1 (a product having the component as one of its constituent elements) attached with the logo plate 462_1 as well.

The imaging unit 2504 and image feature extracting unit 2505 exist in a party that performs matching/identification of a bag, such as an inspection department for the bag, a delivery destination for the bag, and a dealer or a purchaser of the bag, and the units 2504, 2505 have similar configurations to those of the imaging unit 2501 and image feature extracting unit 2502.

The matching unit 2506 matches an image feature in a matching area of a logo plate 462_2 in a bag 463_2 to be matched that is extracted at the image feature extracting unit 2505 with an image feature stored in the image feature database 2503, and in the case that there is found a matched entry, it decides that the logo plate 462_2 in the bag 463_2 to be matched is an authorized logo plate registered in the image feature database 2503. For example, when an image feature of the logo plate 462_1 is "YYY", the logo plate 462_1 may be identified as that processed by the mold 2. The bag 463_1 attached with the logo plate 462_1 may be then identified as that with management information "100".

An image feature matching method may comprise, for example, defining end points, intersecting points, and corners of lines in the textured pattern as feature points, matching the positions of the feature points, and deciding identity in the case that the number of pairs of feature points lying at the same position (within a certain threshold range) is a certain number or more. Such a matching technique may be achieved by employing any existing fingerprint matching technique.

It should be noted that the imaging unit, image feature extracting unit, image feature database, and matching unit described above each may stand alone and be connected with one another via a network, or several ones among them may be integrally present.

As described above, according to the present embodiment, an individual object of a component or a product, or a mold used in manufacture of the component or product may be subjected to matching relying upon a textured pattern formed in a skeleton part of an identification mark while eliminating the need for any special apparatus such as a tag for identifying an article or an RFID tag, and at the same time, without degrading the design of the identification mark such as a trademark or a logo. In particular, according to this embodiment 6-2, generally the same textured pattern is formed for each mold because of mold-based textured processing, which is useful when mold-based matching is performed, for example, in mold-based quality inspection. Moreover, it enables decision of a fake product because fake products and the like are produced using a different mold from that for authorized products.

Embodiment 6-3

An embodiment 6-3 will be described. The embodiment 6-3 is directed to an identification system for a bag using a logo plate, in which an example of the article is the logo plate, and a textured pattern is individually formed in a matching area in a skeleton part of an identification mark in a logo plate zipper by blasting. FIG. 49 is a configuration diagram of a matching system for a zipper.

An imaging unit 2501 exists in a party engaged in production of a bag 463_1 (a manufacturer or the like of the bag) or a party engaged in quality control of the bag 463_1, for imaging a matching area in a skeleton part of an identification mark in a logo plate 462_1 attached to the bag 463_1 by a manufacturer or the like. In addition, the imaging unit 2501 is for performing imaging under the predetermined imaging conditions described above. Moreover, the file type of the captured image is arbitrary, and may be JPEG or the like.

An image feature extracting unit 2502 is for extracting an image feature of a textured pattern in the matching area from the image captured at the imaging unit 2501. The extraction of the image feature is achieved by, as described above, normalizing the image captured at the imaging unit 2501 using the skeleton part of the identification mark, and then performing extraction using an extraction technique for image features of fingerprints, such as the brightness value of the image, feature points, and points of inflection, intersecting points, end points and center points of lines in a binarized image. The thus-extracted image features are registered in an image feature database 2503.

The image feature database 2503 stores therein individual object identification information for identifying an individual object of the logo plate 462_1, an image feature of the textured pattern in the matching area of the logo plate 462_1, and management information for the bag 463_1 attached with the logo plate 462_1 in correspondence with one another, as shown in FIG. 50. The individual object identification information for the logo plate 462_1 may include management information for the component or product such as production information including the place of manufacture, product line, and date and time of production for the component or product, and distribution information including the name of the product in which the component is used, delivery destination, date of delivery, and the like. Moreover, the management information for the bag 463_1 refers to a concept encompassing identification information for a component or a product, or a product attached with the component, and in addition, management information for the component or product such as production information including the place of manufacture, product line, and date and time of production for the component or product, and distribution information including the name of the product in which the component is used, delivery destination, date of delivery, and the like.

As such, by making an image feature of a textured pattern in a component in correspondence with management information for the component or product, or product attached with the component, it is possible to achieve acquisition of historical information on the identified logo plate 462_1 (component), and identification of the bag 463_1 (a product having the component as one of its constituent elements) attached with the logo plate 462_1 as well.

The imaging unit 2504 and image feature extracting unit 2505 exist in a party that performs matching/identification of a bag, such as an inspection department for the bag, and a delivery destination for the bag, including a dealer or a purchaser of the bag, and the units 2504, 2505 have similar configurations to those of the imaging unit 2501 and image feature extracting unit 2502.

The matching unit 2506 matches an image feature in a matching area of a logo plate 462_2 in a bag 463_2 to be matched that is extracted at the image feature extracting unit 2505 with an image feature stored in the image feature database 2503, and in the case that there is found a matched entry, it decides that the logo plate 462_2 to be matched is an authorized logo plate registered in the image feature database 2503. For example, when the image feature of the logo plate 462_2 is "YYY", the logo plate 462_2 may be identified as that specified by identification information "logo plate 2". The bag 463_2 attached with the logo plate 462_2 may be then identified as that with management information "200".

An image feature matching method may comprise, for example, defining end points, intersecting points, and corners of lines in the textured pattern as feature points, matching the positions of the feature points, and deciding identity in the case that the number of pairs of feature points lying at the same position (within a certain threshold range) is a certain number or more. Such a matching technique may be achieved by employing any existing fingerprint matching technique.

It should be noted that the imaging unit, image feature extracting unit, image feature database, and matching unit described above each may stand alone and be connected with one another via a network, or several ones among them may be integrally present.

As described above, according to the present embodiment, an individual object of a component or a product, or a mold used in manufacture of the component or product may be subjected to matching relying upon a textured pattern formed in a skeleton part of an identification mark while eliminating the need for any special apparatus such as a tag for identifying an article or an RFID tag, and at the same time, without degrading the design of the identification mark such as a trademark or a logo. In particular, according to this third embodiment, since textured processing is based on finishing marks, and a textured pattern is formed differently from component to component or from product to product, matching of a component or a product may be distinguished at the level of the individual object.

Embodiment 6-4

Figure 51:
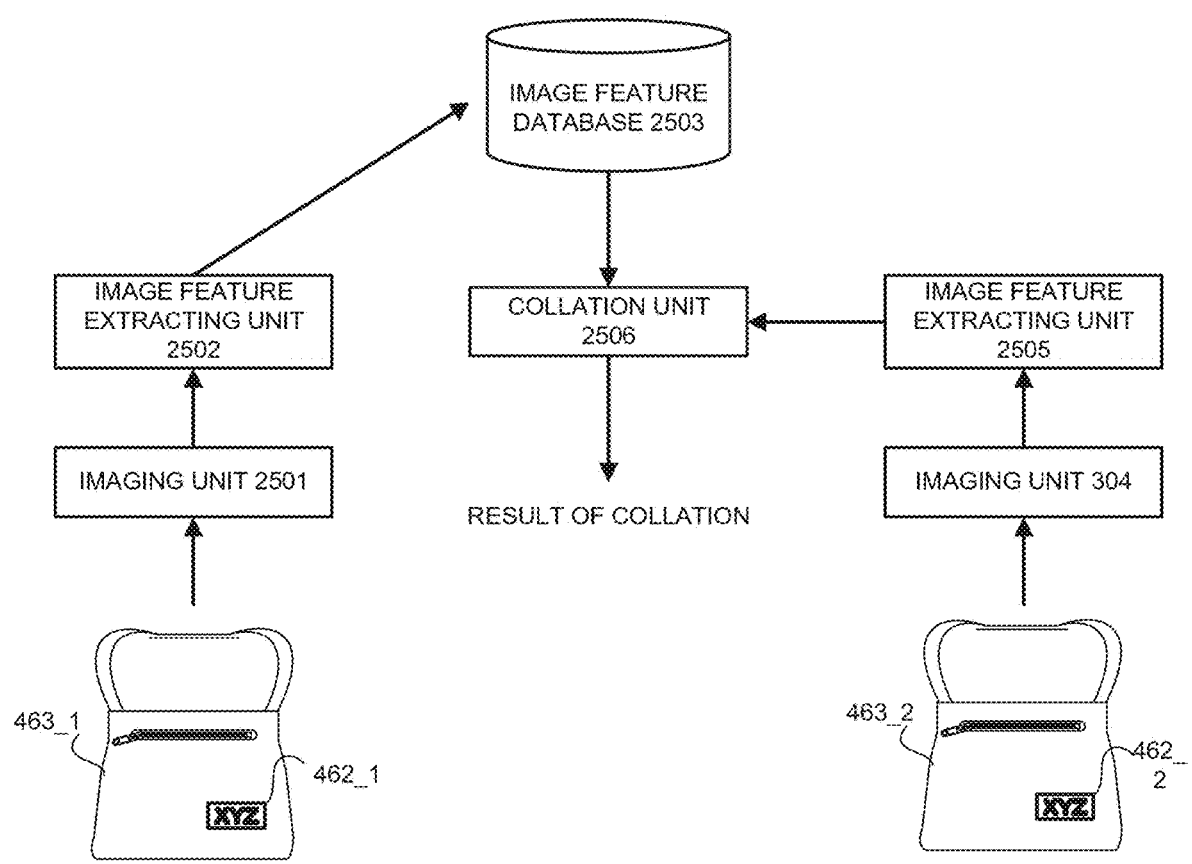
FIG. 51 is a block diagram of an embodiment 6-4.

An embodiment 6-4 will be described. The embodiment 6-4 is directed to an identification system for a bag using a logo plate, in which an example of the article is the logo plate, and over a textured pattern for the logo plate applied by a mold, blasting, textured finish by powder coating, or plating is applied as a later finishing process. FIG. 51 is a configuration diagram of an identification system for a bag.

An imaging unit 2501 exists in a party engaged in production of a bag 463_1 (a manufacturer or the like of the bag) or a party engaged in quality control of the bag 463_1, for imaging a matching area in a skeleton part of an identification mark in a logo plate 462_1 attached to the bag 463_1 by a manufacturer or the like. The imaging unit 2501 is for performing imaging under the predetermined imaging conditions described above. Moreover, the file type of the captured image is arbitrary, and may be JPEG or the like.

An image feature extracting unit 2502 is for extracting an image feature of a textured pattern in the matching area from the image captured at the imaging unit 2501. The extraction of the image feature is achieved by, as described above, normalizing the image captured at the imaging unit 2501 using the skeleton part of the identification mark, and then performing extraction using an extraction technique for image features of fingerprints, such as the brightness value of the image, feature points, and points of inflection, intersecting points, end points and center points of lines in a binarized image. The thus-extracted image features are registered in an image feature database 2503.

In acquiring an image feature of the logo plate 462_1, the logo plate 462_1 has a textured pattern applied by a mold, and thereover, blasting, textured finish by powder coating, or plating is applied as a later finish process. Therefore, as described above, differences in feature from individual object to individual object are additionally provided by further finishing while preserving differences in feature from mold to mold as they are. Accordingly, it is desirable to choose several samples of the logo plate 462_1 for each mold, and acquire only an image feature of the textured pattern by the mold before the later finish process (which will be referred to as mold difference image feature). For other individual objects, an image feature of the textured pattern after the later finish process (individual object difference image feature) is acquired in addition to the mold-based textured pattern.

Exemplary methods for acquiring the mold difference image feature and individual object difference image feature include the following: Represent the size of each microscopic bump and dip generated by textured processing applied to a mold as a, and that of each of bumps and dips further generated by the later finish process as b. As such, assume that the texturing processes are controlled so that a>b, for example. In images of individual objects manufactured from the same mold, flecks are generated with size a mixed with those with size b. As such, only the flecks having an approximate size of a may be acquired as feature points to acquire a mold difference image feature. Moreover, the flecks with size b may be extracted to acquire an individual object difference image feature.

More stable mold matching may be achieved by extracting the mold difference feature from a plurality of samples and taking their average and the like.

The image feature database 2503 stores therein individual identification information for identifying an individual object of the logo plate 462_1, an image feature of the textured pattern in the matching area by the mold with which the logo plate 462_1 is produced (mold difference image feature), an image feature of the textured pattern formed over the matching area in the logo plate 462_1 produced with each mold during a later finish process (individual object difference image feature), and management information for the bag 300 attached with the logo plate 310 in correspondence with one another, as shown in FIG. 52. The individual object identification information for the logo plate 462_1 may include management information for the component or product such as production information including the place of manufacture, product line, and date and time of production for the component or product, and distribution information including the name of the product in which the component is used, delivery destination, date of delivery, and the like. Moreover, the management information for the bag 463_1 refers to a concept encompassing identification information for a component or a product, or a product attached with the component, and in addition, management information for the component or product such as production information including the place of manufacture, product line, and date and time of production for the component or product, and distribution information including the name of the product in which the component is used, delivery destination, date of delivery, and the like.

As such, by making an image feature of a textured pattern in a component in correspondence with management information for the component or product, or product attached with the component, it is possible to achieve acquisition of historical information on the identified logo plate 462_1 (component), and identification of the bag 463_1 (a product having the component as one of its constituent elements) attached with the logo plate 462_1 as well.

The imaging unit 2504 and image feature extracting unit 2505 exist in a party that performs matching/identification of a bag, such as an inspection department for the bag, and a delivery destination for the bag, including a dealer or a purchaser of the bag, and the units 2504, 2505 have similar configurations to those of the imaging unit 2501 and image feature extracting unit 2502.

The matching unit 2506 matches an image feature in a matching area of a logo plate 452_2 in a bag 453_2 to be identified that is extracted at the image feature extracting unit 2505 with an image feature stored in the image feature database 2503, and in the case that there is found a matched entry, it decides that the logo plate 452_2 to be identified is an authorized logo plate registered in the image feature database 2503. As such, the matching unit 2506 initially matches the image feature in the matching area of the logo plate 452_2 in the bag 4503_2 to be identified with the image feature of the textured pattern (mold difference image feature) in the matching area by the mold to thereby distinguish a mold with which the logo plate 4502_2 is produced. Next, it matches an individual object difference image feature of a group of zippers produced with the distinguished mold with the image feature (individual object difference image feature) of the logo plate 4502_2 to check an individual object of the logo plate 4502_2.

For example, in the case that an image feature of the logo plate 4502_2 is "AAA+YYY", screening using the size of flecks or the thickness of lines, for example, can separate the image feature into the feature point AAA and the feature point YYY, as described above. Since the image feature of the logo plate 4502_2 includes "AAA", the product may be distinguished as that produced from a mold A. Then, an image feature of a group of logo plates produced form the mold A may be matched with the image feature "AAA+YYY" of the logo plate 4502_2 to be matched to thereby identify the logo plate 4502_2 as a logo plate specified by identification information "logo plate 2". The bag 4503_2 attached with the logo plate 4502_1 may be then identified as that with management information "101".

It should be noted that the imaging unit, image feature extracting unit, image feature database, and matching unit described above each may stand alone and be connected with one another via a network, or several ones among them may be integrally present.

As described above, a characteristic point of the embodiment 6-4 is that, in addition to the effects in the 6-2 and 6-3 embodiments described above, it is not necessary to perform matching with all registered image features even when an individual object of a component or a product is to be identified, which achieves high-speed matching processing. Moreover, hierarchical matching may be achieved by performing merely mold-level matching for producing the component or product while eliminating the need to perform individual object-level matching of a component or a product.

Embodiment 6-5

An embodiment 6-5 will be described. The embodiment 6-5 is a registration apparatus for: applying textured finish generating microscopic random bumps and dips to at least a part of a skeleton part of an identification mark attached to a component such as a logo plate, and forming a textured pattern for matching; with at least a part of a skeleton part formed with a textured pattern defined as a matching area, imaging a textured pattern in a matching area under predetermined imaging conditions; and registering in a database identification information for identifying the component in correspondence with an image feature of the imaged textured pattern in a matching area.

Figure 53:
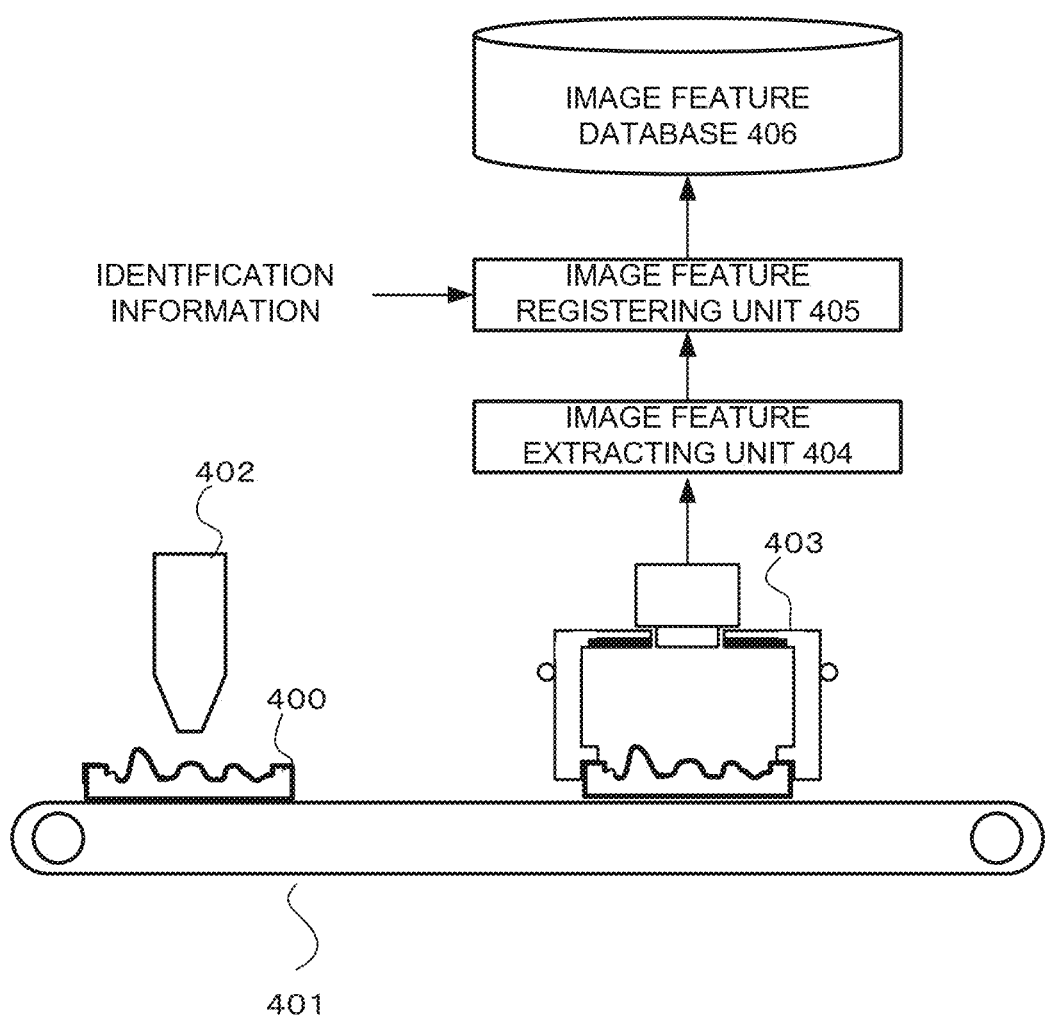
FIG. 53 is a block diagram of an embodiment 6-5.

FIG. 53 is a block diagram of the registering apparatus in the embodiment 6-5.

The registering apparatus in the embodiment 6-5 comprises: a belt conveyor 401 for carrying a component 400; a textured pattern forming unit 402 for forming a textured pattern in the component 400; an imaging unit 403 for imaging the textured pattern in the matching area of the component 400 under predetermined imaging conditions; an image feature extracting unit 404 for extracting an image feature in the matching area from an image captured at the imaging unit 403; and an image feature registering unit 405 for registering the extracted image feature in correspondence with identification of the component into an image feature database 406.

The textured pattern forming unit 402 is for applying textured finish generating microscopic random bumps and dips to at least a part of a skeleton part of an identification mark attached to a component, and forming a textured pattern for matching. Representative examples of textured finish include sand blasting, etching-based surface processing, and blasting coating, although other methods may apply. Moreover, while it is preferable to apply textured finish precisely to a matching area in the skeleton part of the identification mark, the textured pattern may be formed at least within the matching area because some offset or the like may be handled in later image processing.

The imaging unit 403 images the matching area in the component 400 formed with a textured pattern and carried by the belt conveyor 401 by the method as in the imaging conditions described regarding the first embodiment above, and outputs a captured image to the image feature extracting unit 404.

The image feature extracting unit 404 is for extracting an image feature of the textured pattern in the matching area from the image captured at the imaging unit 403. The extraction of the image feature is achieved using an extraction technique for image features of fingerprints, such as the brightness value of the image, feature points, and points of inflection, intersecting points, end points and center points of lines in a binarized image. When needed, the extraction of the image feature is performed after normalization using the skeleton part of the identification mark, as described earlier.

The image feature registering unit 405 registers the image feature of the component 400 extracted by the image feature extracting unit 404 in correspondence with the identification information for the component 400 into the image database 406.

According to such a registration apparatus, the process beginning from textured finish for identification down to registration of an image feature may be automatically performed.

Embodiment 7

Embodiment 7 of the present invention will be described in detail with reference to the drawings. In the present embodiment, the validity of the components mounted on the main body of the product to be authenticated is confirmed using the trademark attached to the components. It is a technique to determine the authenticity of a product based on whether the combination of the component and the body whose validity is confirmed is correct or not. In order to explain the features of the present invention, it will be concretely described below with reference to the drawings.

Embodiment 7-1

Figure 54:
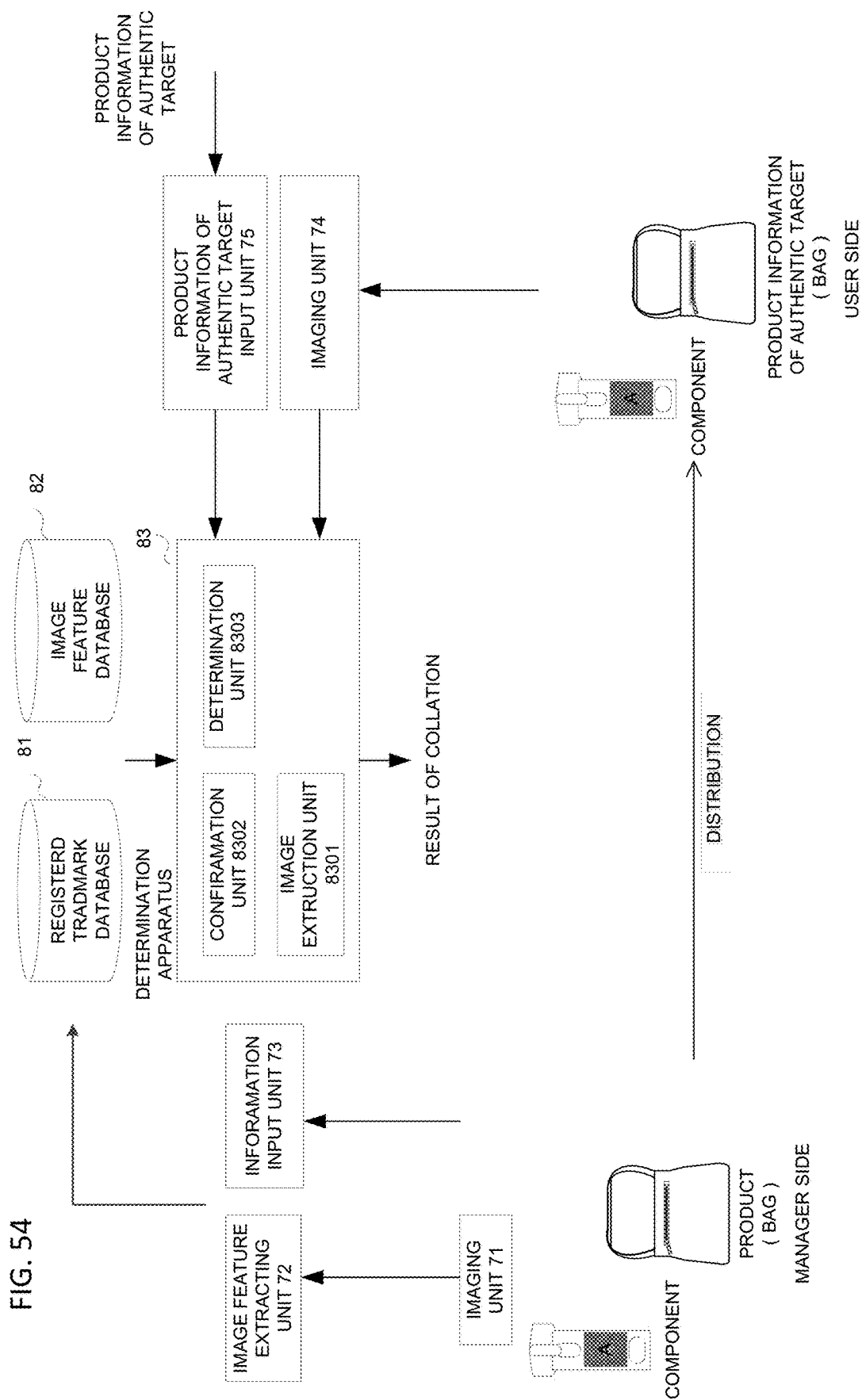
FIG. 54 is a block diagram of an embodiment 7-1.

FIG. 54 is a block diagram of the authenticity determination system according to Embodiment 7-1 of the present invention.

The authenticity determination system of this embodiment includes an imaging unit 71, an image feature extracting unit 72, an information input unit 73, an imaging unit 74, a product information of authentic target input unit 75, a registered trademark database 81, an image feature database 82, and a determination device 83.

The imaging unit 71 captures an image of a component surface including at least a collation area of a component attached to the main body of the product. The image feature extraction unit 72 extracts image features of the collation area from the image captured by the imaging unit 71. The information input unit 73 inputs the registered trademark of the construction and the information of the product having the construction as a constituent element. The imaging unit 74 captures an image of the surface of the component including at least the collation area of the component attached to the main body of the product to be authenticated. The product information of authentic target input unit 75 inputs the trademark information and the product information of the components attached to the product to be authenticated.

Figure 55:
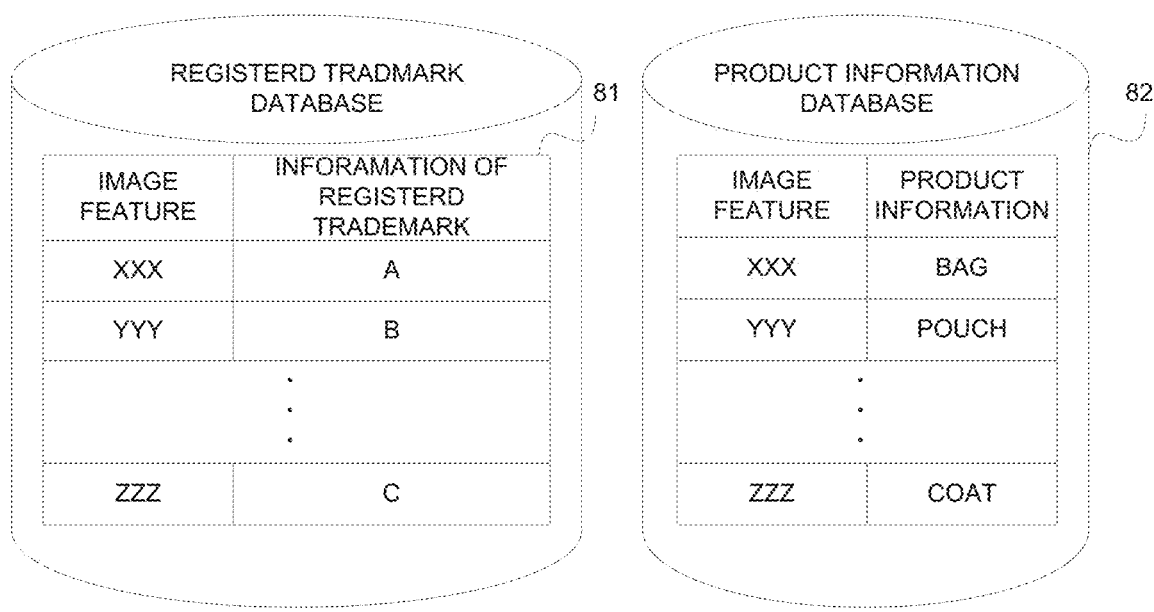
FIG. 55 is a diagram showing an exemplary each database.

In the registered trademark database 81, as shown in FIG. 55, the image feature extracted by the image feature extraction unit 72 and the registered trademark of the component input by the information input unit 3 are stored in association with each other. The registered trademark database 81 is a database created in advance on the side of a manager such as a component producer. Here, the registered trademark information is information on trademarks registered under the trademark system of each country. Registered trademark information is information on registration information attached to the component by the manufacturer of the component. In the present embodiment, a character string indicating a registered trademark will be described as an example. The product information database 82 stores the image feature extracted by the image feature extraction unit 72 and the information of the product to which the component input by the information input unit 73 is attached in association with each other. The product information database 82 is a database that is created in advance on the component manufacturer side or the manager side such as a manufacturer who manufactures products, for example. Incidentally, although the explanation will be made using registered trademarks in this explanation, it goes without saying that it is applicable even if it is a so-called unregistered well-known trademark or an unregistered well-known trademark.

The determination apparatus 83 includes an image extraction unit 8301, a confirmation unit 8302, and a determination unit 8303. The image extraction unit 8301 extracts image features from the image captured by the imaging unit 74. The confirmation unit 8302 collates the extracted image feature and trademark information among the product information input by the authentication target information input 75 with the image feature and registered trademark stored in the registered trademark database 81. In this way, it is checked whether or not the part attached to the main body of the product to be authenticated is legitimate. Then, when the validity of the component is confirmed, the determination unit 8303 determines whether or not the combination of the image feature of the component whose validity is confirmed and the product information input by the authenticity object information input 75 is the product information database 82, whether or not it is the same as the combination of the image feature and the product information stored in the authentication information storage means.

Next, the operation will be described. Incidentally, the following explanation will be described using a bag as a product, a slide fastener as a component, and a textured pattern as a pattern. The following description will be described using an example in which the entire textured finish pattern of the concave portion of the slide fastener pull hand is used as a collation area. However, it is not necessary to be limited to these.

First, the construction of the registered trademark database 81 and the product information database 82 will be described. The imaging unit 71 captures the image of the component surface including at least the collation area of the fastener attached to the main body of the bag. The image feature extraction unit 72 extracts image features of the collation area from the image captured by the imaging unit 71. The extracted image feature is stored in the registered trademark database 81 in association with the registered trademark of the component input by the information input unit 73. For example, the image feature extracting unit 72 extracts the image feature "XXX" of the collation area from the image captured by the image capturing unit 71, associates it with the registered trademark "A" of the component input by the information input unit 73 And stores it in the registered trademark database 81. Likewise, the image extracting unit 72 stores the extracted image feature and the information of the product input by the information input unit 73 in association with each other in the product information database 82. For example, the extracted image feature "XXX" is associated with the information "bag" of the product input by the information input unit 73 in the product information database 82.

Next, the operation of authenticity determination will be described. The imaging unit 74 captures an image of the surface including at least the collation area of the component attached to the main body of the product as the object of the authentication determination. For example, the imaging unit 74 captures an image of a surface including at least a collation area of a fastener attached to the main body of a bag that is an authentic target. On the other hand, the authenticity object information input unit 75 inputs the trademark information of the components attached to the bag product to be authenticated and the product information.

For example, it is assumed that the authenticity object information input unit 75 inputs the trademark information "A" and the product information "bag".

The image extracting unit 8301 extracts image features from the image in which the textured pattern of the component attached to the product that is an object of genuineness determination is imaged. Here, it is assumed that the image feature "XXX" is extracted. The confirmation unit 8302 compares the image feature extracted by the image extraction unit 8301 with the image feature of the component stored in the registered trademark database 81. When there is a match, it is checked whether the registered trademark associated with the image feature matches the trademark information entered by the authenticity object information input unit 75. And confirms the validity as to whether the part mounted on the main body of the product as the authenticating target is a genuine article or not, depending on whether or not they match. In this case, since the image feature "XXX" and the trademark information "A", validity is confirmed.

When the validity is confirmed, the determination unit 8303 compares the image feature extracted by the image extracting unit 8301 with the image feature of the component stored in the product information database 82. When there is a match as a result of the collation, it is confirmed whether or not the product information associated with the image feature and the product information input by the authenticity object information input unit 5 match. And determines the authenticity of the product that is the object of the authentication based on whether or not they match. If they match, they can be authenticated as authentic. Here, the image feature "XXX" and the product information "bag" are stored, and matching information is stored in the product information database 82. Therefore, it is determined to be a genuine article. On the other hand, as a result of the collation, if matching cannot be confirmed, it is determined that there is a possibility of being a counterfeit product.

According to the present embodiment, it is possible to determine the product by confirming the validity by the registered trademark attached to the part. Therefore, it is possible to judge a product without preparing a special device such as an IC tag.

Embodiment 7-2

Next, a description will be given of Embodiment 7-2 of the authenticity determination system of the present invention. A mode of statistically processing and analyzing the result of authentication determination in the embodiment 7 will be described. Incidentally, the same reference numerals are attached to the same configurations as those in the above embodiment, and a detailed description thereof will be omitted.

Figure 56:
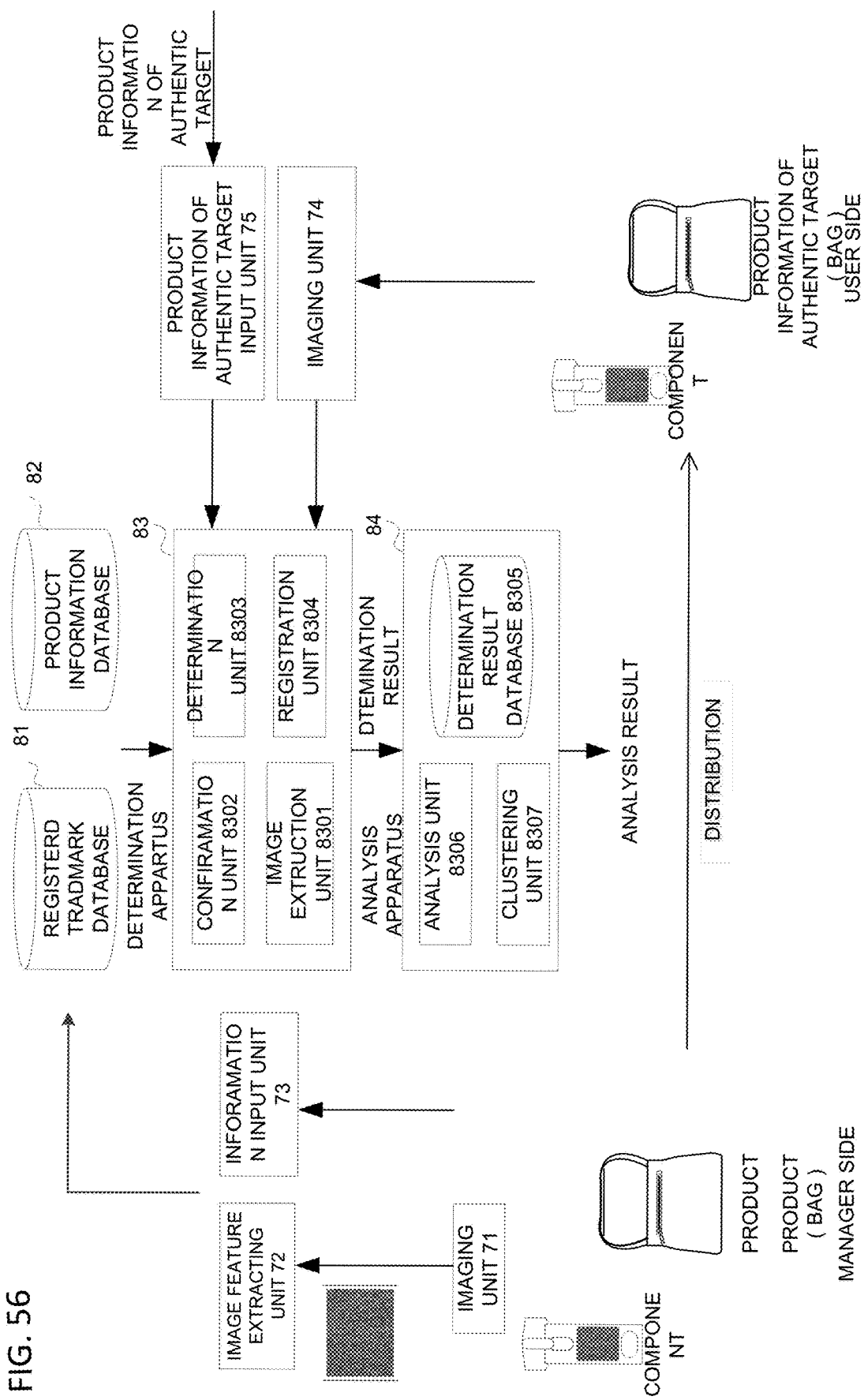
FIG. 56 is a block diagram of an embodiment 7-2.

FIG. 56 is a block diagram of the embodiment of the present invention. In addition to the configuration of Embodiment 7-1, the determination apparatus has a registration unit 8304. Further, the authenticity determination system further includes an analysis device 84 having a determination result database 8305, an analysis unit 8306, and a clustering unit 8307.

The registration unit 8304 associates the image feature of the component of the product of the object of the authentication determination target extracted by the image extraction unit 8301, the determination result of the determination unit 8303 and the determination place information indicating the place where the determination is performed. Examples of the determination location are the place where the determination unit 83 is installed, the customs clearance place of customs, the place of sale of the product, and the like. Incidentally, as the distribution log information, it is preferable that the judgment location is stored such that the history of the distribution history remains as a distribution log so that the history of distribution can be known.

Figure 57:
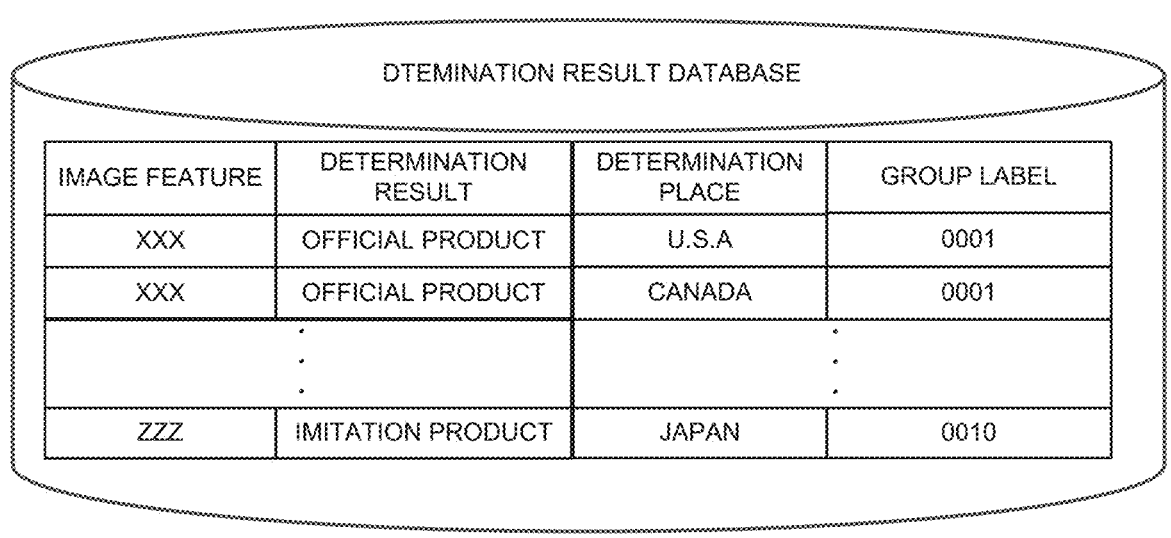
FIG. 57 is a diagram showing an exemplary the determination result database.

FIG. 57 is an example of the determination result database. In the determination result data database 8305, the image feature, the determination result, and the determination location information output from the registration unit 8304 and the group label registered by the clustering unit 8307 are stored in association with each other. The clustering unit 8307 calculates a collation score of each pair of image features by matching between all combinations of pairs of all image features stored in the determination result database 8305. Then, the clustering unit 8307 performs clustering of the image features based on the calculated collation scores. At this time, the clustering unit 8307 calculates the collation score using a Markov Cluster Algorithm (Non-Patent Literature 1: Stijin van Dongon, Graph Clustering by Flow simulation, PhD thesis, University of Utrecht, May 2000) to cluster the image features. Then, the clustering unit 8307 assigns a group label number to each group in order to uniquely identify a group generated by the clustering, relates each image feature with the group label number of group to which the image feature stored in the determination result database 8305 belong, and stores the group label number in the determination result database 8305.

Herein below, an example will be used to describe clustering processing performed by the clustering unit 8307. For example, it is assumed that the determination result database 8305 includes image features of textured patterns 0001 to 0005, as depicted in (a) of FIG. 58. The clustering unit 8307 calculates the collation score of each pair present regarding the image features 0001 to 0005. In the example depicted in (a) of FIG. 58, there are 10 pairs of being 0001 and 0002, 0001 and 0003, 0001 and 0004, 0001 and 0005, 0002 and 0003, 0002 and 0004, 0002 and 0005, 0003 and 0004, 0003 and 0005, and 0004 and 0005. Herein, the collation scores of the respective pairs are assumed to be set as depicted in (b) of FIG. 58:

0001 and 0002: 0.5,
0001 and 0003: 0.5,
0001 and 0004: 0.1,
0001 and 0005: 0.1,
0002 and 0003: 0.6,
0002 and 0004: 0.2,
0002 and 0005: 0.1,
0003 and 0004: 0.1,
0003 and 0005: 0.2, and
0004 and 0005: 0.5.

Then, scores between 0001, 0002, and 0003 are 0.5 to 0.6, and the score between 0004 and 0005 is 0.5. Thus, as depicted in c) of FIG. 58, clustering forms two groups: a group of 0001, 0002, and 0003 and a group of 0004 and 0005. The clustering processing unit 12 assigns a group label number "0001" to the group of 0001, 0002, and 0003, and a group label number "0002" to the group of 0004 and 0005.

Herein, the description has been made for the clustering processing using the Markov Cluster Algorithm. Instead of this, another method for clustering may be used, such as a K-means method or a hierarchical clustering method (Non-Patent Literature 2: Masatoshi Okutomi, Masao Shimizu, et al., ed.: "Digital Image Processing", CG-ARTS Society, issued on Mar. 1, 2006, p. 231-232).

The analysis unit 8306 analyzes, for each group, at least one of the distribution information and the product information related with the image feature belonging to each group formed by the clustering, and displays a map of a result of the analysis.

Figure 59:
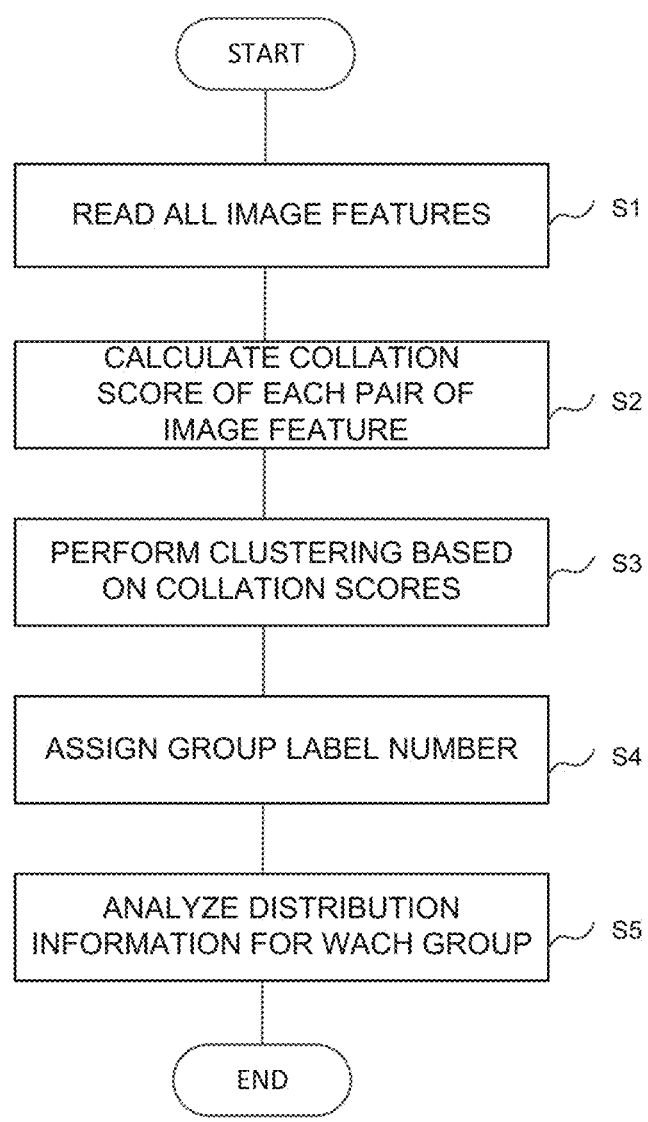
FIG. 59 is a flowchart illustrating an operation of the invention of the present application.

Next, an operation of the invention of the present application will be described. FIG. 59 is a flowchart illustrating the operation of the invention of the present application.

The clustering unit 8307 reads all image features stored in the determination result database 8305 (step S1).

The clustering unit 8307 calculates the collation score of each pair of image features by matching between all combinations of the image features (step S2).

The clustering unit 8307 clusters the image features based on the calculated collation The clustering unit 8307 assigns the group label number to each generated group and relates the group label numbers with each of the image features stored in the determination result database 8305 to store the group label numbers (step S4).

Figure 60:
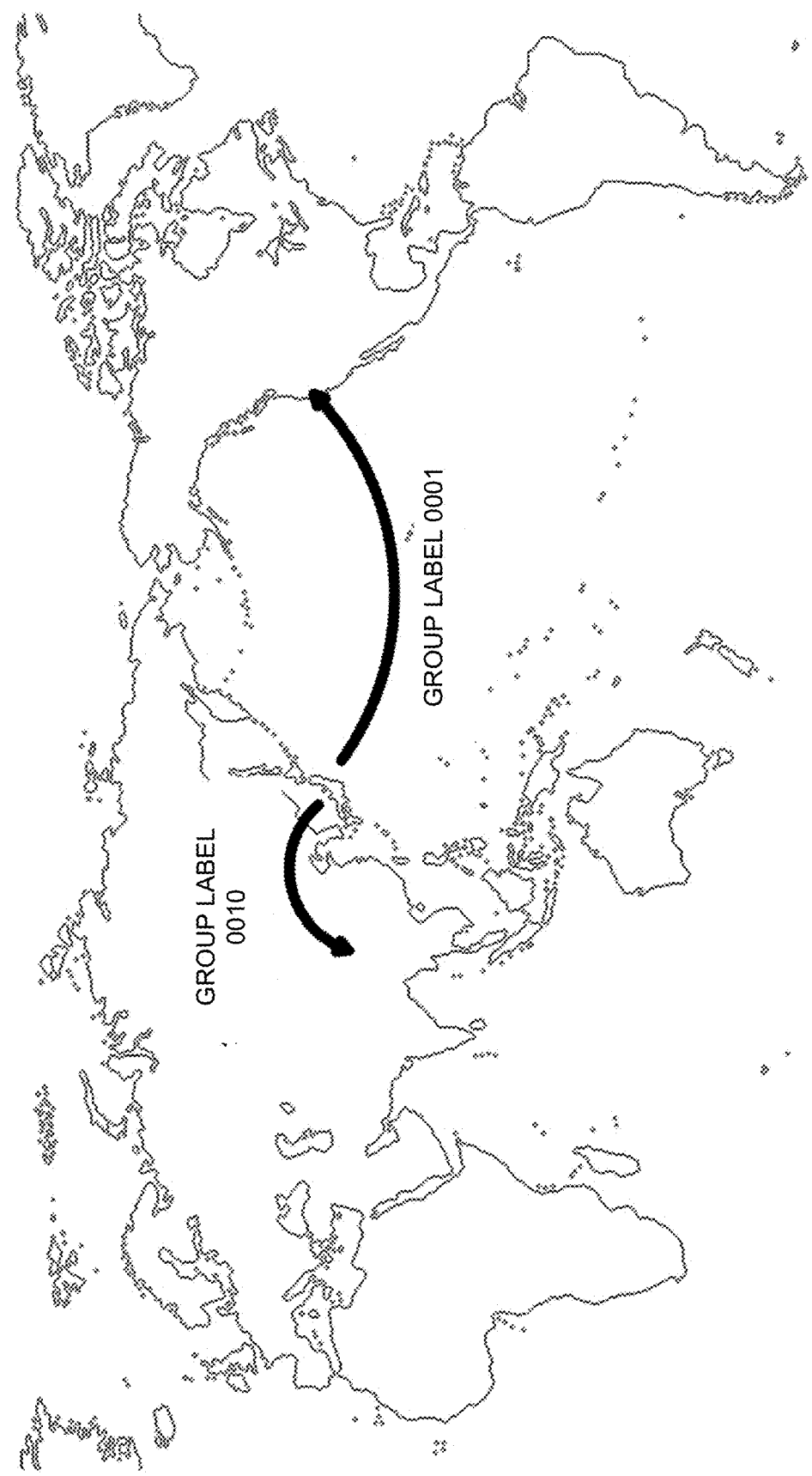
FIG. 60 is a diagram depicting an example of a map display.

The analysis unit 8306 analyzes the determination result information and places information related with the image features belonging to each of the clustered groups by statistical processing and visualizes a result of the analysis as shown in FIG. 60 (step S5).

According to the present embodiment, it is possible to easily verify an object to be analyzed by statistically processing the result of authentication determination. Incidentally, the statistical processing of this embodiment can be combined with the embodiments of the first to sixth embodiments. Also in this case, the same effect as the above embodiment can be obtained.

Embodiment 7-3

In the present embodiment, even if the manufacturing mold of each part to be authenticated is unknown, the image feature of the manufacturing mold used at the time of manufacturing the component is extracted, and the configuration of authenticity determination using the image feature explain.

Components are randomly extracted from the components group manufactured from all manufacturing molds and the reference area of all the individual of the extracted components are captured. The number of components extracted at this time is determined according to the number of manufacturing molds. However, it is preferable that the number of components to be extracted is large so as to cover components manufactured from all manufacturing molds.

It is desirable that only the difference between the manufacturing molds is used as the variation factor of the surface pattern in the captured image of each component. Specifically, it is desirable that the image is captured in a state where lighting fluctuation during image capturing and relative posture fluctuation between the camera and the subject are small. Further, it is desirable that the image is captured using the same image capturing apparatus so as not to be affected by individual differences on the image capturing apparatus side. In particular, in order to suppress lighting fluctuation and obtain an image with high contrast suitable for collation, the capturing method described in the second embodiment is desired. However, it is not limited to this as long as it is a shooting method that suppresses the above-mentioned fluctuation factors.

For the image group of each component collected by the above capturing method, the image is normalized using the features of the common logo of each component. By the normalization processing, positional deviation due to attitude variation between images is corrected. This makes it possible to extract image features at the same position of each component. It is desirable to minimize the error due to the normalization processing. It is desirable to perform registration at the subpixel level, for example by using the Lucas Kanade method described above.

Next, an operation in this embodiment will be described. It should be noted that the image feature extraction and verification method is performed in the same operation as in the fourth embodiment. The method of clustering the collation result is performed in the same operation as in Embodiment 7-2. Therefore, a detailed description thereof will be omitted.

Registering representative image features of each cluster obtained by clustering. A representative image feature referred to, for example, an average image feature of all image features classified as clusters. In addition, a plurality of image features may be registered for each cluster. Practically, it is desirable to register a plurality of image feature quantities so that the distribution of image feature quantities within the cluster can be accurately represented. In addition, the image features representing each cluster may be determined using a method based on existing machine learning or a statistical method. When using a method based on machine learning, it is desirable that the number of individuals of the captured component is sufficient.

As described above, according to the present embodiment, when registering image features of a manufacturing component for the purpose of performing genuineness/counterfeit determination of manufactured components, it is possible to obtain the number of molds to be manufactured can be registered in the database. As a result, it is possible to construct an image feature database for efficient authentication determination with reduced registration cost. Particularly, in the case of a mass-produced part, it is difficult to extract a sample for each mold because the components manufactured from each mold frequently mix in the manufacturing process. For example, in the case of a casting having a plurality of molds in one mold, components made from different molds are likely to mix when taking out parts from the mold. In order to take out the components separately for each mold and mold, it is necessary to pay a large cost such as stopping the production line and rebuilding the manufacturing line itself. Also, in the case of a component manufacturer, it is possible to accurately ascertain the number of molds to be manufactured, while finished product manufacturers using the components, distributors dealing with parts and finished products, etc. obtain such information, It is basically difficult. According to the present embodiment, a finished product maker, a distributor, or the like can construct a database for efficient authentication judgment that focuses only on image features corresponding to the number of manufacturing molds.

Embodiment 8

This embodiment 8 is characterized by extracting unit configured to extract an image of an information display body and an image of the textured pattern from an image including at least the information display body for displaying information on the component, the product, or a product including the component as its component and the textured pattern formed on the component or the products, acquiring unit configured to acquire information on the component or the products from the extracted image of the information display body, and identifying unit configured to identify the component, the product, or the product including the component as its component by matching image feature of the extracted image of the textured pattern with image feature stored in the image feature storage unit.

Although the present embodiment will be described below, a textured pattern formed on components or products, products, or components is the same as in the above embodiment, so a detailed description thereof will be omitted.

Figure 61:
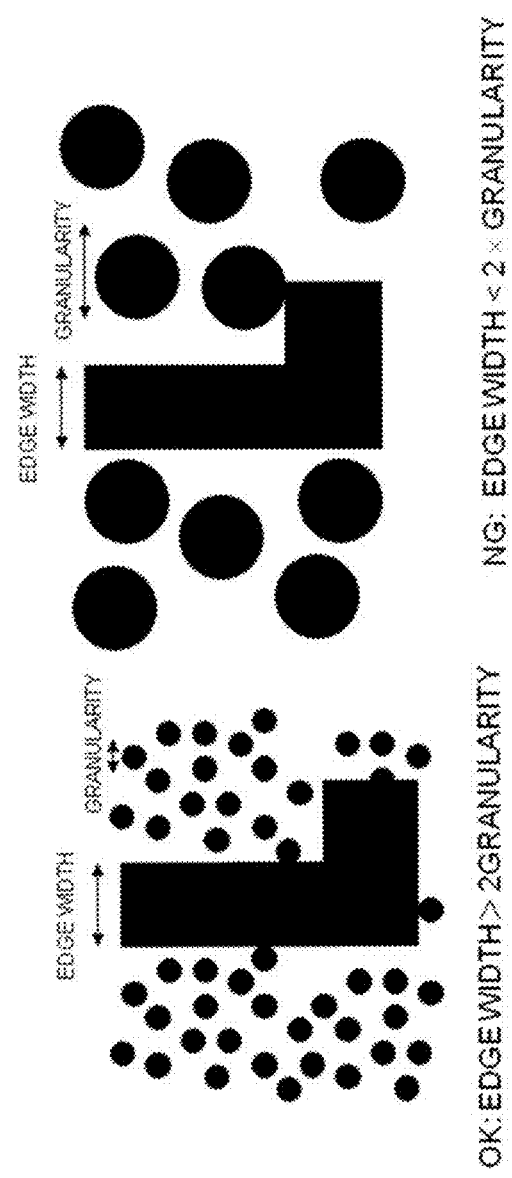
FIG. 61 illustrates granularities of textured patterns.
Figure 62:
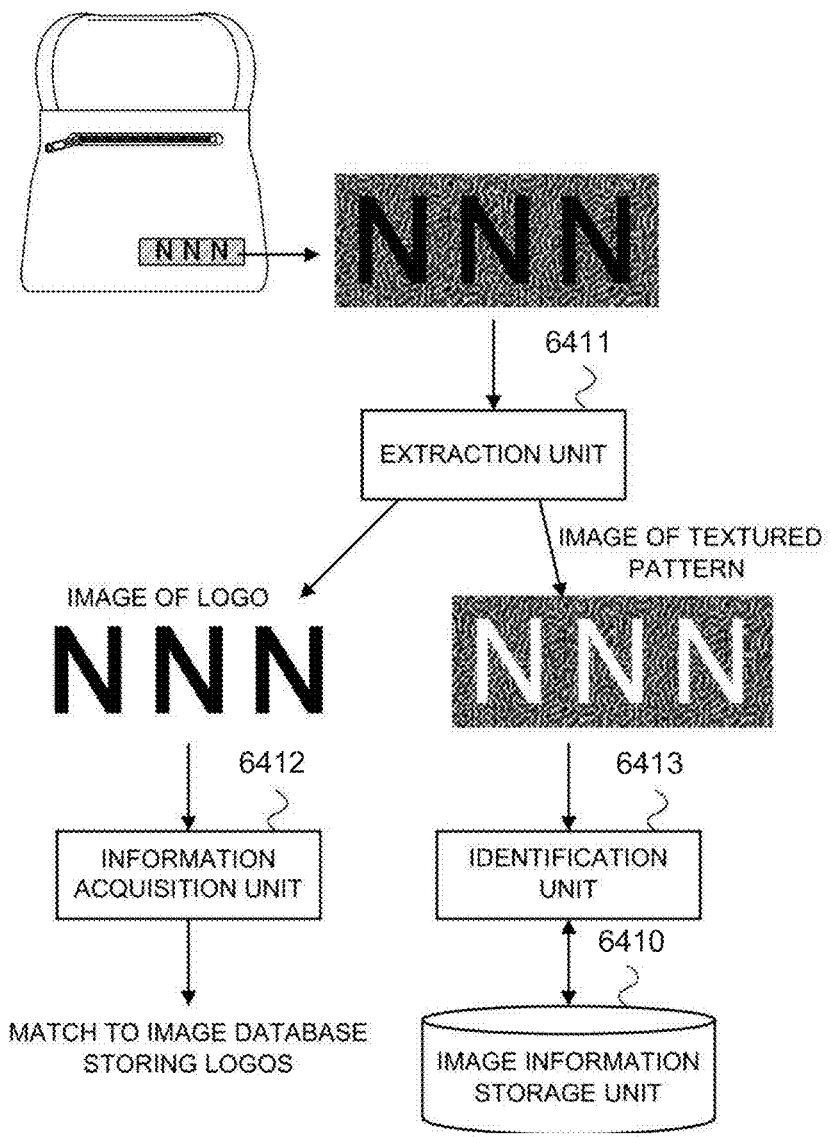
FIG. 62 is a block diagram of an embodiment 8-1 according to the present invention.

The information display body displaying information on a component or a product expresses the information on the component or the product with letters and/or figures. Examples of the information display body include a serial number, a trademark, a logo, a name of manufacturer, a name of producer, a brand name, a product name, a product number, a rod number, and a URL (Uniform Resource Locators). Here, the textured pattern may be formed on a skeleton part of the information display body, or may be formed on a background area of the information display body. The textured pattern may have any granularity (e.g., may have any size, any diameter, any density, etc. of a particle(s)) in so far as the granularity does not affect on recognition of the information display body. It is sufficient that the granularity of the textured pattern is smaller than granularity of the information display body. For example, the textured pattern is formed in a manner that, as illustrated in FIG. 61, granularity (diameter) of each bump and dip of the textured pattern (including a bump and dip which is made of adjacent bumps and dips formed into an aggregate) becomes smaller than a half of an edge width of a skeleton part of the information display body. As described later, in a case of assuming that the textured pattern is removed by using a filter for removing a high frequency component corresponding to granularity of a textured surface, if a size of the bump and dip of the textured surface is larger than the half of the edge width of the information display body, the edge of the information display body is also removed during removal of the textured surface. However, if the granularity of the bump and dip of the textured pattern is formed smaller than the edge width of the skeleton part of the information display body to a level at which the information display body can be recognized, the textured pattern can be removed while the edge of the information display part can be remained as it is. Therefore, it becomes easy to separate image feature of the information display body from image feature of the textured pattern. For example, in a case where the information display body is an outlined letter, it is preferable that the granularity of the bump and dip of the textured pattern is small enough than an outline width of the letter (e.g., smaller than a half of the outline width of the letter), i.e., is small enough but the information display body still can be recognized. Alternatively, a textured surface may be subjected to blast working in order to reduce density with dots smaller than a thickness of a line of the information display body.

In the extraction processing of extracting the image of the information display body and the image of the textured pattern from the captured image, the filter for removing high frequency component is applied to remove the textured pattern from the captured image, the high frequency component corresponding to the size of the granularity of the textured surface. This ensures acquisition of the image of the information display body. A blurred image of the information display body that the textured surface was deleted is recovered, as required, by using a recovery technique for recovering a low resolution image. A super resolution technique disclosed in, for example, WO 2012/029238A1 may be employed for the recovery technique. Alternatively, any other recovery technique may also be employed. The image of the textured pattern is acquired by taking a difference between the original image and the captured image (the image of the information display body) after removing the high frequency component.

As described in the above embodiments, in the processing of obtaining image feature from the image of the textured pattern, at least a portion of the information display body is used as a reference section to normalize the image of the textured pattern, and thereafter the image feature thereof are extracted.

Embodiment 8-1

An embodiment 8-1 according to the present invention will be described below. FIG. 1 is a block diagram of the embodiment 8-1 according to the present invention.

An identification system of the embodiment 8-1 according to the present invention includes an image feature storage unit 6410, an extraction unit 6411, an acquisition unit 6412, and an identification unit 6413. The image feature storage unit 6410 stores image feature of a textured pattern formed on a component, a product, or a product including the component as its component. The extraction unit 6411 extracts an image of an information display body and an image of the textured pattern from an image including at least the information display body for displaying information on the component, the product, or the product including the component as its component and the textured pattern formed on the component or the products. The acquisition unit 6412 acquires information on the component or the products from the extracted image of the information display body. The identification unit 6413 identifies the component, the product, or the product including the component as its component by matching (collating) image feature of the extracted image of the textured pattern with image feature stored in the image feature storage unit 6410.

In the following description, a case of identifying a bag is exemplified. The bag to be identified includes a logo as the information display body and a logo plate having a prescribed area with the logo, the prescribed area being provided with a textured pattern.

The extraction unit 6411 acquires an image of a collation area (matching area) including the logo of the logo plate, the logo plate being attached to the bag, and extracts an image of the logo and an image of the textured pattern from the acquired image. Here, the collation area is the prescribed area including the logo and at least partially includes the textured pattern formed thereon. As described in the above embodiment, there are mainly two methods for processing the textured pattern formed on the collation area.

Next, capturing of an image of a textured pattern of a collation area, extraction of image feature of a textured pattern of a collation area, and registration thereof in the image feature storage unit 6410 is stored in the image feature storage unit 6410 by using same operation as the image feature extracting unit 404. The image of the collation area is captured by the methods described in the fourth and fifth embodiments.

The extraction unit 6411 extracts image feature of a logo and an image of a textured pattern from an image of a collation area. In this extraction processing, firstly, the textured pattern is deleted from the image by using a filter for removing a high frequency component to thereby acquire an image of the logo. Then, a difference between the image and the obtained image of the logo is calculated to obtain an image of the textured pattern.

The information acquisition unit 6412 acquires information on a logo plate and a bag with the logo plate by using the image of the logo extracted by the extraction unit 6411. For example, the extracted image of the logo may be matched with images stored in an image database in which images of logos are registered as trademarks. Accordingly, it becomes possible to known whether or not the extracted image of the logo is registered as a trademark.

The identification unit 6413 extracts image feature from the image of the textured pattern extracted by the extraction unit 6411. When extracting the image feature of the textured pattern, at least a portion of the logo is used as a reference section to normalize the image of the textured pattern, and subsequently the image feature thereof are extracted. Then, the extracted image feature are matched with image feature of textured patterns registered in the image feature storage unit 6410 to thereby identify the logo plate. Identification of the logo plate enables identification of the bag on the basis of the management information associated with the image feature of the logo plate.

As described above, according to the present embodiment, an image of the information display body attached to a component or a product and an image of the textured pattern can be read out at the same time, and therefore, acquisition of information on the component or the product (information common to products to which the same information display body is attached) and each individual identification of the component or the product having the same information display body can be performed efficiently. Further, it is easy to find the information display body in the form of a logo, etc. attached to a component or a product, so that a person in charge of an identification operation can easily specify a location of which image should be captured.

Embodiment 8-2

An embodiment 8-2 of the present invention will be described below.

In the embodiment 8-2, the information display body is a serial number. The embodiment 8-2 is directed to an identification system for identifying a bag having a plate, as its component, including a textured pattern formed on a collation area with a serial number as the information display body.

Figures 63, 64:
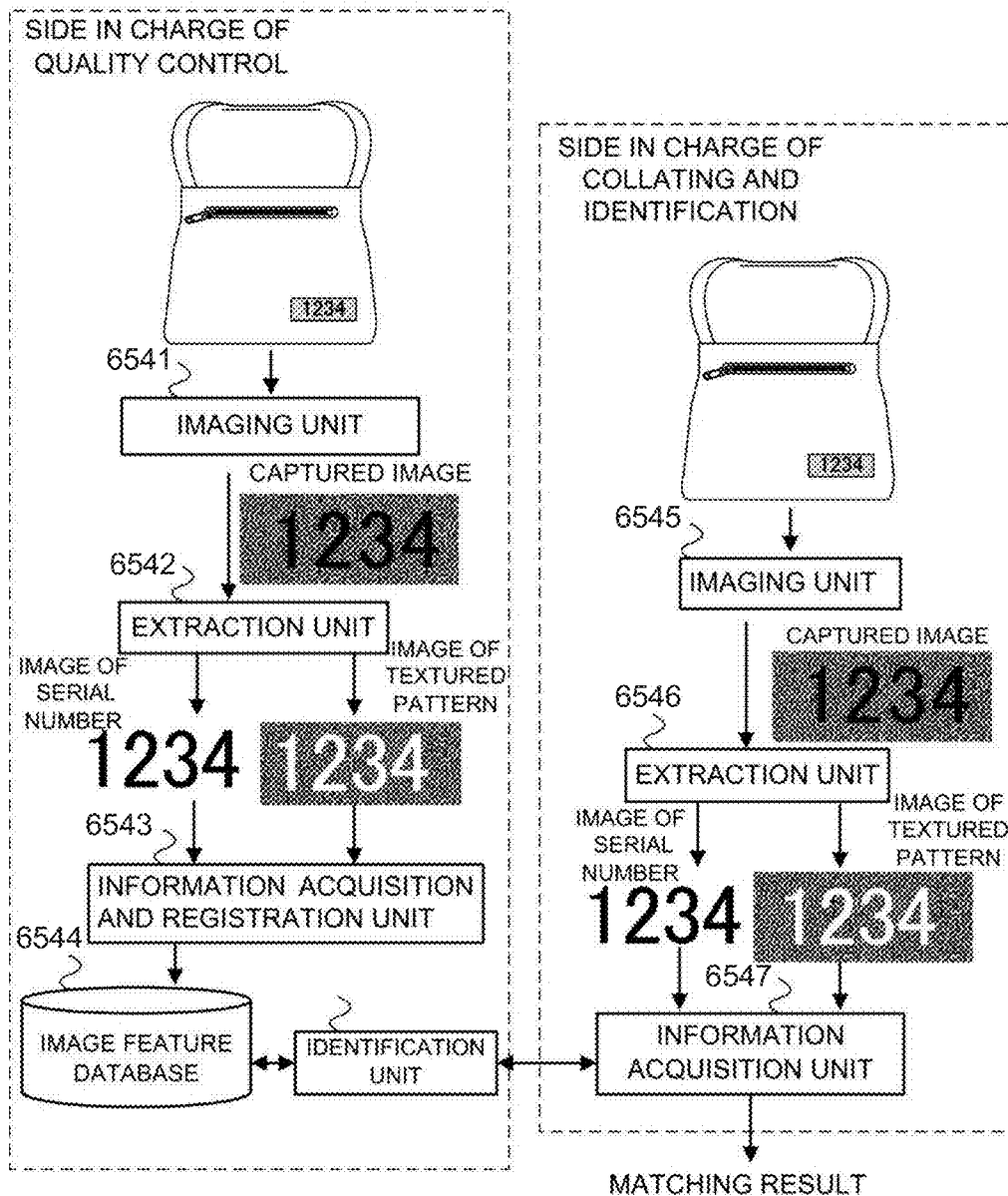
FIG. 63 is a block diagram of an embodiment 8-2 according to the present invention.
FIG. 64 exemplifies an image feature database.

FIG. 63 is a block diagram of an identification system according to the embodiment 8-2.

An imaging unit 6541 is a tool to be used by a side in charge of manufacturing a bag (a manufacturer of a bag, etc.) or a tool to be used by a side of an administrator who performs quality control of a bag. The manufacturer, etc., uses the imaging unit 6541 to capture an image of a collation area of a plate attached to a bag. Meanwhile, the imaging unit 6541 captures an image under the above described predetermined image capturing conditions.

An extraction unit 6542 extracts an image of a serial number and an image of a textured pattern from the image captured by the imaging unit 6541. Extraction of each of the image of serial number and the image of textured pattern is performed in a manner similar to the case of the embodiment 8-1.

An information acquisition and registration unit 6543 performs letters recognition processing with respect to the image of the serial number extracted by the extraction unit 6542. Further, the information acquisition and registration unit 6543 extracts image feature of the image of the textured surface extracted by the extraction unit 6542. The serial number after it is subjected to the letters recognition processing is registered in the image feature database 6544 in associated with the image feature of the textured surface. The image feature database 6544 is also a tool for the use of a side of a manufacturer of a bag or a side of an administrator who performs quality control of a bag. As shown in FIG. 64, a serial number, image feature of a textured pattern in a collation area of a plate on which a serial number is printed, and management information on a bag provided with the plate attached thereto are stored in associated with each other. Meanwhile, the management information includes not only identification information on a component, a product, or a product including the component attached thereto, but also management information on a component or a product, e.g., a production site of a component or a product, production information such as a brand and a production date, and a product name in which the component is employed, and distribution information such as destination and ship date.

As described above, if the image feature of the textured pattern of the component being associated with the management information on the component, the product, or the product provided with the component, it becomes possible to perform acquisition of history information on the identified plate (component) and identification of a bag with the plate (product having the component as one of its components). The method of registering to the image feature database 6544 by the quality management side is performed by the method described in the above embodiments 5 to 6. According to such a registration method, the process beginning from textured finish for identification down to registration of an image feature may be automatically performed.

An imaging unit 6545, an extraction unit 6546, and an information acquisition unit 6547 are tools to be used by a side in charge of collating a bag such as a testing department, a destination, a shop, and a purchaser of the bag.

The imaging unit 6545 has a structure similar to that of the imaging unit 6541. More specifically, the imaging unit 45 captures an image of a collation area of a plate of a bag to be identified.

The extraction unit 6546 has a structure similar to that of the extraction unit 6542. More specifically, the extraction unit 6546 extracts an image of the serial number and an image of the textured pattern from the image captured by the imaging unit 6545.

The information acquisition unit 6547 acquires information on the plate or the bag from the image of the serial number extracted by the extraction unit 6546. In the present embodiment, the letters recognition processing by, for example, a pattern matching is performed with respect to the image of the serial number extracted by the extraction unit 6546. Thereby, a letter recognition result is obtained. Further, the information acquisition unit 6547 extracts image feature from the image of the textured pattern extracted by the extraction unit 6546. Still further, the information acquisition unit 6547 sends the serial number and the image feature extracted from the textured image surface to an identification unit 6549 of the side of the administrator. Then, the information acquisition unit 6547 receives and outputs a matching result thereof.

The identification unit 6549 collates the serial number received from the side of the collator with textured patterns. Then, the identification unit 6549 sends a collating result thereof. More specifically, the received serial number is collated with serial numbers registered in the image feature database 6544. If there is a matching number, image feature of the textured pattern associated with the serial number is matched with the received image feature. Then, the identification unit 6549 returns a matching result thereof. In a case where thus collated serial number and the image feature of the textured pattern have been associated with each other to be registered in the image feature database 6544, the plate of the bag to be collated is determined as a genuine plate registered in the image feature database 6544. From the management information associated with the image feature of the textured surface, the bag with the plate can be identified.

Meanwhile, the above mentioned imaging unit, image feature extraction unit, image feature database, extraction unit, information acquisition unit, and identification unit may be independent from each other but are to be connected to each other via network. Alternatively, some of them may be formed into one piece.

As described above, according to the present embodiment, an image of information display body attached to a component or a product and an image of a textured pattern are read out at the same time, and therefore acquisition of information on the component or the product and identification of the component or the product can be performed efficiently. Further, in the second embodiment, it is possible to store information display body as identification information of a component or a product and image feature of a textured pattern formed on the component or the product in a manner they are corresponded to each other and, under such conditions, to match the image feature of the textured pattern stored after it is associated with the identification information of the information display body acquired from the captured image with the textured pattern acquired from the captured image. This enables certification and identification of the component or the product.

Embodiment 8-3

Figure 65:
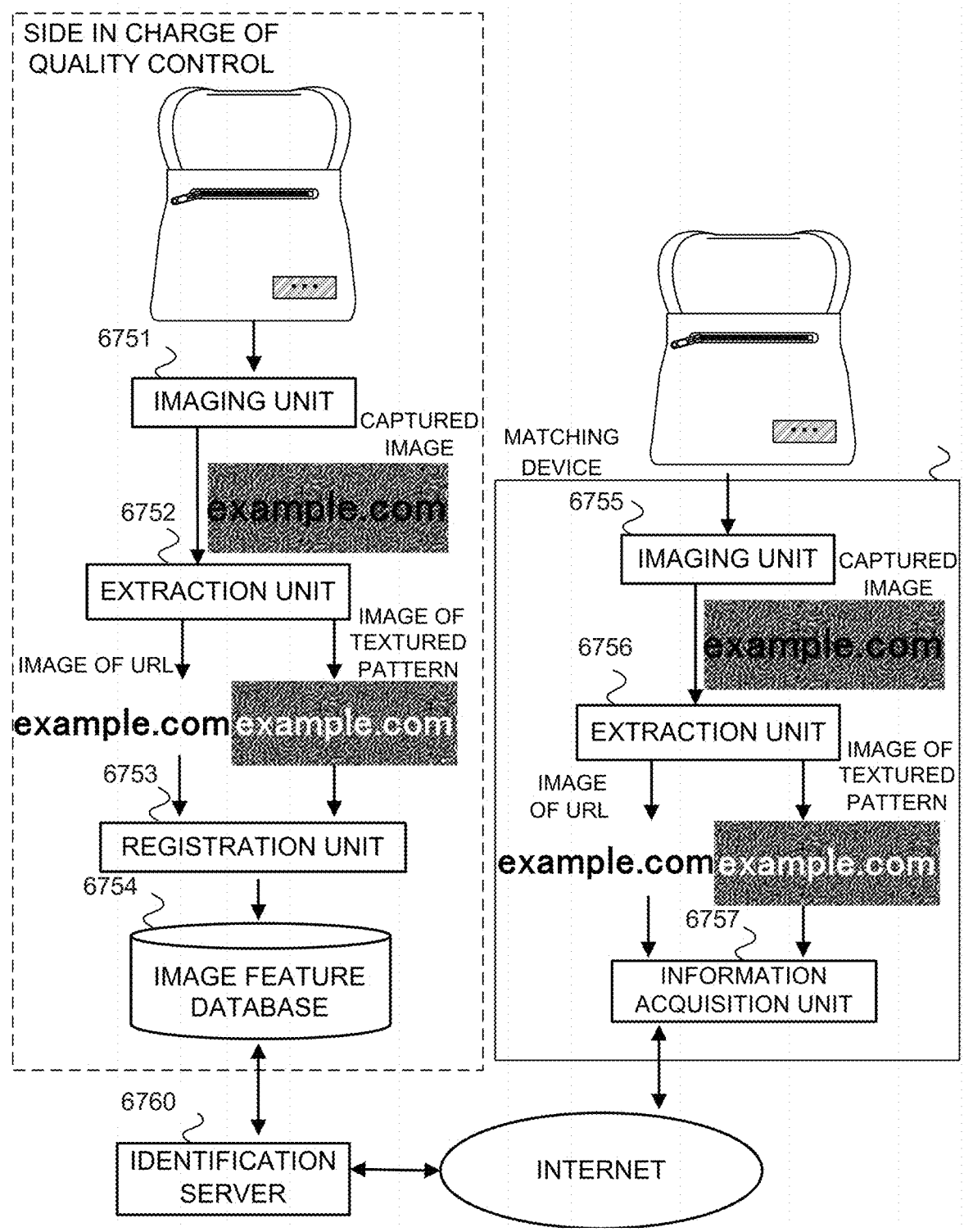
FIG. 65 is a block diagram of an embodiment 8-3 according to the present invention.

An embodiment 8-3 according to the present invention will be described below. FIG. 65 is a block diagram of an identification system according to the third embodiment.

In the embodiment 8-4, the information display body is a URL. The third embodiment is directed to an identification system for identifying a bag with a plate as its component. The plate has a collation area including a URL and formed with a textured pattern in its collation area. Meanwhile, in this example, the URL printed on the plate attached to the bag indicates an address of a bag identification site.

An imaging unit 6751 is a tool to be used by a side in charge of manufacturing a bag (a manufacturer, etc., of a bag) and a side of an administrator who performs quality control of a bag. The manufacturer, etc., uses the imaging unit 6751 to capture an image of a collation area of a plate attached to a bag. The imaging unit 6751 has a structure similar to that of the imaging unit 6741 of the embodiment 8-2.

An extraction unit 6752 extracts an image of the URL and an image of the textured pattern from the image captured by the imaging unit 6751. Extraction processing for extracting each of the image of the URL and the image of the textured pattern is similar to that of the first embodiment.

A registration unit 6753 extracts image feature of the image of the textured pattern extracted by the extraction unit 6752 and registers it in the image feature database 6754. The image feature database 6754 is a tool to be used by a side of a manufacturer of a bag and a side of an administrator who performs quality control of a bag. The image feature database 6754 stores image feature of a textured pattern in a collation area of a plate on which a URL is printed and management information of a bag with a plate in associated with each other. Meanwhile, the management information includes not only identification information on a component, a product, or a product including the component attached thereto, but also management information on a component or a product, e.g., a production site of the component or the product, production information such as a brand and a production date, and a product name in which the component is employed, and distribution information such as destination and ship date. Association between the image feature of the textured pattern of the component and the management information on the component, the product, or the product to which the component is attached, as described above, enables acquisition of history information on the identified plate (component) and identification of the bag with the plate (product having the component as one of its components).

A matching device 6759 is a tool to be used by a side in charge of collation and identification of a bag, e.g., an inspection department, a destination, a shop, a purchaser, etc. of the bag. The matching device 6759 includes an imaging unit 6755, an extraction unit 6756, and an information acquisition unit 6757.

The imaging unit 6755 has a structure similar to that of the imaging unit 6751. The imaging unit 6755 captures an image of a collation area of a plate attached to a bag to be identified.

The extraction unit 6756 has a structure similar to that of the extraction unit 6752. The extraction unit 6756 extracts an image of a URL and an image of a textured pattern from the image captured by the imaging unit 6755.

An information acquisition unit 6757 performs letters recognition processing by, for example, pattern matching with respect to the image of the URL extracted by the extraction unit 6756 and obtains a letters recognition result. Further, the information acquisition unit 6757 extracts image feature from the image of the textured pattern extracted by the extraction unit 6756. Then, the information acquisition unit 6757 accesses a site of the URL indicated by the letters recognition result via internet, transmits data of the image feature extracted from the image of the textured surface, and requests for identification of the bag. Subsequently, the information acquisition unit 6757 receives and outputs a matching result in response to the request.

An identification server 6760 is a Web server which provides a bag identification service on the internet. The identification server 6760 is connected to the image feature database 6754. When the identification server 6760 receives data of the image feature of the textured pattern together with a request for identification, the identification server 6760 matches the received image feature of the image of the textured pattern with image feature of images of textured patterns registered in the image feature database 6754 and returns a matching result thereof to the request source. More specifically, in a case where the received image feature of the textured pattern match any one of the registered image feature, the identification server 6760 determines that the plate including the textured pattern formed thereon, i.e., the plate of the request source, is a genuine plate registered in the image feature database 6754. Then, the identification server 6760 transmits the management information associated with the image feature of the textured pattern to the request source. This enables the request source to identify the bag with the plate.

As described above, according to the present embodiment, it is possible to read an image of information display body attached to a component or a product and an image of a textured pattern at the same time. This ensures effective acquisition of information on a component or a product and identification of a component or a product. Further, in the embodiment 8-3, the information display body is an URL indicating an identification site for identifying a component or a product by using textured patterns. Transmission of the image feature of the textured pattern obtained from the captured image to the URL obtained from the information display body of the captured image enables certification and identification of a component or a product.

Embodiment 8-4

An embodiment 8-4 of the present invention will be described below. The embodiment 8-5 is almost identical to the above described first to third embodiments, except that, when a component or a product is subjected to identification, image feature of a textured pattern to be identified and an identification result thereof are stored in associated with each other.

Figure 66:
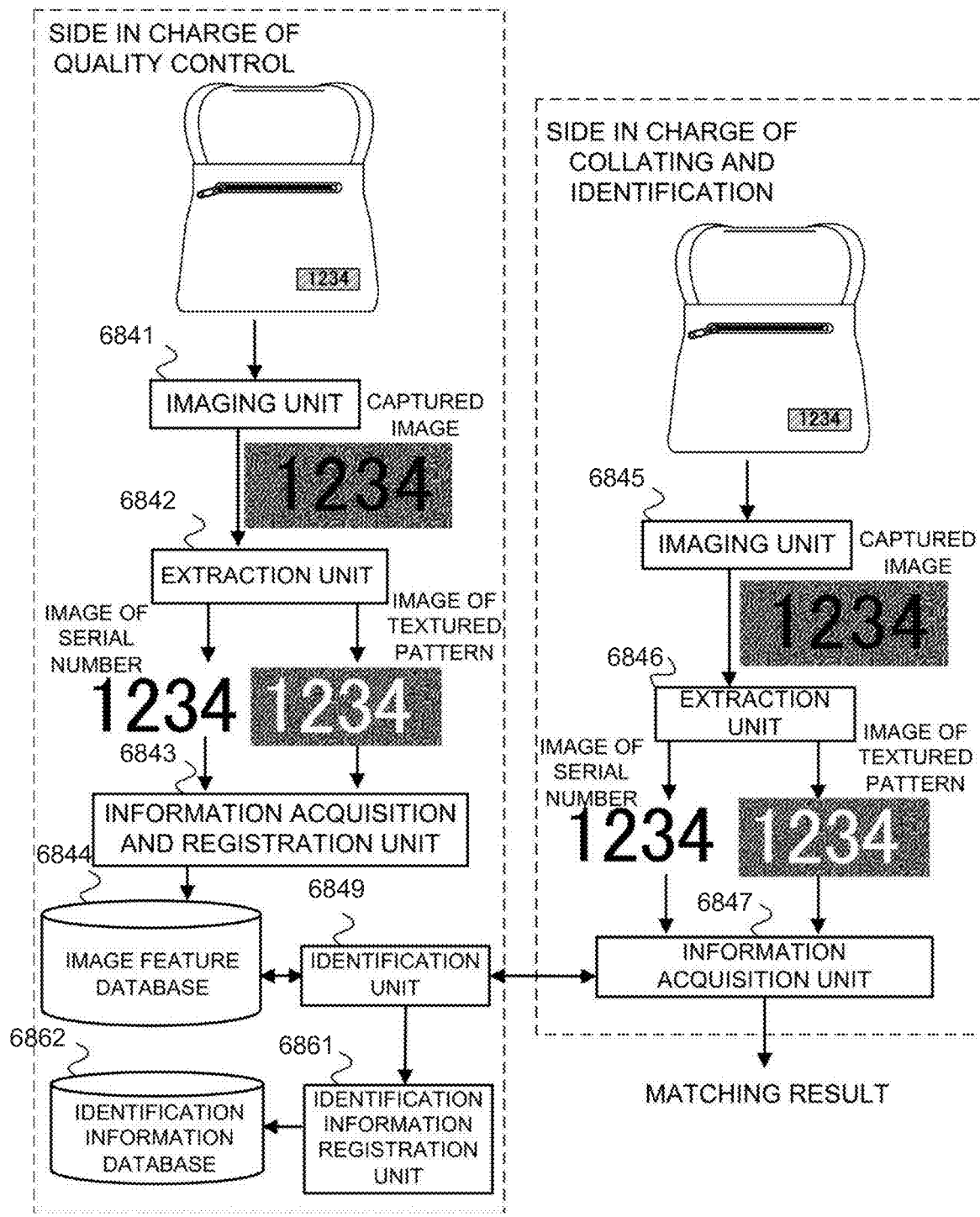
FIG. 66 is a block diagram of an embodiment 8-4 according to the present invention.

FIG. 66 is a block diagram of the fourth embodiment. An identification system of the present embodiment includes, in addition to the above described structure of the embodiment 8-2, an identification information registration unit 6861 and an identification information database 6862. The identification information registration unit 6861 receives the image feature of the textured pattern which was matched with the image feature database 6844 and information on a matching result thereof from the identification unit 6849, and registers them in association with each other in the identification information database 6862. Alternatively, in a case where the image feature to be identified are registered in the image feature database 6844, the identification information registration unit 6861 may read out product information, management information, etc. which have been registered in associated with the image feature to be identified in the image feature database 6844 and register them in the image feature database 6862 in associated with the image feature of the textured pattern.

Further, the embodiment 8-4 may be provided with a statistical processing unit which performs, by using the identification information database 6862 which accumulatively stores the image feature of thus identified textured pattern, the matching result information, etc., statistical processing of information on a predetermined component or product and outputs states of distribution and sale of the product and the use of the product. Still further, the fourth embodiment may be provided with an analyzer capable of statistically processing information of cases in which matching was failed and analyzing a state of occurrence of counterfeits in a case where matching results or certification results of genuineness/spuriousness and matched locations of products are stored as matching result information.

The present invention 9 is characterized by extracting an image of an n-dimensional (n: natural number) symbol and an image of a textured pattern formed on at least a portion of the n-dimensional symbol from an image of the n-dimensional symbol which is attached to a component or a product, acquiring information on the component or the product from the extracted image of the n-dimensional symbol, and identifying the component or the product by using the extracted image of the textured pattern.

The invention according to the present application will be described below. The textured pattern formed on the component, the product, the component or the product are the same as in the above embodiment. Therefore, the detailed description will be omitted.

The n-dimensional symbol includes a one-dimensional symbol and a two-dimensional symbol, etc. An example of the one-dimensional symbol includes a bar code. Examples of the two-dimensional symbol include a PDF 417, a Data Matrix, a Maxi Code, and a QR (Quick Response) code (registered trademarks).

Here, the textured pattern may be formed throughout the n-dimensional symbol and its background or partially thereon, may be formed on the background excepting the n-dimensional symbol, may be formed on the n-dimensional symbol partially or in its entirety, or may be formed on a portion where a textured pattern of which image is to be captured is specified by the n-dimensional symbol. Meanwhile, the textured pattern should not be formed on a blank portion which is essential for reading out the n-dimensional symbol. For example, the textured pattern should not be formed on a quiet zone in a case of a bar code or on square shaped cut-out symbols provided at three corners (position detection patterns or finder patterns) in a case of a QR code.

Figure 67:
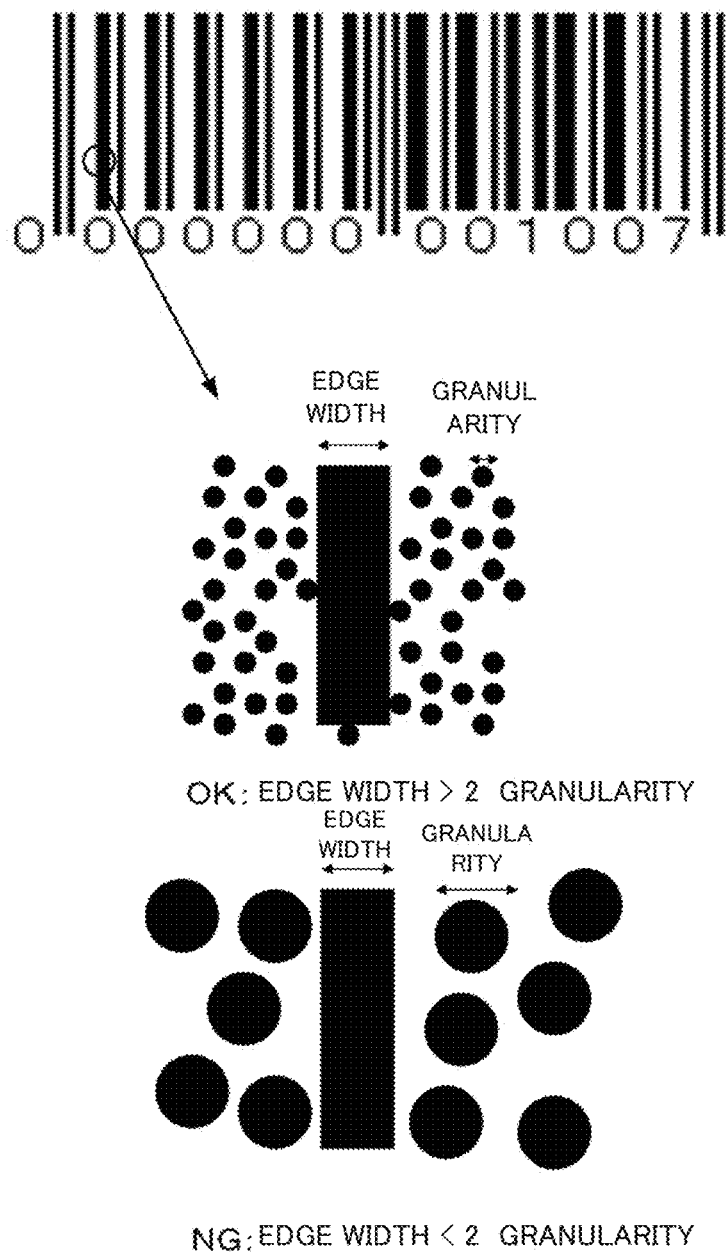
FIG. 67 illustrates granularities of textured patterns.

A size of a particle of a textured pattern or a degree of granularity (e.g., a size, a diameter, a density, etc. of a particle) of each irregular section of a textured pattern or an aggregate made of adjacent irregular sections of a textured pattern may be at any level in so far as recognition of an n-dimensional symbol is not affected. This can be achieved by setting the granularity when a satin finished surface is formed. For example, granularity of the textured pattern is set to a degree smaller than a short side (edge width) of a cell of the n-dimensional symbol. More preferably, granularity of the textured pattern is set to a degree, as illustrated in FIG. 67 or FIG. 68, equal to or smaller than a half of the edge width in a manner that the captured image can be recognized as an n-dimensional symbol. Hereinafter, a bar code as a one-dimensional symbol and a QR code as a two-dimensional symbol will be exemplified for more detailed description.

As will be described below, when assuming that a filter for removing a high frequency component corresponding to granularity of a satin finished surface is employed to remove a textured pattern, as illustrated in FIG. 67, if granularity of a satin finished surface is larger than a half of an edge width of a rectangular bar as a cell of a bar code, the bar is partially removed when removing the satin finished surface, resulting in making the bar defective. A typical bar code can be read out even if the bar code includes even a portion capable of crossing through all the bars. However, a portion crossing through all the bars may possibly disappear according to a position of the textured pattern. To solve the above problem, if the granularity of at least the satin finished surface is made to a degree smaller than the edge width of the bar, chipping of edge can be avoided to eliminate possible disappearance of the portion which crosses through all the bars.

On the other hand, as illustrated in FIG. 68, in a case of a QR code, if granularity of the satin finished surface is set to a degree smaller than a half of an edge width of each cell of the QR code, it becomes possible to prevent the QR code from being defective because of a partial removal of the cell. This ensures to prevent the QR code from a possible unreadable situation. Further, the QR code may be subjected to a blast working in order to generate a low density by using dots smaller than those of cells of the n-dimensional symbol. Meanwhile, it is possible for the n-dimensional symbol to correct the defective portion by means of a correction function of the n-dimensional symbol for repairing missing portion. Therefore, when processing a textured pattern, granularity of the textured pattern may be adjusted in the light of the correction function.

As in the above embodiment 8, in extraction processing of extracting an image of the n-dimensional symbol and an image of the textured pattern from the captured image, the image of the n-dimensional symbol is obtained by removing the textured pattern from the captured image by using a frequency filter for removing a high frequency component corresponding to the granularity of a satin finished surface. The satin finished surface was deleted. Then, an image of the textured pattern is obtained by taking a difference between an original image and the captured image (image of the n-dimensional symbol) from which the high frequency component was removed. Further, the n-dimensional symbol is expressed in binary such as black and white. Therefore, it is possible to obtain the image of the n-dimensional symbol by removing the textured pattern by means of adjustment of a threshold of resolution in the extraction processing of extracting the image of the n-dimensional symbol and the image of the textured pattern from the captured image.

Embodiment 9-1

Figure 69:
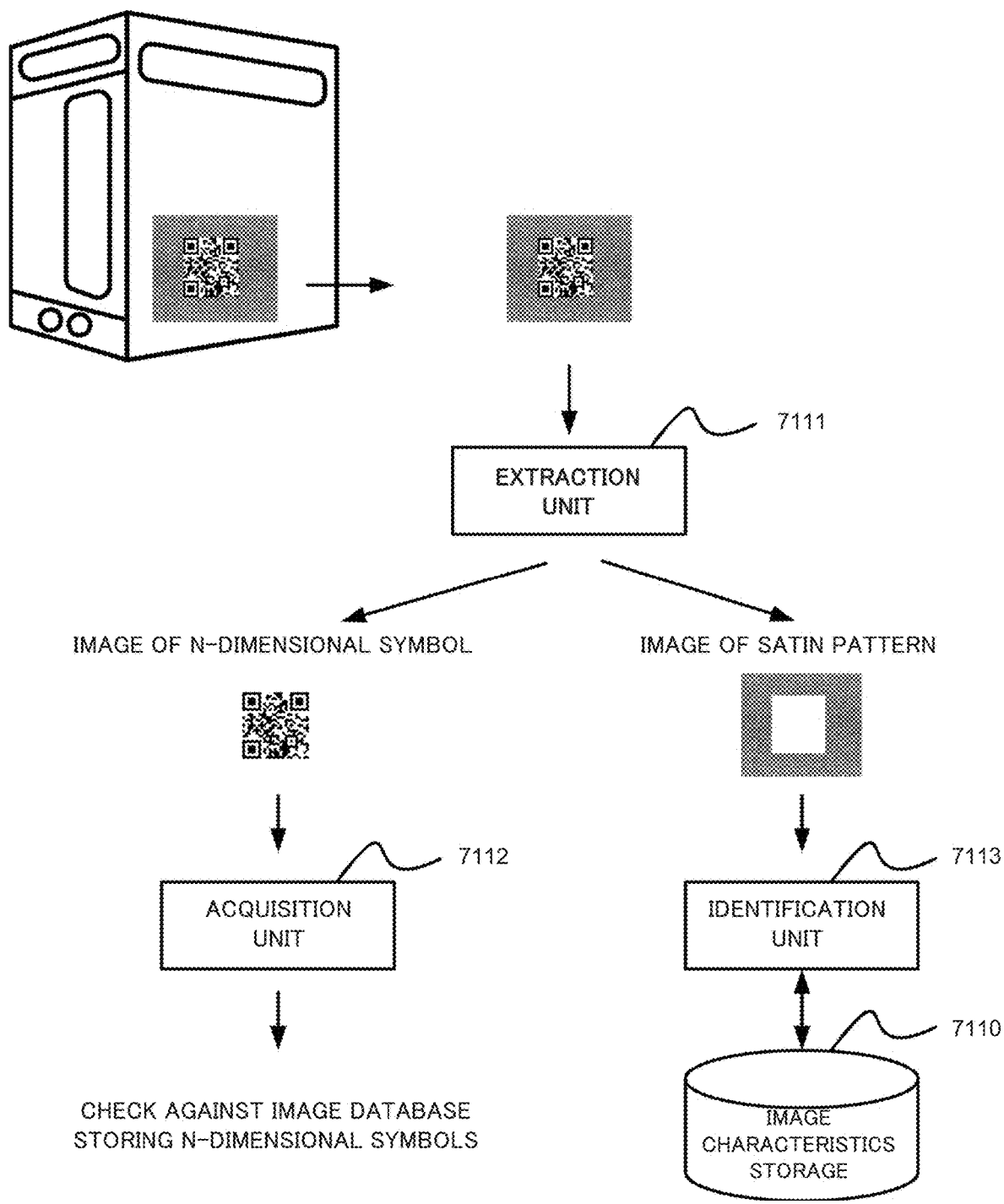
FIG. 69 is a block diagram of an embodiment 9-1 according to the present invention.

An embodiment 9-1 according to the present invention will be described below. FIG. 69 is a block diagram of the embodiment 9-1 according to the present invention.

The identification system of the embodiment 9-1 according to the present invention includes an image characteristics storage unit 7110, an extraction unit 7111, an acquisition unit 7112, and an identification unit 7113.

The image characteristics storage unit 7110 stores image characteristics of textured patterns formed on n-dimensional symbols, each n-dimensional symbol being attached to a component, a product, or a product including the component as its elements.

The extraction unit 7111 extracts an image of the n-dimensional symbol and an image of the textured pattern from an image of the n-dimensional symbol.

The acquisition unit 7112 acquires information on the component or the products from the extracted image of the n-dimensional symbol.

The identification unit 7113 identifies the component, the product, or the product including the component as its component by matching the extracted image of the textured pattern with image characteristics stored in the image characteristics storage unit 7110.

In the below description, a QR code as a two-dimensional symbol is the n-dimensional symbol, a PC case is the component, and a PC terminal is the product. The PC terminal including the PC case as its element is exemplified as a product to be identified, the PC case being provided with the QR code on which a textured pattern is formed.

The extraction unit 7111 obtains an image of the QR code of the PC case to extract an image of the QR code and an image of the textured pattern from the captured image. According to above mentioned embodiment, there are mainly two methods for providing the textured pattern on the QR code.

Next, image capturing of the textured pattern of the QR code, extraction of image characteristics of the textured p pattern of the QR code, and registration thereof in the image characteristics storage unit 7110 will be described. In the present embodiment, the image characteristics of the textured pattern formed on the QR code will be preliminary extracted to be stored in the image characteristics storage unit 7110. In processing to provide a satin finished surface by a die, several number of PC cases which were provided with satin finished surfaces by the die are selected, and images of QR codes of the PC cases are captured by a photograph device. In processing for providing a satin finished surface, an image of a QR code of each of the PC cases is captured by a photograph device. Image characteristics are extracted from the captured images of the textured patterns and are registered in the mage characteristics storage unit 7110. Meanwhile, it is possible to extract the image characteristics from the captured image by means of an extraction technology for extracting image characteristics of a finger print. More specifically, a luminance value and a feature point of an image, an inflection point of a line of a binarized image, an interunit point, an inter-edge point, and a central point of an image are extracted by the extraction technology.

Further, when registering image characteristics of a PC case in the image characteristics storage unit 7110, management information on a PC terminal including the PC case as one of its components is also registered therein after it is associated with the image characteristics of textured pattern. Accordingly, identification of the PC case enables identification of the PC terminal.

Here, in some cases, image characteristics of textured patterns differ from one another between the same components or between the same products according to lighting conditions when capturing images thereof. Therefore, the collation areas is supposed to be captured using the method described in Embodiments 4 and 5.

The extraction unit 7111 performs image processing of extracting image characteristics of a QR code and image characteristics of a textured pattern from an image of a QR code. The image processing is performed in the same method of the above embodiments.

The information acquisition unit 7112 acquires information on a PC case and a PC terminal having the PC case as its component by using the image of the QR code extracted by the extraction unit 7111.

The identification unit 7113 extracts image characteristics from the image of the textured pattern extracted by the extraction unit 7111. Normally, the QR code is provided with position detection patterns at three corners thereof. It is preferable to extract the image characteristics after normalizing the image of the textured pattern by using the position detection patterns as reference sections. This enables normalization of at least one of an orientation and a size of the image of the satin finished surface and a portion to be identified within the extracted image of the textured pattern. The normalization in the present embodiment includes normalization of geometrical transformations including at least one of a size, a position, and an orientation of a captured image and a portion to be identified within a textured pattern, etc., normalization of a luminance value of a captured image, etc. Further, in a case of a bar code, at least one of margins provided at both sides of the bar code, a left guard bar, a center bar, and a right guard bar of the bar code is set to be a reference section. Extraction of characteristics from the image of the textured pattern thus normalized may be performed by means of extraction technology for extracting image characteristics of a finger print. More specifically, a luminance value and a feature point of an image, an inflection point of a line of a binarized image, an interunit point, an inter-edge point, and a central point of an image are extracted by the extraction technology. Then, collation of the extracted image characteristics with image characteristics of textured patterns registered in the image characteristics storage unit 7110 ensures identification of a PC case. Identification of a PC case enables identification of a PC terminal based on management information corresponded to image characteristics of the PC case.

As described above, according to the present embodiment, an image of the n-dimensional symbol attached to a component or a product and an image of the textured pattern can be read out at the same time, and therefore, acquisition of information on the component or the product (information common to products to which the same n-dimensional symbol is attached) and each individual identification of the component or the product having the same n-dimensional symbol can be performed efficiently. Further, it is easy to find the n-dimensional symbol, so that a person in charge of an identification operation can easily specify a location of capturing an image of the textured pattern and an orientation and a size of thus captured image of a satin finished surface when the person identifies the component or the product.

Embodiment 9-2

Figure 70:
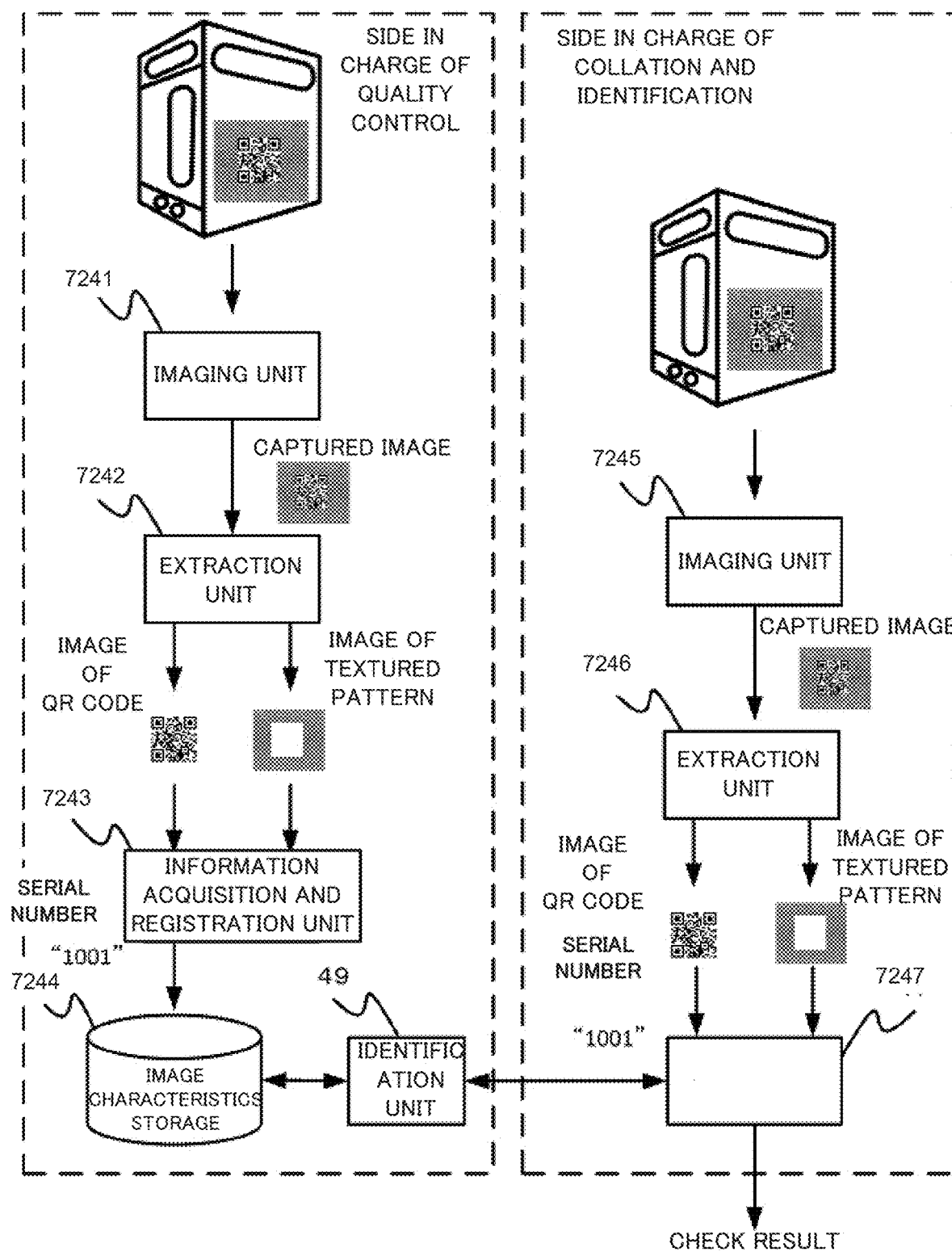
FIG. 70 is a block diagram of an embodiment 9-2 according to the present invention.

The present embodiment will be described exemplifying a case where the QR code. FIG. 70 is a block diagram of an identification system according to the present embodiment.

An imaging unit 7241 is a tool to be used by a side in charge of manufacturing a PC terminal (manufacture, etc. of a PC terminal) or a tool to be used by a side of an administrator who performs quality control of a PC terminal. The manufacturer, etc., uses the imaging unit 7241 to capture an image of a QR code of a PC case attached to a PC terminal. Meanwhile, the imaging unit 7241 captures an image under the above described predetermined image capturing conditions.

An extraction unit 7242 extracts an image of the QR code and an image of a textured pattern from the image captured by the imaging unit 7241. Extraction of the image of the QR code and the image of the textured pattern is performed in a manner similar to the case of the first embodiment.

An information acquisition and registration unit 7243 replaces a black and white grid-shaped pattern with a 0 and 1 signal string according to the standard of QR code and further replaces the 0 and 1 signal string with a number or a letter corresponding to an arrangement of the 0 and 1 in the image of the QR code extracted by the extraction unit 7242, thereby obtaining a serial number. The information acquisition and registration unit 43 obtains image characteristics of the textured image extracted by the extraction unit 7242. Then, the information acquisition and registration unit 7243 registers the serial number as an extraction result and the image characteristics of the satin finished surface in the image characteristics database 7244 after they are associated with each other. The image characteristics database 7244 is also a tool to be used by the side of the manufacturer of a PC terminal or the side of the administrator who performs quality control of a PC terminal. As shown in FIG. 64, the image characteristics database 7244 stores serial numbers, image characteristics of textured patterns in collation areas of PC cases, each collation area being provided with a serial number printed thereon, and management information on PC terminals, each PC terminal including PC cases as its component, after they are correspondingly associated with each other. Meanwhile, the management information is a concept including not only identification information of a component, a product, or a product including the component attached thereto but also production information such as a production site, a brand, and a production date of a component or a product and management information of a component or a product such as distribution information, etc., e.g., a product name, a destination, a ship date, etc. of a product using the component.

As described above, if the image characteristics of the textured pattern of the component being associated with the management information on the component, the product, or the product including the component attached thereto, it becomes possible to perform acquisition of history information on the identified PC case (component) and identification of a PC terminal including the PC case as its element (product including the component attached thereto).

An imaging unit 7245, an extraction unit 7246, and an information acquisition unit 7247 are tools to be used by a side in charge of matching a PC terminal such as a testing department, a destination, a shop, and a purchaser of the PC terminal.

The imaging unit 7245 has a structure similar to that of the imaging unit 7241. More specifically, the imaging unit 7245 captures an image of a QR code of a PC case of a PC terminal to be identified.

The extraction unit 7246 has a structure similar to that of the extraction unit 7242. More specifically, the extraction unit 7246 extracts an image of the QR code and an image of a textured pattern from the image captured by the imaging unit 7245.

The information acquisition unit 7247 acquires information on the PC case and the PC terminal from the image of the QR code extracted by the extraction unit 7246. In the present example, the information acquisition unit 7247 replaces a black and white grid-shaped pattern with a 0 and 1 signal string according to the standard of QR code and further replaces the 0 and 1 signal string with a number or a letter corresponding to an arrangement of the 0 and 1 in the image of the QR code extracted by the extraction unit 7246, thereby acquiring a serial number. Further, the information acquisition unit 7247 acquires image characteristics from the image of the textured pattern extracted by the extraction unit 7246. Then, the information acquisition unit 7247 sends the serial number and the image characteristics extracted from the textured image to an identification unit 7249 on the side of an administrator. The information acquisition unit 7247 subsequently receives a check result thereof to output it.

The identification unit 7249 collates the serial number received from the side of the collator with textured patterns. Then, the identification unit 7249 sends a check result thereof. More specifically, the identification unit 7249 collates the received serial number with serial numbers registered in the image characteristics database 7244. If there is a matching number, image characteristics of the textured pattern associated with the serial number is collated with the received image characteristics. Then, the identification unit 7249 returns a check result thereof. In a case where thus collated serial number and the image characteristics of the textured pattern have been associated with each other to be registered in the image characteristics database 7244, the PC case of the PC terminal to be collated is determined as a genuine PC case registered in the image characteristics database 7244. Based on the management information associated with the image characteristics of the satin finished surface, the PC terminal having the PC case as its component can be identified.

Meanwhile, the above mentioned imaging unit, image characteristics extraction unit, image characteristics database, extraction unit, information acquisition unit, and identification unit may be independent from each other but are to be connected to each other via network. Alternatively, some of them may be formed into one piece.

As described above, according to the present embodiment, an image of an n-dimensional symbol attached to a part or a product and an image of a textured pattern are read out at the same time, and therefore acquisition of information on the part or the product and identification of the part or the product can be performed efficiently. Further, in the embodiment 9-2, it is possible to store a QR code as identification information of a part or a product and image characteristics of a textured pattern formed on a part or a product in a manner they are corresponded to each other and, under such conditions, to collate the image characteristics of the textured pattern stored after it is associated with the identification information of the QR code acquired from the captured image with the textured pattern acquired from the captured image. This enables certification and identification of the part or the product.

Embodiment 9-3

Figure 71:
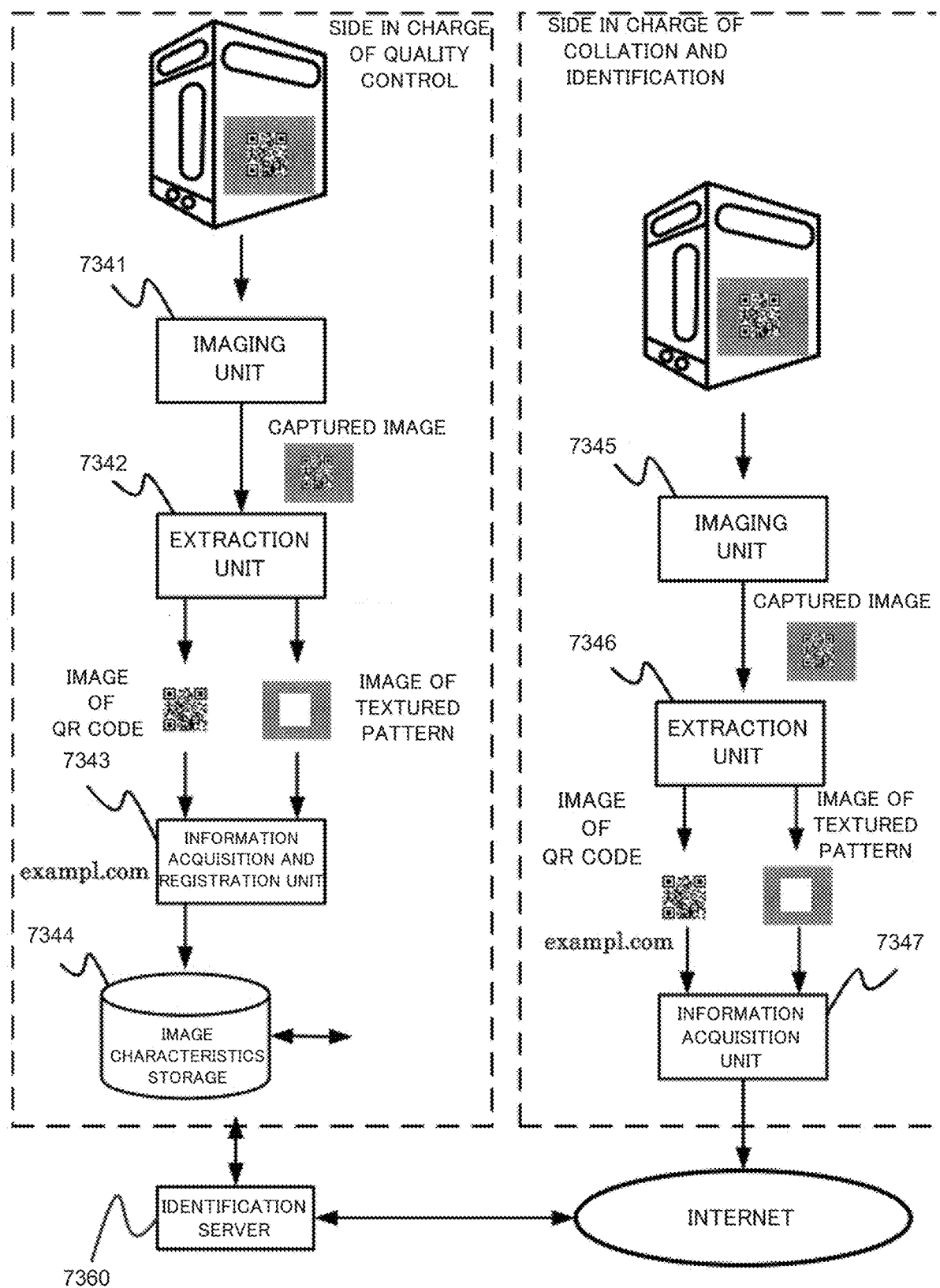
FIG. 71 is a block diagram of an embodiment 9-3 according to the present invention.

An embodiment 9-3 according to the present invention will be described below. FIG. 71 is a block diagram of an identification system according to the embodiment 9-3.

In the embodiment 9-3, information indicated by the QR code is an URL (Uniform Resource Locator). The URL indicates an address of an identification site of a PC terminal.

An imaging unit 7351 is a tool to be used by a side in charge of manufacturing of a PC terminal (manufacturer, etc. of a PC terminal) or a side in charge of performing quality control of a PC terminal. A manufacturer, etc. uses the imaging unit 7351 to capture an image of a QR code of a PC case as one of elements of a PC terminal. The imaging unit 7351 has a structure similar to that of the imaging unit 7241 of the embodiment 9-2.

An extraction unit 7352 extracts an image of the QR code and an image of a textured pattern from the image captured by the imaging unit 51. Extraction processing for extracting the image of the QR code and the image of the textured pattern is similar to that of the embodiment 9-1.

A registration unit 7353 extracts image characteristics of the textured image extracted by the extraction unit 7352 to register it in an image characteristics database 7354. The image characteristics database 7354 is a tool to be used by a side of a manufacturer of a PC terminal and a side of an administrator who performs quality control of a PC terminal. The image characteristics database 7354 stores image characteristics of textured patterns of QR codes and management information of PC terminals, each PC terminal having a PC case as its component provided with a QR code printed thereon, after they are correspondingly associated with each other. Meanwhile, the management information is a concept including not only identification information of a component, a product, or a product including the component attached thereto but also production information such as a production site, a brand, and a production date of a component or a product and management information of a component or a product such as distribution information, etc., e.g., a product name, a destination, a ship date, etc. of a product using the component. Association between the image characteristics of the textured pattern of the component and the management information on the component, the product, or the product to which the component is attached, as described above, enables acquisition of history information on identified PC case (part) and identification of a PC terminal including the PC case as its element (product provided with the component attached thereto).

A matching device 7359 is a tool to be used by a side in charge of collation and identification of a PC terminal, e.g., an inspection department, a destination, a shop, a purchaser, etc. of the PC terminal. The matching device 7359 includes an imaging unit 7355, an extraction unit 7356, and an information acquisition unit 7357.

The imaging unit 7355 has a structure similar to that of the imaging unit 7351. The imaging unit 7355 captures an image of a QR code of a PC case as one of elements of a PC terminal to be identified.

The extraction unit 7356 has a structure similar to that of the extraction unit 7352. The extraction unit 7356 extracts an image of the QR code and a textured image from the image captured by the imaging unit 7355.

The information acquisition unit 7357 replaces a black and white grid-shaped pattern with a 0 and 1 signal string according to the standard of QR code and further replaces the 0 and 1 signal string with a number or a letter corresponding to an arrangement of the 0 and 1 in the image of the QR code extracted by the extraction unit 7356. Accordingly, the information acquisition unit 7357 obtains an URL. Subsequently, the information acquisition unit 7357 extracts image characteristics from the image of the textured pattern extracted by the extraction unit 7356. Then, the information acquisition unit 7357 accesses a site of the acquired URL via internet to transmit data of the image characteristics extracted from the image of the satin finished surface in order to request identification of the PC terminal. The information acquisition unit 7357 receives a check result thereof in response to the request, followed by outputting it.

An identification server 7360 is a Web server which provides a PC terminal identification service on the internet. The identification server 7360 is connected to the image characteristics database 7354. When the identification server 7360 receives data of the image characteristics of the textured pattern together with the request for identification, the identification server 7360 collates the received image characteristics of the textured pattern with image characteristics of images of the textured pattern registered in the image characteristics database 7354 to return a check result thereof to the request source. More specifically, in a case where the received image characteristics of the textured pattern match any one of the registered image characteristics, the identification server 7360 determines that the PC case including the textured pattern formed thereon, i.e., the PC case of the request source, is a genuine PC case registered in the image characteristics database 7354. Then, the identification server 7360 transmits the management information associated with the image characteristics of the textured pattern to the request source. This enables the request source to identify a PC terminal having the PC case as its element.

As described above, according to the present embodiment, it is possible to read an image of a QR code attached to a component or a product and an image of a textured pattern at the same time. This ensures effective acquisition of information on a component or a product and identification of a component or a product. Further, in the embodiment 9-3, the QR code is an URL indicating an identification site for identifying a component or a product by using textured patterns. Transmission of the image characteristics of the textured pattern obtained from the captured image to the URL obtained from the image of the QR code of the captured image enables certification and identification of a component or a product.

Embodiment 9-4

An embodiment 9-4 of the present invention will be described below. The embodiment 9-4 is almost identical to the above described embodiments 9-1 to 9-3, except that, after a component or a product is subjected to identification, image characteristics of a textured pattern to be identified are associated with an identification result thereof to be stored together.

Figure 72:
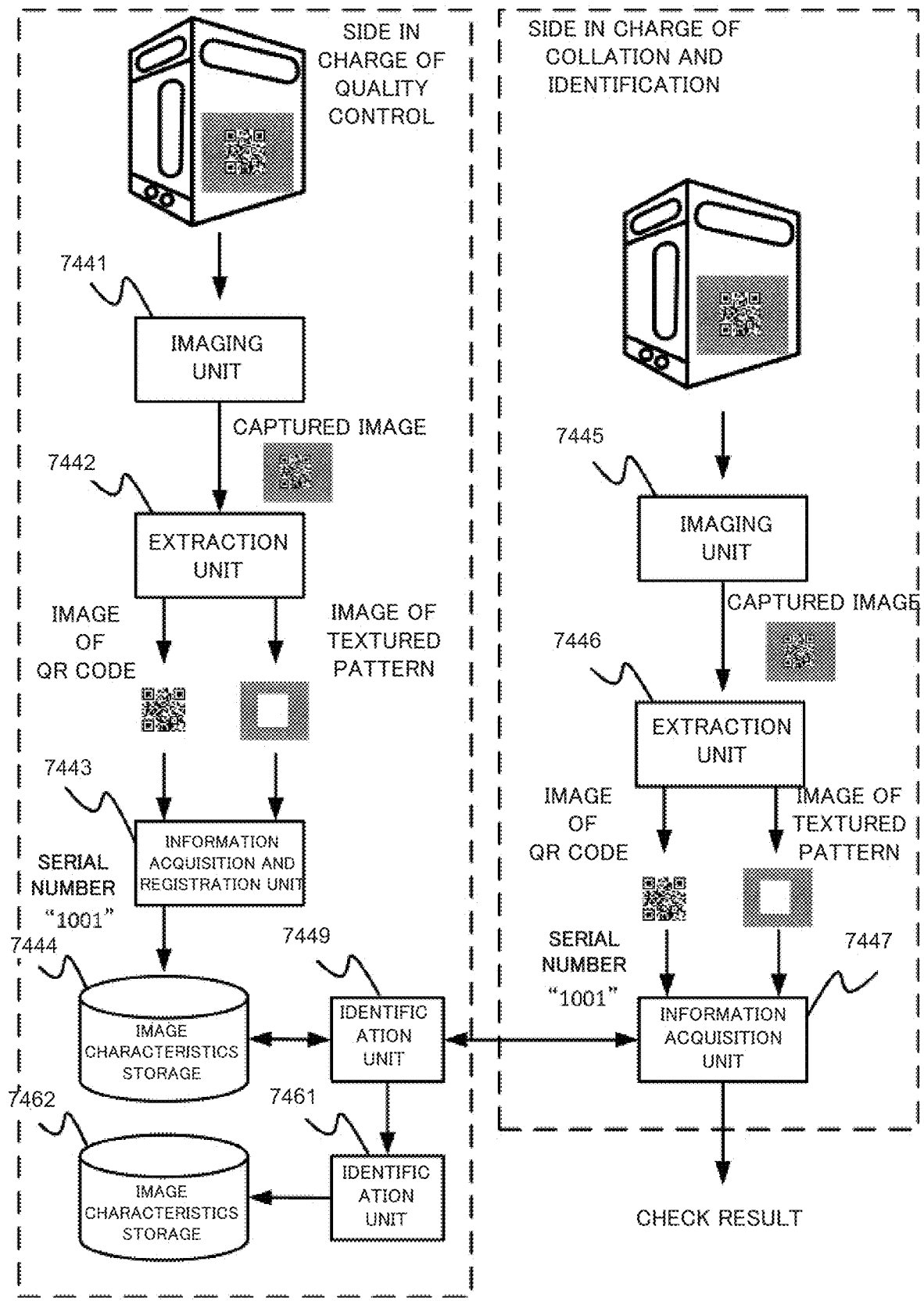
FIG. 72 is a block diagram of an embodiment 9-4 according to the present invention.

FIG. 72 is a block diagram of the presented embodiment. An identification system of the present embodiment includes, in addition to the above described structure of the embodiment 9-1 to 9-3, an identification information registration unit 7461 and an identification information database 7462. The identification information registration unit 7461 receives image characteristics of a textured pattern after being checked against the image characteristics database 7444 and information on a check result thereof from the identification unit 7449, associates them with each other, and registers the associated information in the identification information database 7462. Alternatively, the identification information registration unit 7461 may read out product information, management information, etc. which have been registered in the image characteristics database 7444 after they are associated with each other and register them in the identification information database 7462 after they are associated with the image characteristics of the textured pattern in a case where the image characteristics to be identified are registered in the image characteristics database 7444.

Further, the presented embodiment may be provided with a statistical processing unit which performs, by using the identification information database 7462 which accumulatively stores the image characteristics of thus identified textured pattern, the check result information, etc., statistical processing of information on a predetermined component or product to output states of distribution and sale of the product and the use of the product. Still further, the presented embodiment may be provided with an analyzer capable of statistically processing information of cases in which collation was failed and analyzing a state of occurrence of counterfeits in a case where check results or certification results of genuineness/spuriousness and checked locations of the products are stored as check result information.

Although the present invention has been fully described by way of the examples with reference to the accompanying drawings, it is to be noted here that various changes and modifications will be apparent to those skilled in the art. Therefore, unless such changes and modifications otherwise depart from the spirit and scope of the present invention, they should be construed as being included therein. It will be understood by those of ordinary skill in the art that various change by combining each embodiment without departing from the spirit and scope of the present invention as defined by the claims.

This application claims the benefit of Japanese Application No. 2014-177408, filed Sep. 1, 2014, the disclosure of which is hereby incorporated by reference.

(Supplementary Note 1)

An authenticity determining method of, based on whether a correspondence relationship between a part, validity of which is confirmed and to which surface treatment is applied, and which is mounted on a body of a product that is an authenticity target, and said body is right or wrong, reaching a determination about authenticity of said product.

(Supplementary Note 2)

The authenticity determining method according to supplementary note 1, wherein an image feature of a regular part, and registered trademark information about a registered trademark applied to said regular part are associated and stored in a storage section, and validity of the part mounted on the body of said product that is an authenticity target is confirmed by checking an image feature on a surface of said part that is an authenticity target, and a trademark applied to said part that is an authenticity target against the image feature of the regular part, and said registered trademark information stored in said storage section.

(Supplementary Note 3)

The authenticity determining method according to supplementary note 1 or 2, wherein a result of said determination and information about a position at which said determination was reached are associated and stored.

(Supplementary Note 4)

An authenticity determining apparatus configured to, based on whether a correspondence relationship between a part, validity of which is confirmed and to which surface treatment is applied, and which is mounted on a body of a product that is an authenticity target, and said body is right or wrong, reach a determination about authenticity of said product.

(Supplementary Note 5)

The authenticity determining apparatus according to supplementary note 4, comprising:

a storage section in which an image feature of a regular part, and registered trademark information about a registered trademark applied to said regular part are associated with each other and stored, and wherein validity of the part mounted on the body of said product that is an authenticity target is confirmed by checking an image feature on a surface of said part that is an authenticity target, and a trademark applied to said part that is an authenticity target against the image feature of the regular part, and said registered trademark information stored in said storage section.

(Supplementary Note 6)

The authenticity determining apparatus according to supplementary note 4 or 5, wherein a result of said determination and information about a position at which said determination was reached are associated and stored.

(Supplementary Note 7)

An authenticity determining system configured to, based on whether a correspondence relationship between a part, validity of which is confirmed and to which surface treatment is applied, and which is mounted on a body of a product that is an authenticity target, and said body is right or wrong, reach a determination about authenticity of said product.

(Supplementary Note 8)

The authenticity determining system according to supplementary note 7, comprising:

a storage section in which an image feature of a regular part, and registered trademark information about a registered trademark applied to said regular part are associated with each other and stored, and wherein validity of the part mounted on the body of said product that is an authenticity target is confirmed by checking an image feature on a surface of said part that is an authenticity target, and a trademark applied to said part that is an authenticity target against the image feature of the regular part, and said registered trademark information stored in said storage section.

(Supplementary Note 9)

The authenticity determining system according to supplementary note 7 or 8, wherein a result of said determination and information about a position at which said determination was reached are associated and stored.
(Supplementary Note 10)
A program for an authenticity determining apparatus, said program causing said authenticity determining apparatus to execute:
based on whether a correspondence relationship between a part, validity of which is confirmed and to which surface treatment is applied, and which is mounted on a body of a product that is an authenticity target, and said body is right or wrong, processing for reaching a determination about authenticity of said product.
(Supplementary Note 11)
A collation/retrieval system including,
a first imaging means capturing, while a predetermined section formed into the same pattern for every product is set to a reference section, an image of a product including at least the reference section,
a product feature extraction means detecting from the image captured by the first imaging means the reference section of the product, setting a recessed portion existing at a standard position relative to the detected reference section of the product to a collation area, and thereby extracting an image feature in the collation area of the product,
a storage means storing the extracted image feature of the collation area of the product,
a second imaging means capturing an image including at least the reference section of a product to be collated,
a to-be-collated product feature extraction means detecting from the image captured by the second imaging means the reference section of the product to be collated and extracting an image feature of the collation area of the detected reference section, and
a collation/retrieval means collating the stored image feature with the image feature of the collation area of the product to be collated.
(Supplementary Note 12)
The collation/retrieval system according to Supplementary note 11,
wherein the reference section is at least any one of a trademark, a logotype, a name of manufacturer, a manufacturing company, a brand name, a product name, a product number, and a section marked, branded, pressed, or attached on/to the product.
(Supplementary Note 13)
The collation/retrieval system according to Supplementary note 11 or 12,
wherein the collation area is a recessed portion of the reference section.
(Supplementary Note 14)
The collation/retrieval system according to any one of Supplementary notes 11 to 13,
wherein the image feature is at least any one of a scratch naturally generated in the course of manufacturing/processing the product, minute unevenness, and a design pattern, which are different for each individual, in the collation area of the product.
(Supplementary Note 15)
The collation/retrieval system according to any one of Supplementary notes 11 to 14,
wherein the product feature extraction means and the to-be-collated product feature extraction means each store in advance the feature of the reference section and the position of the collation area, detect the reference section of the product from the image captured based on the feature of the reference section, and normalize the position and a size of the collation area from the detected reference section to extract the image feature of the collation area.
(Supplementary Note 16)
The collation/retrieval system according to any one of Supplementary notes 11 to 15,
wherein the storage means stores a plurality of image features of collation areas extracted from a plurality of products to be retrieved and management information corresponding to the plurality of products to be retrieved in a mutually associated manner; and
wherein the collation/retrieval means retrieves an image feature having the highest similarity to the image feature of the collation area of the product to be collated from the stored plurality of image features to output management information of a product corresponding to the image feature having the highest similarity.
(Supplementary Note 17)
The collation/retrieval system according to any one of Supplementary notes 11 to 16,
wherein the product is a leather product, a metal workpiece, a wood product, a molten resin, or an industrial product including a ceramic portion.
(Supplementary Note 18)
A collation/retrieval server collating a product produced by or delivered from a producer or a distributor with a product to be collated for retrieval including,
a storage means storing, while a predetermined section formed into the same pattern for every product is set to a reference section and a recessed portion existing at a standard position relative to the reference section of the product is set to a collation area, an image feature in the collation area of the product,
a to-be-collated product feature extraction means receiving an image of a product to be collated, detecting from the received image the reference section of the product to be collated, and thereby extracting an image feature of the collation area of the reference section, and
a collation/retrieval means collating the stored image feature with the image feature of the collation area of the product to be collated.
(Supplementary Note 19)
The collation/retrieval server according to Supplementary note 18, further including
a product feature extraction means receiving an image of a product produced by or delivered from a producer or a distributor, detecting from the received image the reference section of the product, extracting an image feature of the collation area of the detected reference section, and registering the extracted image feature of the collation area in the storage means.
(Supplementary Note 20)
The collation/retrieval server according to Supplementary notes 18 or 19,
wherein the reference section is at least any one of a trademark, a logotype, a name of manufacturer, a manufacturing company, a brand name, a product name, a product number, and a section marked, branded, pressed, or attached on/to the product.
(Supplementary Note 21)
The collation/retrieval server according to any one of Supplementary notes 18 to 20,
wherein the collation area is a recessed portion of the reference section.
(Supplementary Note 22)
The collation/retrieval server according to any one of Supplementary notes 18 to 21, wherein the image feature is at least any one of a scratch naturally generated in the course of manufacturing/processing the product, minute unevenness, and a design pattern, which are different for each individual, in the collation area of the product.

(Supplementary Note 23)

The collation/retrieval server according to any one of Supplementary notes 18 to 22, wherein the product feature extraction means or the to-be-collated product feature extraction means stores in advance the feature of the reference section and the position of the collation area, detects the reference section of the product from the image captured based on the feature of the reference section, and normalizes the position and a size of the collation area from the detected reference section to thereby extract the image feature of the collation area.

(Supplementary Note 24)

The collation/retrieval server according to any one of Supplementary notes 18 to 23, wherein the storage means stores a plurality of image features of collation areas extracted from a plurality of products to be retrieved and management information corresponding to the plurality of products to be retrieved in a mutually associated manner; and wherein the collation/retrieval means retrieves an image feature having the highest similarity to the image feature of the collation area of the product to be collated from the stored plurality of image features to output management information of a product corresponding to the image feature having the highest similarity.

(Supplementary Note 25)

The collation/retrieval server according to any one of Supplementary notes 18 to 22, wherein the product is a leather product, a metal workpiece, a wood product, a molten resin, or an industrial product including a ceramic portion.

(Supplementary Note 26)

An image feature extraction apparatus including, a feature extraction means receiving an image of a product to be collated, detecting from the received image a predetermined section defined in the product as a reference section, and thereby extracting an image feature of a recessed portion, as a collation area, existing at a standard position relative to the detected reference section of the product.

(Supplementary Note 27)

A collation/retrieval method including setting a predetermined section formed into the same pattern for every product to a reference section, setting a recessed portion existing at a standard position relative to the reference section to a collation area, and using an image feature in the collation area of the product for collation/retrieval.

(Supplementary Note 28)

The collation/retrieval method according to Supplementary note 27, further including capturing, while the predetermined section formed into the same pattern for every product is set to the reference section, an image of the product including at least the reference section, detecting from the captured image the reference section of the product to extract, while the recessed portion existing at the standard position relative to the detected reference section is set to the collation area, an image feature in the collation area of the product, storing the extracted image feature of the collation area of the product, capturing an image including at least the reference section of a product to be collated, detecting from the captured image to be collated the reference section of the product to be collated and extracting an image feature of the collation area of the detected reference section, and collating the stored image feature with the image feature of the collation area of the product to be collated.

(Supplementary Note 29)

The collation/retrieval method according to Supplementary notes 27 or 28, wherein the reference section includes at least a trademark, a logotype, a name of manufacturer, a manufacturing company, a brand name, a product name, and a product number marked, branded, pressed, or attached on/to the product.

(Supplementary Note 30)

The collation/retrieval method according to any one of Supplementary notes 27 to 29, wherein the collation area is the recessed portion of the reference section.

(Supplementary Note 31)

The collation/retrieval method according to any one of Supplementary notes 27 to 30, wherein the image feature is at least any one of a scratch naturally generated in the course of manufacturing/processing the product, minute unevenness, and a design pattern, which are different for each individual, in the collation area of the product.

(Supplementary Note 32)

The collation/retrieval method according to any one of Supplementary notes 27 to 31, further including storing in advance a feature of the reference section and the position of the collation area, detecting the reference section of the product from the image captured based on the feature of the reference section, and normalizing the position and a size of the collation area from the detected reference section to extract the image feature of the collation area.

(Supplementary Note 33)

The collation/retrieval method according to any one of Supplementary notes 27 to 32 further includes storing a plurality of image features of collation areas extracted from a plurality of products to be retrieved and management information corresponding to the plurality of products to be retrieved in a mutually associated manner, and retrieving an image feature having the highest similarity to the image feature of the collation area of the product to be collated from the stored plurality of image features to output management information of a product corresponding to the image feature having the highest similarity.

(Supplementary Note 34)

The collation/retrieval method according to any one of Supplementary notes 27 to 33, wherein the product is a leather product, a metal workpiece, a molten resin, or an industrial product including a ceramic portion.

(Supplementary Note 35)

A program causing a computer to receive an image of a product to be collated, detect from the received image a predetermined section formed into the same pattern for every product as a reference section, and extract an image feature of a recessed portion, as a collation area, existing at a standard position relative to the reference section of the product.

(Supplementary Note 36)
A verification method including:
acquiring image feature of a component in a product to be verified; and
verifying the product to be verified on the basis of the acquired image feature of the component.

(Supplementary Note 37)
The verification method described in the supplementary note 36, wherein the image feature of the component is stored in a storage unit in association with product information about the product on which the component is fixed; and in the verification, the product information about the product to be verified and the product information stored in the storage unit are verified.

(Supplementary Note 38)
The verification method described in the supplementary note 36 or 37, further including registering, in the verification, one or both of the product information about the product to be verified and the verification information in the storage unit in association with the acquired image feature.

(Supplementary Note 39)
The verification method described in any one of the supplementary notes 36 to 38, wherein the storage unit has a storage unit on a supplier side of the component in which the image feature of the component supplied to a producer of the product from a supplier of the component is associated with identification information about the component, and a storage unit on a producer side of the product in which the identification information about the component is associated with the product information; and in the verification, the identification information about the component is acquired from the storage unit on the supplier side of the component on the basis of the acquired image feature, and the product information is acquired for verification from the storage unit on the producer side of the product on the basis of the acquired identification information about the component.

(Supplementary Note 40)
The verification method described in any one of the supplementary notes 37 to 39, wherein the product information includes at least one or more information of the identification information for identifying the producer, the identification information for identifying the product produced by the producer, the identification information for identifying an individual of the product, distribution course information indicating a distribution course of the component or the product, and the verification information about the verification of the product.

(Supplementary Note 41)
The verification method described in any one of the supplementary notes 37 to 40, wherein the verification information about the verification upon performing the verification by using the image feature is registered in the storage unit as the product information in association with the acquired image feature, statistical processing of the registered verification information is performed, and generation conditions of an imitation product are analyzed.

(Supplementary Note 42)
The verification method described in any one of the supplementary notes 37 to 41, wherein the distribution course of information about a component having the image feature or a product on which a component having the image feature is fixed is registered in the storage unit as the product information in association with the acquired image feature, statistical processing of the registered distribution course information is performed, and at least one of the distribution course, selling conditions, and usage conditions of the predetermined component or the product is analyzed.

(Supplementary Note 43)
The verification method described in the supplementary note 41 or 42, wherein the predetermined region is a concave portion of the component.

(Supplementary Note 44)
The verification method described in any one of the supplementary notes 36 to 43, wherein the image feature of the component is a pattern in a predetermined region generated in a process in which the component is fabricated.

(Supplementary Note 45)
The verification method described in the supplementary note 44, wherein the pattern is a textured pattern that is provided to the component.

(Supplementary Note 46)
The verification method described in any one of the supplementary notes 361 to 45, wherein the component is at least any one of a fastener, a screw, a nail, a nut, and an electronic component.

(Supplementary Note 47)
The verification method described in the supplementary note 46, wherein the fastener is at least any one of a slide fastener, a hook and loop fastener, a snap fastener, a rail fastener, a buckle, a cord stopper, a belt adjuster, a loop clutch, a snap button, and a button.

(Supplementary Note 48)
The verification method described in any one of the supplementary notes 36 to 47, wherein the component is any material of leather, metal, plastics, pottery, ceramics, and resins.

(Supplementary Note 49)
A verification method including:
designating as a verification area at least a part of a predetermined region of an article that has a textured pattern provided thereto, and previously storing at least one or more image features of the textured pattern of the verification area;
acquiring the image feature of the textured pattern that is provided to the verification area of an article to be verified; and
verifying the article to be verified by using the acquired image feature and the stored image features.

(Supplementary Note 50)
The verification method described in the supplementary note 491, wherein the stored image features are image features of an image obtained by imaging the textured pattern of the verification area under predetermined lighting conditions, and the image feature of the article to be verified are image feature obtained by imaging the textured pattern provided to the verification area of the article to be verified under the same lighting conditions as the predetermined lighting conditions.

(Supplementary Note 51)
The verification method described in the supplementary note 49 or 50, wherein the textured pattern is provided by a mold.

(Supplementary Note 52)
The verification method described in the supplementary note 51, wherein the image feature of the textured pattern provided to the verification area of at least one article are previously stored from among a plurality of articles that have the textured pattern provided thereto by the same mold in each mold.

(Supplementary Note 53)
The verification method described in the supplementary note 49 or 50, wherein the textured pattern is provided by blasting or powder painting.

(Supplementary Note 54)

The verification method described in the supplementary note 53, wherein the image features are stored in each individual of the articles.

(Supplementary Note 55)

The verification method described in any one of the supplementary notes 51 to 54, wherein the textured pattern is provided by blasting, texture processing using the powder painting, or a plating process as a process in a subsequent stage on the textured pattern provided by the mold.

(Supplementary Note 56)

The verification method described in the supplementary note 55, wherein a roughness of the textured pattern through the mold is made rougher than the roughness of a pattern in a difference between individuals generated by a process in the subsequent stage, and thereby an identification of the mold and the identification of the difference between individuals are easy to be performed independently.

(Supplementary Note 57)

The verification method described in any one of the supplementary notes 51 to 56, wherein the image features of the textured pattern in the verification area through the mold in each mold and the image features of the textured pattern in the verification area in each individual of the articles are stored, the image feature in the verification area of the article to be verified and the image features through the mold are verified and the mold that provides the textured pattern to the article to be verified is specified, and the image features of an individual group of the article that has the textured pattern provided thereto by the specified mold and the image feature in the verification area of the article to be verified are verified.

(Supplementary Note 58)

The verification method described in any one of the supplementary notes 49 to 57, wherein the component is a fastener.

(Supplementary Note 59)

The verification method described in the supplementary note 58, wherein the fastener is at least any one of a slide fastener, a hook and loop fastener, a snap fastener, a rail fastener, a buckle, a cord stopper, a belt adjuster, a loop clutch, a snap button, and a button.

(Supplementary Note 60)

A product management method comprising:

clustering a distribution information log database in which an image feature of a pattern formed on a surface of a component is related with at least one of product information regarding a product equipped with the component and distribution information regarding distribution of the product, based on the image feature; and analyzing, using statistical processing, one or both of the distribution information and product information related with the image feature belonging to each group obtained by the clustering.

(Supplementary Note 61)

The product management method according to supplementary note 60, wherein the image feature is a pattern on a predetermined region, generated in a production process of the component.

(Supplementary Note 62)

The product management method according to supplementary note 60 or 61, wherein the pattern is a textured pattern formed on the component.

(Supplementary Note 63)

The product management method according to supplementary note 61 or 62, wherein the predetermined region is a concave portion of the component.

(Supplementary Note 64)

The product management method according to any one of supplementary notes 60 to 63, wherein the component is a casting product made by a mold.

(Supplementary Note 65)

The product management method according to supplementary note 64, wherein the fastening component is at least any one of fastening components of a slide fastener, a hook-and-loop fastener, a snap fastener, a rail fastener, a buckle, a cord stopper, a belt adjuster, a loop clutch, a snap button, and a button.

(Supplementary Note 66)

An imaging aid aiding imaging of a predetermined region of a surface of an object having minute concave and convex portions and being subject to intense specular reflection, including:

a light source unit that irradiates light; and a cover lid that has a shape to cover a predetermined region of a surface of the object, where a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from the light source unit.

(Supplementary Note 67)

The imaging aid according to supplementary note 66, where the cover lid is provided with a mechanism for imaging the predetermined region from the normal line direction, in the black surface region.

(Supplementary Note 68)

The imaging aid according to supplementary note 66 or 67, where a region to be the black surface is determined based on a predetermined angular range that is determined with respect to a normal line in a predetermined region of a textured pattern surface of the object.

(Supplementary Note 69)

The imaging aid according to any one of supplementary notes 66-68, where the angular range of the black surface region of the cover lid is determined so that a degree of separation of a brightness value of pixels in the predetermined region in an image obtained by imaging of the textured pattern surface of the object or a number of pixels having brightness equal to or below a predetermined threshold value becomes a predetermined value.

(Supplementary Note 70)

The imaging aid according to any one of supplementary notes 66-69, where the angular range of the black surface area is determined for each article to be imaged, the type of the article to be imaged is identified, without depending on individual items, by characteristic appearance of the article to be imaged, the appearance having a same pattern of the same article, and the imaging aid includes a mechanism to adjust the angular range of the black surface area, to a predetermined value determined to the type of the article.

(Supplementary Note 71)

The imaging aid according to any one of supplementary notes 66-70, having a shape to fit to and fix a part including at least one of a fastening part, a slide fastener, a bolt, a nut, and an emblem.

(Supplementary Note 72)

The imaging aid according to any one of supplementary notes 66-71, where
the imaging aid has a shape to appropriately fit to the article for each type of object to be imaged,
an area of a predetermined black surface region is set for each article, and
the imaging aid is replaceable with respect to a camera.

(Supplementary Note 73)

An identification method comprising:
with at least a part of a skeleton part of an identification mark attached to a component or a product defined as a matching area, identifying said component, said product, or a product having said component as one of its constituent elements using a textured pattern formed in said matching area.

(Supplementary Note 74)

The identification method according to supplementary note 73, comprising:
with at least a part of a skeleton part of an identification mark attached to a component or a product defined as a matching area, storing beforehand an image feature of a textured pattern formed in said matching area;
acquiring an image feature of a textured pattern formed in a matching area in a skeleton part of an identification mark attached to a component or a product to be identified, or in a skeleton part of a component that is one of constituent elements of a product to be identified; and
matching said acquired image feature with said stored image feature, and identifying said component, product, or product having said component as one of its constituent elements to be identified.

(Supplementary Note 75)

The identification method according to supplementary note 73 or 74, comprising:
normalizing a captured image of said textured pattern formed in said matching area using a skeleton part of said identification mark, and acquiring an image feature of said textured pattern formed in said matching area.

(Supplementary Note 76)

The identification method according to any one of supplementary notes 73 to 75, wherein:
said stored image feature is an image feature of an image obtained by imaging a textured pattern formed in a matching area in a skeleton part of an identification mark attached to said component or product under predetermined illumination conditions, and
said image feature of a textured pattern formed in a matching area in a skeleton part of an identification mark attached to said component or product to be identified, or in a skeleton part of said component that is one of constituent elements of said product to be identified is an image feature acquired by imaging said textured pattern formed in a matching area in a skeleton part of an identification mark attached to said component or product to be identified, or in a skeleton part of said component that is one of constituent elements of said product to be identified under illumination conditions similar to said predetermined illumination conditions.

(Supplementary Note 77)

The identification method according to any one of supplementary notes 73 to 76, wherein:
said textured pattern is one formed by a mold, and
said method comprises:
storing, for each mold, an image feature of a textured pattern formed in a matching area in a skeleton part of an identification mark attached to at least one component or product out of a plurality of components or products formed with a textured pattern in a matching area in a skeleton part of said identification mark by the same mold; and
performing identification of said component, product, or product having said component as one of its constituent elements to be identified on a mold-by-mold basis.

(Supplementary Note 78)

The identification method according to supplementary note 77, wherein:
said image feature for each mold is an image feature of an image capturing a texture of a mold with its brightness value reversed, and
said method matches said image feature having a reversed brightness value with said image feature of a textured pattern formed in a matching area in a skeleton part of an identification mark attached to said component or product to be identified, or in a skeleton part of said component that is one of constituent elements of said product to be identified.

(Supplementary Note 79)

The identification method according to any one of supplementary notes 73 to 76, comprising:
storing beforehand an image feature of a textured pattern formed in a matching area in a skeleton part of an identification mark attached to a component or a product for each individual object of said component or said product; and
performing identification of said component, product, or product having said component as one of its constituent elements to be identified for each individual object of said component or said product.

(Supplementary Note 80)

The identification method according to any one of supplementary notes 77 to 79, comprising:
storing said image feature of a textured pattern formed in a matching area in a skeleton part of an identification mark attached to said component or product in correspondence with management information for said component, product, or product having said component as one of its constituent elements.

(Supplementary Note 81)

The identification method according to any one of supplementary notes 73 to 80, comprising:
applying textured finish generating microscopic random bumps and dips in a matching area in a skeleton part of said identification mark and forming a textured pattern for matching during a manufacturing process for said component or product.

(Supplementary Note 82)

The identification method according to supplementary note 81, wherein:
said textured finish is sand blasting, etching-based surface processing, or blasting coating.

(Supplementary Note 83)

An information acquisition and identification system including
image feature storage unit configured to store image feature of a textured pattern formed on a component or a product,
extracting unit configured to extract an image of an information display body and an image of the textured pattern from an image including at least the information display body for displaying information on the component, the product, or a product including the component as its component and the textured pattern formed on the component or the products,
acquiring unit configured to acquire information on the component or the products from the extracted image of the information display body, and identifying unit configured to identify the component, the product, or the product including the component as its component by matching image feature of the extracted image of the textured pattern with image feature stored in the image feature storage unit.

(Supplementary Note 84)

The information acquisition and identification system according to supplementary note 83, wherein the textured pattern is formed in order to identify the component, the product, or the product including the component as its component.

(Supplementary Note 85)

The information acquisition and identification system according to supplementary note 83 or 84, wherein each dip and bump or granularity of each dip and bump of the textured pattern is formed into a size smaller than a width of an edge of a skeleton part of the information display body.

(Supplementary Note 86)

The information acquisition and identification system according to supplementary note 85, wherein the textured pattern is provided on each mold with predetermined granularity in order to identify a mold used in manufacturing, and wherein each individual is processed, in order to identify the each individual manufactured by the same mold, with granularity smaller than the granularity for the each mold.

(Supplementary Note 87)

The information acquisition and identification system according to any one of supplementary note 84 to 86, further including forming unit configured to form the textured pattern in order to identify the component, the product, or the product including the component as its component, and image capturing unit configured to capture an image of the formed portion.

(Supplementary Note 88)

The information acquisition and identification system according to any one of supplementary note 83 to 87, wherein the textured pattern is formed on a skeleton part of the information display body.

(Supplementary Note 89)

The information acquisition and identification system according to any one of supplementary note 83 to 88, wherein the extracting unit configured to extracts the image of the textured pattern by removing a high frequency component corresponding to a dip and bump of a textured pattern from the captured image and taking a difference between the captured image and an image captured that the high frequency component is removed.

(Supplementary Note 90)

The information acquisition and identification system according to any one of supplementary note 83 to 89, wherein the captured image and images of image feature stored in the image feature storage unit are to be captured under the same lighting conditions.

(Supplementary Note 91)

The information acquisition and identification system according to supplementary note 90, wherein an image is captured under the lighting conditions that a portion of a surface which is corresponding to a range within a prescribed angular range from a normal direction and facing to a forming surface of the textured pattern in a covering portion is blacken, the covering portion being formed so as to cover the forming surface of the textured pattern, and that surfaces corresponding to a range within another angular ranges are set to light source area-including surfaces for dispersing and emitting light received from a light source.

(Supplementary Note 92)

The information acquisition and identification system according to any one of supplementary note 83 to 91, wherein the extracting unit normalizes the captured image by using the information display body.

(Supplementary Note 93)

The information acquisition and identification system according to any one of supplementary note 83 to 92, wherein the information display body is identification information for identifying an origin or each individual of the component, the product, or the product including the component as its component, wherein the image feature storage unit stores the identification information and image feature of the textured pattern formed on the component, the product, or the product including the component as its component in associated with each other, and wherein the identifying unit identifies the component, the product, or the product including the component as its component of a captured image by matching the image feature of the textured pattern corresponding to the identification information of the information display body acquired from the captured image with the image feature of the textured pattern extracted from the captured image.

(Supplementary Note 94)

The information acquisition and identification system according to any one of supplementary note 83 to 92, wherein the image feature storage unit and the identifying unit are provided in an identification server, wherein the information display body is a URL of the identification server, wherein the acquiring unit acquires the URL of the identification server from the extracted image of the information display body and transmits the captured image or the extracted image of the textured pattern to the identification server, and wherein the identification server identifies the component, the product, or the product including the component as its component by using the captured image or the extracted image of the textured pattern.

(Supplementary Note 95)

An information acquisition and identification system including image characteristics storage means storing image characteristics of textured patterns formed on component or products, extracting means extracting an image of an n-dimensional (n: natural number) symbol and an image of a textured pattern from an image including at least the n-dimensional symbol for displaying information on a part, a product, or a product including the part as its component and a textured pattern formed on the part or the products, acquiring means acquiring information on the part or the products from the extracted image of the n-dimensional symbol, and identifying means identifying the part, the product, or the product including the part as its component by matching image characteristics of the extracted image of the textured pattern with image characteristics stored in the image characteristics storage means.

(Supplementary Note 96)

The information acquisition and identification system according to supplementary note 95, wherein the textured pattern is formed in order to identify the part, the product, or the product including the part as its component.

(Supplementary Note 97)
The information acquisition and identification system according to supplementary note 95 or 96,
wherein the textured pattern is formed on a portion at a position determined by the n-dimensional symbol.

(Supplementary Note 98)
An information acquisition and identification system according to any one of supplementary note 95 to 97,
wherein granularity of the textured pattern is smaller than a short side of a cell of the n-dimensional symbol.

(Supplementary Note 99)
The information acquisition and identification system according to any one of supplementary note 95 to 98,
wherein the textured pattern is formed on an area other than the n-dimensional symbol.

(Supplementary Note 100)
The information acquisition and identification system according to supplementary note 98,
wherein the textured pattern is provided on each die with predetermined granularity in order to identify a die used in manufacturing, and
wherein each individual is processed, in order to identify the each individual manufactured by the same die, with granularity smaller than the granularity at the time of processing the each die.

(Supplementary Note 101)
The information acquisition and identification system according to any one of supplementary note 95 to 100, further including
forming means forming the textured pattern in order to identify the part, the product, or the product including the part as its component, and
image capturing means capturing an image of the formed portion.

(Supplementary Note 102)
The information acquisition and identification system according to any one of supplementary note 95 to 101,
wherein the extracting means extracts the image of the textured pattern by removing a high frequency component corresponding to granularity of a satin finished surface from the captured image and taking a difference between the captured image and an image captured after the high frequency component is removed.

(Supplementary Note 103)
The information acquisition and identification system according to any one of supplementary note 95 to 102,
wherein the captured image and images of image characteristics stored in the image characteristics storage means are to be captured under the same lighting conditions.

(Supplementary Note 104)
The information acquisition and identification system according to supplementary note 103,
wherein an image is captured under the lighting conditions that a portion of a surface in a covering portion is blacken, the portion of the surface being corresponding to a range within a prescribed angular range from a normal direction and facing to a forming surface of the textured pattern, the covering portion being formed so as to cover the forming surface of the textured pattern, and that surfaces corresponding to a range within another angular ranges are set to light source area-including surfaces for dispersing and emitting light received from a light source.

(Supplementary Note 105)
The information acquisition and identification system according to any one of supplementary note 95 to 104,
wherein the extracting means normalizes the captured image by using the n-dimensional symbol.

(Supplementary Note 106)
The information acquisition and identification system according to any one of supplementary note 95 to 105,
wherein the n-dimensional symbol indicates identification information for identifying an origin or each individual of the part, the product, or the product including the part as its component,
wherein the image characteristics storage means stores the identification information and image characteristics of the textured pattern formed on the part, the product, or the product including the part as its component after they are associated with each other, and
wherein the identifying means identifies the part, the product, or the product including the part as its component of a captured image by matching the image characteristics of the textured pattern corresponding to the identification information of the n-dimensional symbol acquired from the captured image with the image characteristics of the textured pattern extracted from the captured image.

(Supplementary Note 107)
The information acquisition and identification system according to any one of supplementary note 95 to 106,
wherein the image characteristics storage means and the identifying means are provided in an identification server,
wherein the n-dimensional symbol indicates a URL of the identification server,
wherein the acquiring means acquires the URL of the identification server from the extracted image of the n-dimensional symbol and transmits the captured image or the extracted image of the textured pattern to the identification server, and
wherein the identification server identifies the part, the product, or the product including the part as its component by using the captured image or the extracted image of the textured pattern.

(Supplementary Note 108)
The information acquisition and identification system according to any one of supplementary note 95 to 106,
wherein the n-dimensional symbol indicates at least one of a serial number, a name of manufacturer, a name of producer, a brand name, a product name, a product number, a rod number, and a URL.

(Supplementary Note 109)
A mobile terminal comprising:
a light source section;
a camera section;
a display section; and
a control section configured to, when a matching area of an object where a satin pattern is created is imaged, superimpose and display a reference image for imaging said matching area in a state where a relative position stance of said light source section, said camera section and said matching area meets a predetermined relationship on a through image to be displayed on the display section.

(Supplementary Note 110)
The mobile terminal according to supplementary note 109, wherein
said reference image is acquired from an image obtained by imaging said matching area in advance in a state where a relative position stance of said light source section, said camera section and said matching area meets a predetermined relationship.

(Supplementary Note 111)

The mobile terminal according to supplementary note 109 or 110, wherein said reference image is acquired from images obtained by imaging the matching area of the object in the same imaging condition using mobile terminals, at least one of positions of light sources and view angles of cameras of which are different.

(Supplementary Note 112)

The mobile terminal according to any one of supplementary notes 109 to 111, wherein said reference image corresponding to the mobile terminal is acquired from a database in which plural kinds of reference images are stored.

(Supplementary Note 113)

The mobile terminal according to c supplementary note 112, wherein a reference image of each mobile terminal, and information about a position of a light source and a view angle of a camera of a mobile terminal, at which each reference image is imaged, are associated and stored in said database.

(Supplementary Note 114)

The mobile terminal according to supplementary note 112, wherein reference images used when the matching area of the object is imaged in the same imaging condition by different models of mobile terminals are stored in said database according to a model of a mobile terminal.

DESCRIPTION OF THE REFERENCE NUMERAL

1 Imaging unit
2 Product feature extraction unit
3 Storage unit
4 Imaging unit
5 To-be-collated product feature extraction unit
6 Collation/retrieval unit

The invention claimed is:

1. A method of an authenticity assessment comprising:
   receiving a brand name of a product entered by a user through a mobile device;
   receiving an image of at least one of a trademark, a logotype, and a brand name on a surface of the product, wherein the image is captured by the mobile device with a cover lid, and the cover lid is between the mobile device and the product;
   determining authenticity of the product by using the received image and the received brand name; and
   displaying the authenticity result on a screen of the mobile device.

2. The method of the authenticity assessment according to claim 1, further comprising sending the brand name and date of the determining in cases where the product is authentic.

3. The method of the authenticity assessment according to claim 1, wherein determining authenticity of the product from a consistency between a result of analyzing the image and the brand name.

4. The method of the authenticity assessment according to claim 1, wherein the product is a leather product.

5. The method of the authenticity assessment according to claim 1, wherein the product having minute unevenness on the surface formed by a graining process.

6. The method of the authenticity assessment according to claim 1, wherein the product is a bag or a wallet.

7. The method of the authenticity assessment according to claim 1, wherein the cover lid has a shape to cover a portion of a surface of the object.

8. The method of the authenticity assessment according to claim 1, wherein the mobile device is at least one of smartphone, a mobile phone, a tablet, and other device having a camera function.

9. The method of the authenticity assessment according to claim 1, wherein an image for supporting capturing image by user is displayed on the preview image of the mobile device.

10. The method of the authenticity assessment according to claim 1, determining authenticity is provided by a service the internet.

11. The method of authenticity assessment according to claim 1, wherein the mobile device is separable from the cover lid.

12. The method of authenticity assessment according to claim 1, wherein the cover lid directly contacts the product.

13. A system of an authenticity assessment comprising:
   at least one memory configured to store instructions; and
   at least one processor coupled to the at least one memory and configured to execute the instructions to:
      receive a brand name of a product entered by a user through a mobile device;
      receive an image of at least one of a trademark, a logotype, and a brand name on a surface of the product, wherein the image is captured by the mobile device with a cover lid, and the cover lid has a shape to cover a portion of a surface of the object;
      determine authenticity of the product by using the received image and the received brand name; and
      display the authenticity result on a screen of the mobile device.

14. The system according to claim 13, wherein the processor further configured to execute the instructions to send the brand name and date of the determining in cases where the product is authentic.

15. The system according to claim 13, wherein the processor further configured to execute the instructions to determine authenticity of the product from a consistency between a result of analyzing the image and the brand name.

16. The system according to claim 13, wherein the cover lid is between the mobile device and the product.

17. The system according to claim 13, wherein the mobile device is separable from the cover lid.

18. The system according to claim 13, wherein the cover lid directly contacts the product.

19. A non-transitory computer readable storage medium recording thereon a program causing a computer to perform a method of an authenticity assessment, the method comprising:
   receiving a brand name of a product entered by a user through a mobile device;
   receiving an image of at least one of a trademark, a logotype, and a brand name on a surface of the product, wherein the image is captured by the mobile device with a cover lid, and the cover lid is between the mobile device and the product;
   determining authenticity of the product by using the received image and the received brand name; and
   displaying the authenticity result on a screen of the mobile device.

* * * * *